United States Patent
Bellini, III et al.

(10) Patent No.: US 11,429,913 B2
(45) Date of Patent: Aug. 30, 2022

(54) SYSTEMS AND METHODS FOR CONVERTING SALES OPPORTUNITIES TO SERVICE TICKETS, SALES ORDERS, AND PROJECTS

(71) Applicant: ConnectWise, LLC, Tampa, FL (US)

(72) Inventors: Arnold Bellini, III, Tampa, FL (US); Linda Brotherton, Tampa, FL (US); Mark E Laplante, Tampa, FL (US)

(73) Assignee: CONNECTWISE, LLC, Tampa, FL (US)

( * ) Notice: Subject to any disclaimer, the term of this patent is extended or adjusted under 35 U.S.C. 154(b) by 118 days.

(21) Appl. No.: 13/958,095

(22) Filed: Aug. 2, 2013

(65) Prior Publication Data
US 2015/0039380 A1    Feb. 5, 2015

(51) Int. Cl.
*G06Q 10/06* (2012.01)
*G06Q 10/10* (2012.01)
G06Q 10/08 (2012.01)
G06Q 30/04 (2012.01)

(52) U.S. Cl.
CPC ........... *G06Q 10/06316* (2013.01); *G06Q 10/063112* (2013.01); *G06Q 10/103* (2013.01); *G06Q 10/1097* (2013.01); *G06Q 10/0835* (2013.01); *G06Q 30/04* (2013.01)

(58) Field of Classification Search
CPC .... G06Q 10/10; G06Q 10/101; G06Q 10/103; G06F 16/27; G06F 16/273
See application file for complete search history.

(56) References Cited

U.S. PATENT DOCUMENTS

| | | | |
|---|---|---|---|
| 5,381,332 A | 1/1995 | Wood | |
| 5,758,126 A * | 5/1998 | Daniels | G06Q 40/04 715/780 |
| 5,758,327 A | 5/1998 | Gardner et al. | |
| 5,758,328 A | 5/1998 | Giovannoli | |
| 5,758,331 A | 5/1998 | Johnson | |
| 5,802,493 A | 9/1998 | Sheflott et al. | |

(Continued)

OTHER PUBLICATIONS

"System." Merriam-Webster.com, May 18, 2013. Internet Archive, <http://web.archive.org/web/20130518062353/https://www.merriam-webster.com/dictionary/system>. (Year: 2013).*

(Continued)

*Primary Examiner* — Romain Jeanty
(74) *Attorney, Agent, or Firm* — Foley & Lardner LLP

(57) ABSTRACT

Systems and methods of the present disclosure facilitate managing a sale via a sales management system. In some embodiments, the system includes a sales opportunity module and a service ticket translation module. The sales opportunity module may be configured to receive a sales leads data structure comprising at least one sales lead. Based on at least one qualification criterion, the system may be configured to identify a sales lead of the sales lead data structure as a sales opportunity. The service ticket translation module may be configured to select data of the sales opportunity for inclusion in a service ticket. By maintaining the selected data of the sales opportunity, the service ticket translation module may be configured to translate the selected data of the sales opportunity into the service ticket. The service ticket translation module may be configured to provide the service ticket to a service board.

24 Claims, 37 Drawing Sheets

(56) References Cited

U.S. PATENT DOCUMENTS

| | | | |
|---|---|---|---|
| 5,808,894 A | 9/1998 | Wiens et al. | |
| 6,067,525 A | 5/2000 | Johnson et al. | |
| 6,085,169 A | 7/2000 | Walker et al. | |
| 6,141,653 A | 10/2000 | Conklin et al. | |
| 6,158,044 A | 12/2000 | Tibbetts | |
| 6,226,675 B1 | 5/2001 | Meltzer et al. | |
| 6,256,667 B1* | 7/2001 | W.ang.hlander | G06Q 10/10 |
| | | | 709/218 |
| 6,356,909 B1 | 3/2002 | Spencer | |
| 6,415,259 B1 | 7/2002 | Wolfinger et al. | |
| 6,418,415 B1 | 7/2002 | Walker et al. | |
| 6,801,333 B1 | 10/2004 | Weiss | |
| 6,859,768 B1 | 5/2005 | Curran et al. | |
| 6,898,580 B1 | 5/2005 | Curran et al. | |
| 6,901,407 B2 | 5/2005 | Curns et al. | |
| 7,003,473 B2 | 2/2006 | Curtis et al. | |
| 7,050,874 B1 | 5/2006 | Tenorio | |
| 7,072,857 B1 | 7/2006 | Calonge | |
| 7,092,968 B1 | 8/2006 | Ebel et al. | |
| 7,117,162 B1 | 10/2006 | Seal et al. | |
| 7,143,051 B1 | 11/2006 | Hanby et al. | |
| 7,302,400 B2 | 11/2007 | Greenstein | |
| 7,302,401 B1 | 11/2007 | Tervonen | |
| 7,340,410 B1 | 3/2008 | Vaillancourt et al. | |
| 7,440,911 B1 | 10/2008 | Fors et al. | |
| 7,516,088 B2 | 4/2009 | Johnson et al. | |
| 7,546,346 B2 | 6/2009 | Ouchi | |
| 7,552,065 B1 | 6/2009 | Blanco | |
| 7,558,783 B2 | 7/2009 | Vadlamani et al. | |
| 7,606,739 B1 | 10/2009 | Johnson | |
| 7,664,668 B2 | 2/2010 | Lissy et al. | |
| 7,702,736 B2 | 4/2010 | Ouchi | |
| 7,702,737 B2 | 4/2010 | Ouchi | |
| 7,707,259 B2 | 4/2010 | Ouchi | |
| 7,836,103 B2 | 11/2010 | Li et al. | |
| 7,908,200 B2 | 3/2011 | Scott et al. | |
| 7,925,971 B2 | 4/2011 | Funnekotter et al. | |
| 7,941,341 B2* | 5/2011 | Johnson | G06Q 10/06 |
| | | | 705/16 |
| 7,962,358 B1 | 6/2011 | Fernandez et al. | |
| 8,005,910 B2 | 8/2011 | Ouchi | |
| 8,009,820 B2 | 8/2011 | Curtis | |
| 8,271,355 B2 | 9/2012 | Johnson et al. | |
| 8,275,779 B2 | 9/2012 | Eggerbraaten et al. | |
| 8,290,808 B2 | 10/2012 | Brower et al. | |
| 8,306,908 B1 | 11/2012 | Barker et al. | |
| 8,374,896 B2 | 2/2013 | Engler et al. | |
| 8,489,980 B2 | 7/2013 | Lakritz | |
| 8,543,283 B2 | 9/2013 | Boss et al. | |
| 8,612,275 B1 | 12/2013 | Crum et al. | |
| 8,639,553 B1 | 1/2014 | Knauth et al. | |
| 2001/0056362 A1 | 12/2001 | Hanagan et al. | |
| 2002/0007289 A1 | 1/2002 | Malin et al. | |
| 2002/0016729 A1 | 2/2002 | Breitenbach et al. | |
| 2002/0026356 A1 | 2/2002 | Bergh et al. | |
| 2002/0046147 A1 | 4/2002 | Livesay et al. | |
| 2002/0046214 A1 | 4/2002 | Sandifer | |
| 2002/0059512 A1 | 5/2002 | Desjardins | |
| 2002/0069154 A1 | 6/2002 | Fields | |
| 2002/0077711 A1 | 6/2002 | Nixon et al. | |
| 2002/0078046 A1 | 6/2002 | Uluakar et al. | |
| 2002/0083099 A1* | 6/2002 | Knauss | G06F 17/2264 |
| | | | 715/236 |
| 2002/0087391 A1 | 7/2002 | Williams | |
| 2002/0116210 A1 | 8/2002 | Medina et al. | |
| 2002/0116300 A1 | 8/2002 | Debusk et al. | |
| 2002/0123957 A1 | 9/2002 | Notarius et al. | |
| 2002/0123969 A1 | 9/2002 | Foertsch et al. | |
| 2002/0165724 A1 | 11/2002 | Blankesteijn | |
| 2002/0169651 A1 | 11/2002 | Limousin et al. | |
| 2002/0188513 A1* | 12/2002 | Gil | G06Q 10/08 |
| | | | 705/22 |
| 2002/0199182 A1* | 12/2002 | Whitehead | G06Q 30/04 |
| | | | 725/1 |
| 2003/0004854 A1 | 1/2003 | Greene et al. | |
| 2003/0014298 A1 | 1/2003 | Merklein | |
| 2003/0014326 A1 | 1/2003 | Ben-Meir et al. | |
| 2003/0028533 A1* | 2/2003 | Bata | G06Q 10/10 |
| 2003/0046153 A1 | 3/2003 | Robibero | |
| 2003/0061266 A1 | 3/2003 | Ouchi | |
| 2003/0121001 A1* | 6/2003 | Jeannette | G06F 17/2247 |
| | | | 715/234 |
| 2003/0135425 A1 | 7/2003 | Leavitt | |
| 2003/0154144 A1 | 8/2003 | Pokorny et al. | |
| 2003/0158640 A1 | 8/2003 | Pillar et al. | |
| 2003/0179870 A1 | 9/2003 | Desa et al. | |
| 2003/0182172 A1 | 9/2003 | Claggett et al. | |
| 2004/0002885 A1 | 1/2004 | Levy | |
| 2004/0117046 A1 | 6/2004 | Colle et al. | |
| 2004/0143474 A1 | 7/2004 | Haeberle et al. | |
| 2004/0254950 A1 | 12/2004 | Musgrove et al. | |
| 2005/0021424 A1 | 1/2005 | Lewis et al. | |
| 2005/0022154 A1* | 1/2005 | Chung | G06Q 10/10 |
| | | | 717/100 |
| 2005/0044165 A1* | 2/2005 | O'Farrell | G06Q 10/10 |
| | | | 709/213 |
| 2005/0171918 A1 | 8/2005 | Eden et al. | |
| 2005/0216325 A1* | 9/2005 | Ziad | G06Q 10/06 |
| | | | 705/7.22 |
| 2005/0240451 A1 | 10/2005 | Johnson et al. | |
| 2005/0240881 A1 | 10/2005 | Rush et al. | |
| 2006/0106685 A1 | 5/2006 | Cheng et al. | |
| 2006/0122892 A1 | 6/2006 | Fletcher et al. | |
| 2006/0184715 A1 | 8/2006 | Gikas et al. | |
| 2006/0287874 A1 | 12/2006 | Askeland et al. | |
| 2006/0287932 A1 | 12/2006 | Wulteputte et al. | |
| 2007/0016487 A1 | 1/2007 | Calonge | |
| 2007/0022404 A1 | 1/2007 | Zhang et al. | |
| 2007/0088621 A1 | 4/2007 | Hamilton et al. | |
| 2007/0143320 A1* | 6/2007 | Gaurav | G06Q 20/14 |
| 2007/0150855 A1 | 6/2007 | Jeong | |
| 2007/0156476 A1* | 7/2007 | Koegler | G06Q 10/00 |
| | | | 705/7.11 |
| 2007/0165816 A1* | 7/2007 | Gilles | G06Q 30/0601 |
| | | | 379/201.01 |
| 2007/0192362 A1 | 8/2007 | Caballero et al. | |
| 2008/0034425 A1 | 2/2008 | Overcash et al. | |
| 2008/0162177 A1* | 7/2008 | Raffel | G06Q 10/063 |
| | | | 705/7.26 |
| 2008/0228582 A1 | 9/2008 | Fordyce et al. | |
| 2008/0243565 A1 | 10/2008 | Gregory | |
| 2008/0243654 A1 | 10/2008 | Wernze et al. | |
| 2008/0255914 A1 | 10/2008 | Oren | |
| 2008/0300962 A1* | 12/2008 | Cawston | G06F 17/30557 |
| | | | 705/7.13 |
| 2008/0312980 A1 | 12/2008 | Boulineau et al. | |
| 2009/0012828 A1 | 1/2009 | Brower et al. | |
| 2009/0076928 A1 | 3/2009 | Hjertonsson et al. | |
| 2009/0094040 A1 | 4/2009 | Lewis | |
| 2009/0109033 A1 | 4/2009 | Salvat | |
| 2009/0125359 A1 | 5/2009 | Knapic et al. | |
| 2009/0222317 A1 | 9/2009 | Allen et al. | |
| 2009/0222356 A1 | 9/2009 | Courchesne et al. | |
| 2010/0030665 A1 | 2/2010 | Johnson | |
| 2010/0063959 A1* | 3/2010 | Doshi | G06F 16/27 |
| | | | 707/618 |
| 2010/0070329 A1 | 3/2010 | Engler et al. | |
| 2010/0076803 A1 | 3/2010 | Deo et al. | |
| 2010/0088240 A1 | 4/2010 | Ely et al. | |
| 2010/0131296 A1 | 5/2010 | Knutson | |
| 2010/0198652 A1 | 8/2010 | Spanton et al. | |
| 2010/0217616 A1 | 8/2010 | Colson et al. | |
| 2010/0257012 A1* | 10/2010 | Walker | G06Q 10/06314 |
| | | | 705/345 |
| 2010/0280867 A1 | 11/2010 | Diaz et al. | |
| 2010/0318443 A1 | 12/2010 | Culp | |
| 2011/0025019 A1 | 2/2011 | Schmidt et al. | |
| 2011/0093328 A1 | 4/2011 | Woolcott | |
| 2011/0184771 A1 | 7/2011 | Wells | |
| 2011/0246255 A1* | 10/2011 | Gilbert | G06Q 10/063 |
| | | | 705/7.14 |
| 2011/0252019 A1 | 10/2011 | Lamothe | |

(56) References Cited

U.S. PATENT DOCUMENTS

| | | |
|---|---|---|
| 2011/0276427 A1 | 11/2011 | McNall et al. |
| 2012/0030069 A1 | 2/2012 | Garg et al. |
| 2012/0072299 A1 | 3/2012 | Sampsell |
| 2012/0215687 A1 | 8/2012 | Jain |
| 2012/0215783 A1 | 8/2012 | Musgrove et al. |
| 2012/0221393 A1 | 8/2012 | Ouimet et al. |
| 2012/0259684 A1 | 10/2012 | Ochiai |
| 2012/0271730 A1 | 10/2012 | McNall et al. |
| 2012/0323727 A1 | 12/2012 | Batra et al. |
| 2012/0330929 A1 | 12/2012 | Kowalski et al. |
| 2013/0006700 A1 | 1/2013 | Brower et al. |
| 2013/0110667 A1 | 5/2013 | Debusk et al. |
| 2013/0117228 A1* | 5/2013 | Appleman ............ G06F 16/178 707/626 |
| 2013/0179225 A1* | 7/2013 | Nadiadi ............. G06Q 30/0205 705/7.34 |
| 2013/0246113 A1 | 9/2013 | Mantravadi et al. |
| 2013/0268388 A1 | 10/2013 | Walker et al. |
| 2014/0122144 A1 | 5/2014 | Cirpus et al. |
| 2014/0122240 A1* | 5/2014 | Olsen ........................ G06F 8/60 705/14.61 |
| 2014/0214473 A1 | 7/2014 | Gentile et al. |
| 2014/0265299 A1 | 9/2014 | Janesky |

OTHER PUBLICATIONS

Ashley Verrill, Help Desk Software Systems, Apr. 5, 2013.
Assistance Software, product overview, 2013, Naarden, The Netherlands.
Autotask, A Better Way to Run your Software Business, DS ISV LTR 070312, Jul. 2012, East Greenbush, New York.
Autotask, Insight. Intelligence. Control. Prosper Through Productivity, DS SLM A4 FR 070212, Jul. 2012, East Greenbush, New York.
Autotask, MSP Increases Top Line Growth by 55%, CS Master LTR+ 032013, Mar. 2013, East Greenbush, New York.
Autotask, Opening the Door to Sell & Service Clients with Internal IT Resources, DS AT LTR 071912, Jul. 2012, East Greenbush, New York.
Autotask, Sporting Goods Manufacturer Optimizes IT Service Operations with Autotask, CS Li Ning A4 040513, Apr. 2013, East Greenbush, New York.
Autotask, Streamlining Service Provider Operations, Jul. 2012, East Greenbush, New York.
Autotask, Understanding the Changing Landscape for IT Services, Jan. 2013, East Greenbush, New York.
BDO Solutions Blog, Why a Microsoft Dynamics CRM based Professional Service Automation solution may be right for you (Part 1), Dec. 17, 2012, Waterloo, Ontario, Canada.
financialforce.com, FinancialForce Professional Services Automation (PSA) datasheet, 2013, San Francisco, California.
financialforce.com, FinancialForce PSA overview, 2013, San Francisco, California.
Greenrope, GreenRope CRM product description, 2013, San Diego, California.
Logicbox, LogicBox CRM product description, 2013, Portland, Oregon.
Microsoft Corp., Microsoft Dynamics AX 2012 R2 product overview, 2013, Redmond, Washington.
Netsuite, NetSuite CRM+ product overview, 2013, San Mateo, California.
Oracle, Inc., JD Edwards EnterpriseOne Applications Customer Relationship Management for Sales Implementation Guide, Release 9.1, E15142-02, Mar. 2013, Redwood Shores, California.
Sage, Sage SalesLogix product overview, 2013, Irvine, California.
SAP AG, Improving CRM Processes with SAP Business All-In-One Solutions, 50-089-904, Sep. 2011, Walldorf, Germany.
SugarCRM, product description, 2013, Cupertino, California.
Tigerpaw Software, product description, 2013, Bellevue, Nebraska.
Connectwise, Inc., ConnectWise Documentation v2012.1, single frame from Instructional Video: How To Use Opportunities, undated, retrieved Aug. 2013, Tampa, Florida.
Connectwise, Inc., ConnectWise Documentation v2012.1, Opportunity Screen, Jul. 2013, Tampa, Florida.
Connectwise, Inc., ConnectWise Documentation v2012.1, Creating a Service Ticket, Feb. 2012, Tampa, Florida.
Connectwise, Inc., Press Release, ConnectWise unveils 2012.1, extends industry leading service management capabilities, Mar. 2012, Tampa, Florida.
Connectwise, Inc., Release Notes Version 2012.2, Jan. 2013, Tampa, Florida.
"Agent-based e-commerce in case of mass customization", K Turowski—International Journal of Production Economics, 2002—Elsevier.
"An investigation into the use of ERP systems in the service sector", V Botta-Genoulaz, PA Millet—International Journal of Production Economics, 2006—Elsevier.
"Assessment of benefits from product configuration systems" L Hvam, A Haug, NH Mortensen—. . . on Configuration, ECAI 2010, the 19th . . . , 2010—orbit.dtu.dk.
"Hospital resource planning: concepts, feasibility, and framework", AV Roth, R Dierdonck—Production and operations . . . , 1995—Wiley Online Library.
1945 Snap-On Tools Price Catalog, Ebay Auction, retrieved from the Internet Jul. 22, 2017, pp. 1-3. pages.
A case study of the ERP system application in the aviation maintenance department of H company L Haigang, Y Wanling—Service Systems and Service . . . , 2008—ieeexplore.IEEE.org.
Akintoye, "Just-in-Time Application and Implementation for Building Material Management", Oct. 19, 1993, pp. 105-113.
Aquilano and Smith, "A Formal Set of Algorithms for Project Scheduling with Critical Path Scheduling / Material Requirements Planning", vol. 1, Issue2, Nov. 1980, pp. 57-67.
Berka and Conn, "Materials Management: A Comprehensive System" Transactions of AACE International, 1994 ABI/INFORM Global, pp. SI2.1.
Customer relationship management in the pharmaceutical industry T Puschmann, R Alt—. . . Sciences, 2001. Proceedings of the 34th . . . , 2001—ieeexplore.ieee.org.
Design and development of a business-to-business integration module for Openbravo ERP JM Bernal Alejo—2011—academica-e.unavarra.es.
Enterprise Resource Planning and Integration. K Kurbel—2005—mfile.narotama.ac.id.
Evaluation of integration technology approaches in the healthcare supply chain S Kitsiou, A Matopoulos, V Manthou . . . —. . . Journal of Value . . . , 2007—inderscienceonline.com.
Final Office Action on U.S. Appl. No. 13/837,300 dated May 9, 2018.
Final Office Action on U.S. Appl. No. 15/624,628 dated Apr. 20, 2020.
Launching professional services automation: Institutional entrepreneurship for information technology innovations P Wang, EB Swanson—Information and Organization, 2007—Elsevier.
Non-Final Office Action on U.S. Appl. No. 15/624,628 dated Oct. 17, 2019.
Non-Final Office Action on U.S. Appl. No. 16/434,749 dated Jan. 28, 2020.
Non-Final Office Action on U.S. Appl. No. 17/101,450 dated Sep. 10, 2021.
Non-Final Office Action on U.S. Appl. No. 17/101,464 dated Feb. 22, 2022.
Notice of Allowance on U.S. Appl. No. 13/837,300 dated Jan. 24, 2019.
Notice of Allowance on U.S. Appl. No. 15/624,628 dated Jul. 24, 2020.
Notice of Allowance on U.S. Appl. No. 16/434,749 dated Jul. 8, 2020.
Professional Services Automation: A Knowledge Management Approach Using LS land Domain Specific Ontologies. V Kashyap, SR Dalal, C Behrens—FLAIRS Conference, 2001—aaai.org.

(56) References Cited

OTHER PUBLICATIONS

Ronen and Trietsch, "A Decision Support System For Purchasing Management of Large Projects", Operations Research; Nov./Dec. 1988, ABI/INFORM Global, p. 882.
Siebel Systems, Inc., Siebel Professional Services Automation Guide, eBusiness Applications, Version 7.0, 10PA1-PS00-07000, Sep. 2001, San Mateo, California.
Siebel Systems, Inc., Siebel Professional Services Automation Guide, Version 7.7, Nov. 2004, San Mateo, California.
The Construction Industry Institute Materials Management Task Force, "Project Materials Management Primer", Publication 7—Nov. 2, 1988.
U.S. Notice of Allowance on U.S. Appl. No. 13/837,337 dated Mar. 22, 2017.
U.S. Office Action on U.S. Appl. No. 13/837,300 dated Apr. 8, 2015.
U.S. Office Action on U.S. Appl. No. 13/837,300 dated Sep. 4, 2015.
U.S. Office Action on U.S. Appl. No. 13/837,337 dated Oct. 15, 2015.
U.S. Office Action on U.S. Appl. No. 13/837,337 dated Dec. 9, 2014.
U.S. Office Action on U.S. Appl. No. 13/837,337 dated Mar. 18, 2015.
U.S. Office Action on U.S. Appl. No. 13/837,300 dated Jun. 8, 2016.
U.S. Office Action on U.S. Appl. No. 13/837,300 dated Jul. 26, 2017.
U.S. Office Action on U.S. Appl. No. 13/837,300 dated Feb. 8, 2017.
U.S. Office Action on U.S. Appl. No. 13/837,337 dated Feb. 8, 2016.
Using electronic data interchange (EDI) to improve the efficiency of accounting transactions SW Anderson, WN Lanen—The Accounting Review, 2002—aaajournals.org.

* cited by examiner

| Description | To service tickets | To sales orders | To projects |
|---|---|---|---|
| ID | X | X | X |
| Name | X | X | X |
| Contact information | X | X | X |
| Next step | | | |
| Close date | X | X | X |
| Age | X | X | X |
| Recurring | X | X | X |
| Revenue | | | |
|    Won | | | |
|    Open | | | |
|    Lost | | | |
| Margin | | | |
| Sales Stage | | | |
| Probability | | | |
| Rating | X | X | X |
| Sales person | | | |
|    Primary | X | X | X |
|    Secondary | X | X | X |
| PO number | | X | |
| Time | | X | |
| Location | X | X | X |
| Business unit | X | X | X |
| Group | X | X | X |
| Campaign | | | |
| Description | X | X | X |
| Type | X | X | X |
| Status | X | X | X |
| Source | X | X | |
| Quotes | X | X | |
| Notes | X | X | X |
| Documents | | | |
|    Name | X | X | X |
|    Filename | X | X | X |
|    Private | X | X | X |

Fig. 7A

| Description | To service tickets | To sales orders | To projects |
|---|---|---|---|
| Read-only | X | X | X |
| Owner | X | X | X |
| Updated | X | X | X |
| Size | X | X | X |
| Contacts | X | X | X |
| Activities | | | |
| Status | X | X | X |
| Due date | X | X | X |
| Contact | X | X | X |
| Time | X | | X |
| Expenses | | | |
| Tracks | | X | |
| Surveys | X | | X |
| Sales team | X | X | X |
| Forecast | | | |
| Products | | | |
| Product ID | X | X | X |
| Class | X | X | X |
| Description | X | X | X |
| Quantity | X | X | X |
| Unit price | X | X | |
| Extended price | X | X | |
| Unit cost | X | X | |
| Margin | X | X | |
| Billable | X | X | |
| Invoice number | X | X | |
| Agreement | X | X | X |
| Location | X | X | X |
| Group | X | X | X |
| Taxable | | X | |
| Drop-ship | | X | |
| Special order | | X | |
| Status | | X | |
| Unit of measure | | X | |

Fig. 7B

| Description | To service tickets | To sales orders | To projects |
|---|---|---|---|
| Cancel | | | |
|     Cancelled | | X | |
|     Quantity | | X | |
|     Reason | | X | |
| Internal notes | X | X | X |
| Pick/ship | | | |
|     Warehouse | | X | |
|     Bin | | X | |
|     Shipping method | | X | |
|     Tracking number | | X | |
|     Picked quantity | | X | |
|     Shipped quantity | | X | |
|     Serial number | | X | |
| Inventory availability | | | |
|     Location | | X | |
|     Warehouse | | X | |
|     Bin | | X | |
|     On hand | | X | |
|     Picked | | X | |
|     Available | | X | |
| Purchase order | | | |
|     PO number | | X | |
|     Vendor | | X | |
|     PO date | | X | |
|     Status | | X | |
| Estimates | | | |
|     Type | | | |
|     Description | | | |
|     Revenue | | | |
|     Cost | | | |
|     Margin | | X | |
|     Probability | | | |
|     Status | | | |
|     Include | | | |

SYSTEMS AND METHODS FOR CONVERTING SALES OPPORTUNITIES TO SERVICE TICKETS, SALES ORDERS, AND PROJECTS

FIELD OF THE DISCLOSURE

The present disclosure generally relates to sales management systems. More specifically, the present disclosure relates to the management of sales opportunities by a sales management system, and the use of a sales management system to facilitate the efficient handoff of a closed sales opportunity to other parts of an organization.

BACKGROUND OF THE INVENTION

Sales management systems can be used to manage sales leads, qualify the sales leads to select sales opportunities from the sales leads, and facilitate the management of the sales process to drive the closing of the sales opportunities to finalize sales.

Service ticketing systems can be used to catalog, track, and manage the completion of tasks needed to support a sale. A service ticketing system can facilitate the management of the tasks by service managers, and can facilitate the completion of the tasks by service technicians.

Sales order systems can be used to generate sales orders for purchasing products needed to support a sale. A sales order system can facilitate the management of vendor delivery of the products, and can facilitate the tracking and delivery of the products as needed.

Project planning systems can schedule and manage projects needed to support a sale. A project planning system can facilitate the entry, management, and tracking of the tasks and sub-tasks needed for completion of the projects.

SUMMARY OF THE INVENTION

Sales management systems can greatly facilitate the sales process. Sales management systems can help to keep track of a large number of leads, organize the process of qualifying the leads, and standardize the qualification and selection of leads for pursuit as sales opportunities. Sales management systems can also standardize the process of moving a sales opportunity through the sales process and driving the sales opportunity toward completion as either a lost opportunity or a closed sale. During the entire process from lead to closed sale, the sales management system can facilitate the collection and storage of all information and requirements associated with the sale, and ensure that no customer communications or documents are lost. The sales management system can also assist with the preparation, delivery, and update of customer quotations for services and products. A sales management system can also greatly improve the communication between the many members of a sales team and give the sales team members access to shared information that is essential for doing their job.

Once a sale is closed, the sales management system can facilitate the handoff of the sale to other entities within the organization to deliver the products and services to the customer. For example, the sales management system can facilitate the conversion of sales data to the purchasing department, which may be responsible for procuring and delivering hardware and software products to the customer. Continuing the example, the sales management system can also facilitate the conversion of sales data to the service department, which may be responsible for installing, configuring, and maintaining those products at the customer site. Continuing the example further, the sales management system can also facilitate the conversion of sales data to the engineering department, which may be responsible for designing and implementing custom configurations required by the customer.

The sales management system may need to convert the sales data to different tools used by each of these departments for managing and implementing their workload. For example, for the purchasing department, the sales management system may need to convert sales data into a sales order system to track product procurement and interface with external vendors. Continuing the example, for the service department, the sales management system may need to convert sales data into a service ticketing system to track, prioritize, assign, and complete the many tasks the service department needs to manage. Continuing the example further, for the engineering department, the sales management system may need to convert sales data into a project management system to plan, schedule, and implement the complex projects the engineering department must complete for customers.

Much of the information needed by these individual systems (the sales order system, service ticketing system, and project management system) may already be present in the sales management system and may have been collected, updated and verified by the sales team during the sales process. The handoff of the sale from the sales department to other departments can involve the conversion of information from the sales management system to the other tools used for managing and implementing the delivery of the sale to the customer. The present disclosure describes the automation of the handoff in a way that may help to minimize the introduction of human error in the handoff, which may result in greatly improved efficiency of the business processes and greatly improved customer satisfaction.

Systems and methods of the present disclosure facilitate managing a sale via a sales management system. For example, the present disclosure provides a sales opportunity module and a service ticket translation module. The sales opportunity module can receive sales leads and identify a sales lead as a sales opportunity based on at least one qualifying criterion. The service ticket translation module can select data of the sales opportunity for inclusion in a service ticket, translate the selected data of the sales opportunity into the service ticket, and provide the service ticket to a service board.

At least one aspect of the present disclosure is directed to systems and methods for converting a sales opportunity to at least one sales order. For example, the present disclosure provides a sales order translation module, which can select data of the sales opportunity for inclusion in a sales order, translate the selected data of the sales opportunity into the sales order, and provide the sales order to a sales order management module.

At least one aspect of the present disclosure is directed to systems and methods for converting a sales opportunity to at least one project. For example, the present disclosure provides a project translation module, which can select data of the sales opportunity for inclusion in a project, translate the selected data of the sales opportunity into the project, and provide the project to a project management module.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 7A-C are illustrative tables representing embodiments of data in a sales opportunity.

FIG. 10 is an illustrative example of an embodiment of a user interface for creating and updating a sales opportunity.

FIG. 17 is an illustrative example of an embodiment of a user interface for managing the financial aspects of a service ticket.

FIG. 19 is an illustrative example of an embodiment of a user interface for managing the products associated with a sales order.

Like reference numbers and designations in the various drawings indicate like elements.

DETAILED DESCRIPTION

Systems and methods of the present disclosure can use information collected by the sales staff during the process of closing a sale to make an effective and efficient handoff of the sale to the service, purchasing, and engineering departments in order to deliver the required products and services to the customer. The sales management system can manage the sales process for the sales staff, provide and update quotations to customers, and keep track of customer documents and requirements. The information in the sales management system may then be automatically converted to service tickets used by the service department, sales orders used by the purchasing department, and projects used by the engineering department. The automatic conversion may improve the efficiency of the business processes of the organization, and may also improve customer satisfaction with the sale and delivery.

In an illustrative example, the customer may want an internal network with an email server. The sales department may determine that the job will require wiring the network, installing a router, installing an email server, configuring the email server, and providing maintenance on all components. The sales department may provide several quotes to the customer with different options and pricing. The customer may provide very specific requirements on the way the networking cables must be hidden in the lobby and conference room. All of the information can be recorded in the sales management system to clarify what the final agreement is and what the customer requirements are. Once the sale is closed, the sales opportunity can be converted to a sales order for the network cabling and connectors, the router, the email server, and the operating system and email server software for the server. The sales opportunity can also be converted to service tickets for installing and configuring the router, installing the server, installing and configuring the operating system, installing and configuring the email server, configuring the customer machines to use the server, and providing ongoing maintenance on the router and server.

The sales opportunity can also be converted to a project for installing the networking wiring and taking care of the customer requirements for concealing the wiring in the lobby and conference room.

Figure 1A:
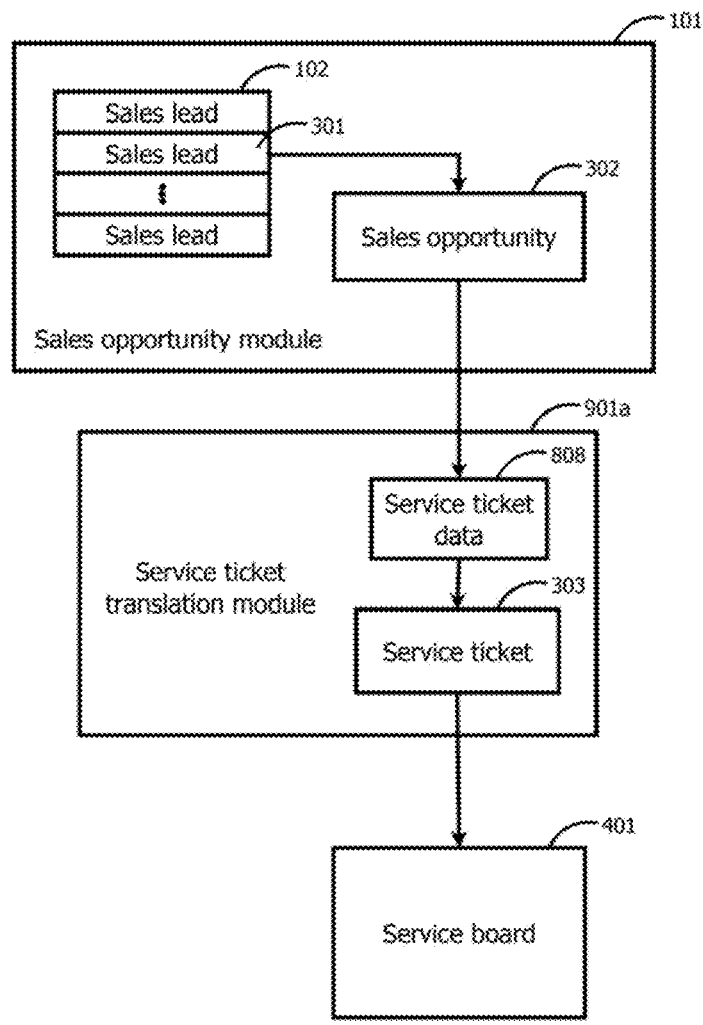
FIG. 1A is an illustrative block diagram of an embodiment of a system for converting a sales opportunity to one or more service tickets.

FIG. 1A is an illustrative block diagram of an embodiment of a system for converting sales opportunities to one or more service tickets. The sales opportunity module 101 can receive a sales lead data structure 102 comprising at least one sales lead 301. The sales opportunity module 101 can use at least one qualification criterion to identify a qualified sales lead 301 to become a sales opportunity 302. The service ticket translation module 901a can select data 808 of the sales opportunity 302 for inclusion in a service ticket 303. Note that labels 901a-901c are collectively referred to as 901. The service ticket translation module 901a may translate the data 808 into the service ticket 303 while maintaining the selected data 808 of the sales opportunity 302. Note that labels 302a-302c are collectively referred to as 302. The service ticket translation module 901a may provide the service ticket 303 to a service board 401.

The sales opportunity module 101 can use at least one qualification criterion to identify a qualified sales lead 301 to become a sales opportunity 302. For example, one qualification criterion can be a minimum threshold on the number of times the sales lead 301 has been contacted, which may be derived from analyzing the Activities 701. In another example, one qualification criterion can be the existence of a completed phone call with the sales lead 301, which may be derived from analyzing the Next step 701. In still another example, one qualification criterion can be the existence of an appointment set up to contact the sales lead 301, which may be derived from analyzing the Sales Stage 701. In yet another example, one qualification criterion can be an indication that a quote is being created or has been created for the sales lead 301, which may be derived from analyzing the Quotes 701. In the preceding description, references to items 701 will be described more fully with respect to FIGS. 7A-7C.

The service ticket translation module 901a can select data 808 of the sales opportunity 302 for inclusion in a service ticket 303. For example, the service ticket translation module 901a can verify that the sales opportunity 302 has been closed before selecting data 808 from the sales opportunity 302; the verification may be derived from analyzing the Close date 701 and verifying that it has already passed. In another example, the service ticket translation module 901a can verify that required data is present in the sales opportunity 302 before selecting data 808 from the sales opportunity 302; the verification may be derived from analyzing the presence of the required data, such as the Won within Revenue 701 and verifying that it is greater than zero. In still another example, the service ticket translation module 901a can verify the consistency of data in the sales opportunity 302 before selecting data 808 from the sales opportunity 302; the verification may be analyzed by comparing relevant data in the sales opportunity 302, such as comparing the Revenue with the sum of all the Extended price within Products within Forecast 701 and verifying that they are the same. In yet another example, the service ticket translation module 901a can limit the selection of data 808 to be information that is relevant to service tickets; the limiting can include data such as the Contact information 701, and can exclude data such as the Margin 701. In the preceding description, references to items 701 will be described more fully with respect to FIGS. 7A-7C.

The service ticket translation module 901a may translate the data 808 into the service ticket 303 while maintaining the selected data 808 of the sales opportunity 302. The translation can comprise significant analysis of data. The service ticket translation module 901a may combine data from multiple sources; for example, the service ticket translation module 901a may derive the deadline for a service ticket by analyzing the Close date 701 to estimate the service start, analyzing the line items in the Quotes 701 to include any promises made to the customer, and analyzing the Inventory availability within Products within Forecast 701 to estimate the delay in procuring required parts. The service ticket translation module 901a may generate multiple service tickets 303 from a single sales opportunity 302; for example, if Products within Forecast 701 includes a reference to an email server, this can generate one service ticket 303 to install the hardware for the server, another service ticket 303 to install the operating system on the server, and still another service ticket 303 to install and configure the email server software. The service ticket translation module 901a may generate prioritization information within the service ticket 303 that may be helpful to a service manager for deciding how to schedule the service tickets 303; for example, the service ticket translation module 901a may assign a higher priority to a service ticket 303 translated from a sales opportunity 302 with a larger value of Revenue 701, and in another example, the service ticket translation module 901a may assign a higher priority to a service ticket 303 translated from a sales opportunity 302 for which the history of changes in Sales stage 701 indicate that the customer has expedited the purchase process. In the preceding description, references to items 701 will be described more fully with respect to FIGS. 7A-7C.

Figure 1B:
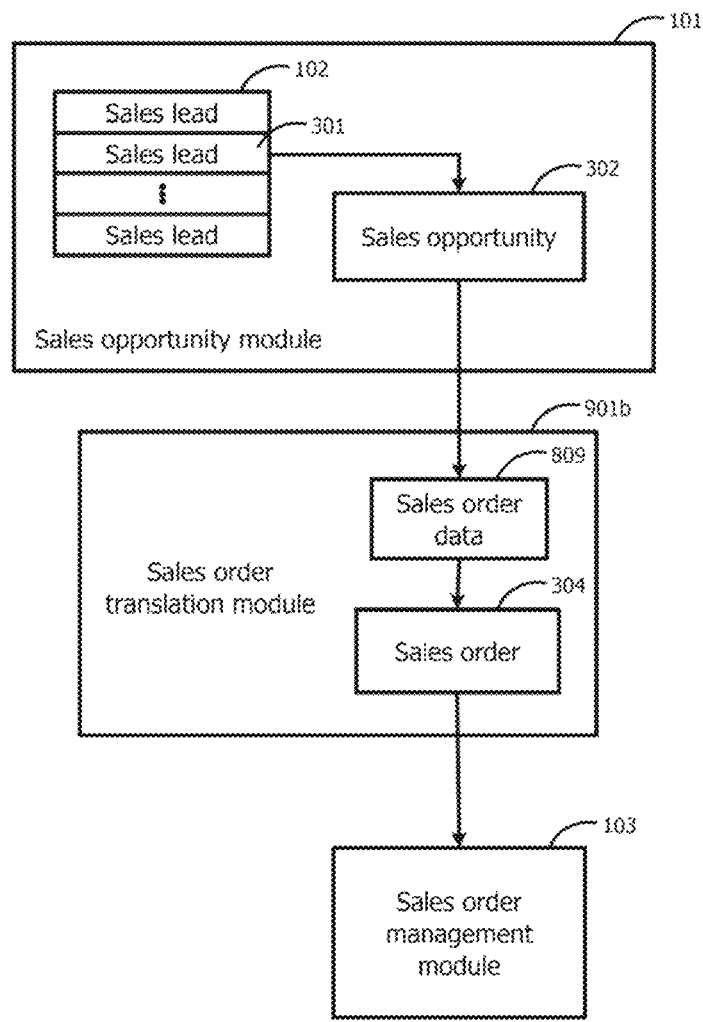
FIG. 1B is an illustrative block diagram of an embodiment of a system for converting a sales opportunity to one or more sales orders.

FIG. 1B is an illustrative block diagram of an embodiment of a system for converting sales opportunities to one or more sales orders. The sales opportunity module 101 can receive a sales lead data structure 102 comprising at least one sales lead 301. The sales opportunity module 101 can use at least one qualification criterion to identify a qualified sales lead 301 to become a sales opportunity 302. The sales order translation module 901b can select data 809 of the sales opportunity 302 for inclusion in a sales order 304. The sales order translation module 901b may translate the data 809 into the sales order 304 while maintaining the selected data 809 of the sales opportunity 302. The sales order translation module 901b may provide the sales order 304 to a sales order management module 103.

The sales opportunity module 101 can use at least one qualification criterion to identify a qualified sales lead 301 to become a sales opportunity 302. For example, one qualification criterion can be a minimum threshold on the number of times the sales lead 301 has been contacted, which may be derived from analyzing the Activities 701. In another example, one qualification criterion can be the existence of a completed phone call with the sales lead 301, which may be derived from analyzing the Next step 701. In still another example, one qualification criterion can be the existence of an appointment set up to contact the sales lead 301, which may be derived from analyzing the Sales Stage 701. In yet another example, one qualification criterion can be an indication that a quote is being created or has been created for the sales lead 301, which may be derived from analyzing the Quotes 701. In the preceding description, references to items 701 will be described more fully with respect to FIGS. 7A-7C.

The sales order translation module 901b can select data 809 of the sales opportunity 302 for inclusion in a service ticket 303. For example, the sales order translation module 901b can verify that the sales opportunity 302 has been closed before selecting data 809 from the sales opportunity 302; the verification may be derived from analyzing the Close date 701 and verifying that it has already passed. In another example, the sales order translation module 901b can verify that required data is present in the sales opportunity 302 before selecting data 809 from the sales opportunity 302; the verification may be derived from analyzing the presence of the required data, such as the Won within Revenue 701 and verifying that it is greater than zero. In still another example, the sales order translation module 901b can verify the consistency of data in the sales opportunity 302 before selecting data 809 from the sales opportunity 302; the verification may be analyzed by comparing relevant data in the sales opportunity 302, such as comparing the Revenue with the sum of all the Extended price within Products within Forecast 701 and verifying that they are the same. In yet another example, the sales order translation module 901b can limit the selection of data 809 to be information that is relevant to sales orders; the limiting can include data such as the Contact information 701, and can exclude data such as the Margin 701. In the preceding description, references to items 701 will be described more fully with respect to FIGS. 7A-7C.

The sales order translation module 901b may translate the data 809 into the sales order 304 while maintaining the selected data 809 of the sales opportunity 302. The translation can comprise significant analysis of data. The sales order translation module 901b may combine data from multiple sources; for example, the sales order translation module 901b may derive the deadline for ordering a part by analyzing the Close date 701 to estimate the start of the project, analyzing the line items in the Quotes 701 to include any promises made to the customer, and analyzing the Inventory availability within Products within Forecast 701 to estimate the delay in procuring the part. The sales order translation module 901b may generate multiple sales orders 304 from a single sales opportunity 302; for example, if Products within Forecast 701 includes parts from more than one vendor, this can generate a separate sales order 304 for each vendor. The sales order translation module 901b may generate prioritization information within the sales order 304 that may be helpful to a procurement manager for deciding how to allocate resources when supplies are limited; for example, the sales order translation module 901b may assign a higher priority to a sales order 304 translated from a sales opportunity 302 with a larger value of Revenue 701, and in another example, the sales order translation module 901b may assign a higher priority to a sales order 304 translated from a sales opportunity 302 for which the history of changes in Sales stage 701 indicate that the customer has expedited the purchase process. In the preceding description, references to items 701 will be described more fully with respect to FIGS. 7A-7C.

Figure 1C:
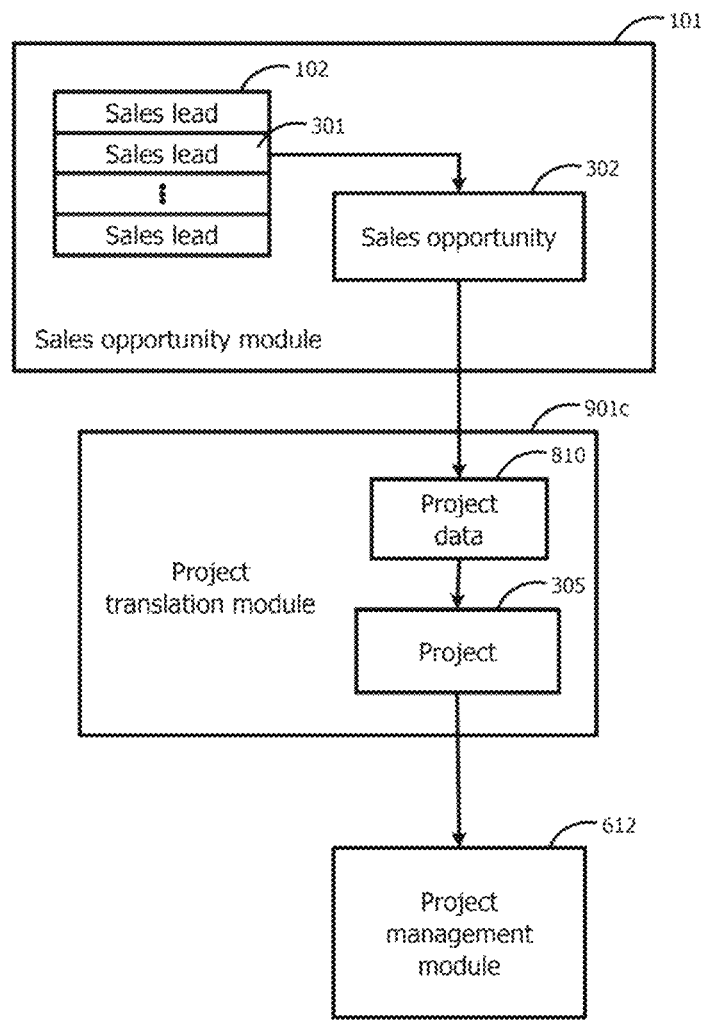
FIG. 1C is an illustrative block diagram of an embodiment of a system for converting a sales opportunity to one or more projects.

FIG. 1C is an illustrative block diagram of an embodiment of a system for converting sales opportunities to one or more projects. The sales opportunity module 101 can receive a sales lead data structure 102 comprising at least one sales lead 301. The sales opportunity module 101 can use at least one qualification criterion to identify a qualified sales lead 301 to become a sales opportunity 302. The project translation module 901c can select data 810 of the sales opportunity 302 for inclusion in a project 305. The project translation module 901c may translate the data 810 into the project 305 while maintaining the selected data 810 of the sales opportunity 302. The project translation module 901c may provide the project 305 to a project management module 612.

The sales opportunity module 101 can use at least one qualification criterion to identify a qualified sales lead 301 to become a sales opportunity 302. For example, one qualification criterion can be a minimum threshold on the number of times the sales lead 301 has been contacted, which may be derived from analyzing the Activities 701. In another example, one qualification criterion can be the existence of a completed phone call with the sales lead 301, which may be derived from analyzing the Next step 701. In still another example, one qualification criterion can be the existence of an appointment set up to contact the sales lead 301, which may be derived from analyzing the Sales Stage 701. In yet another example, one qualification criterion can be an indication that a quote is being created or has been created for the sales lead 301, which may be derived from analyzing the Quotes 701. In the preceding description, references to items 701 will be described more fully with respect to FIGS. 7A-7C.

The project translation module 901c can select data 810 of the sales opportunity 302 for inclusion in a project 305. For example, the project translation module 901c can verify that the sales opportunity 302 has been closed before selecting data 810 from the sales opportunity 302; the verification may be derived from analyzing the Close date 701 and verifying that it has already passed. In another example, the project translation module 901c can verify that required data is present in the sales opportunity 302 before selecting data 810 from the sales opportunity 302; the verification may be derived from analyzing the presence of the required data, such as the Won within Revenue 701 and verifying that it is greater than zero. In still another example, the project translation module 901c can verify the consistency of data in the sales opportunity 302 before selecting data 810 from the sales opportunity 302; the verification may be analyzed by comparing relevant data in the sales opportunity 302, such as comparing the Revenue with the sum of all the Extended price within Products within Forecast 701 and verifying that they are the same. In yet another example, the project translation module 901c can limit the selection of data 810 to be information that is relevant to projects; the limiting can include data such as the Contact information 701, and can exclude data such as the Margin 701. In the preceding description, references to items 701 will be described more fully with respect to FIGS. 7A-7C.

The project translation module 901c may translate the data 810 into the project 305 while maintaining the selected data 810 of the sales opportunity 302. The translation can comprise significant analysis of data. The project translation module 901c may combine data from multiple sources; for example, the project translation module 901c may derive the deadline for a task by analyzing the Close date 701 to estimate the project start time, analyzing the line items in the Quotes 701 to include any promises made to the customer, and using external data to estimate the work time involved in a task. The project translation module 901c may generate multiple projects 305 from a single sales opportunity 302; for example, if Products within Forecast 701 includes a reference to an e-commerce web site, this can generate one project 305 to design and implement the front-end web interface for the site, another project 305 to design and implement the database support for the site, and still another project 305 to set up the banking and security interface for the site. The project translation module 901c may generate prioritization information within the project 305 that may be helpful to a project manager for deciding how to allocate implementation resources for the project 305; for example, the project translation module 901c may assign a higher priority to a project 305 translated from a sales opportunity 302 with a larger value of Revenue 701, and in another example, the project translation module 901c may assign a higher priority to a service ticket 305 translated from a sales opportunity 302 for which the history of changes in Sales stage 701 indicate that the customer has expedited the purchase process. In the preceding description, references to items 701 will be described more fully with respect to FIGS. 7A-7C.

Access to the sales opportunity module 101, the service ticket translation module 901a, the sales order translation module 901b, the project translation module 901c, the service board 401, the sales order management module 103, and the project management module 612, as well as communication between the modules, may be through a network. The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The sales opportunity module 101 and service ticket module 102 may be configured to run on one or more servers. The one or more servers do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The system and its components, such as a sales opportunity module 101, service ticket module 102, and service ticket translation module 901a, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as the sales opportunity module, the service ticket translation module, and the service ticket module, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2A:
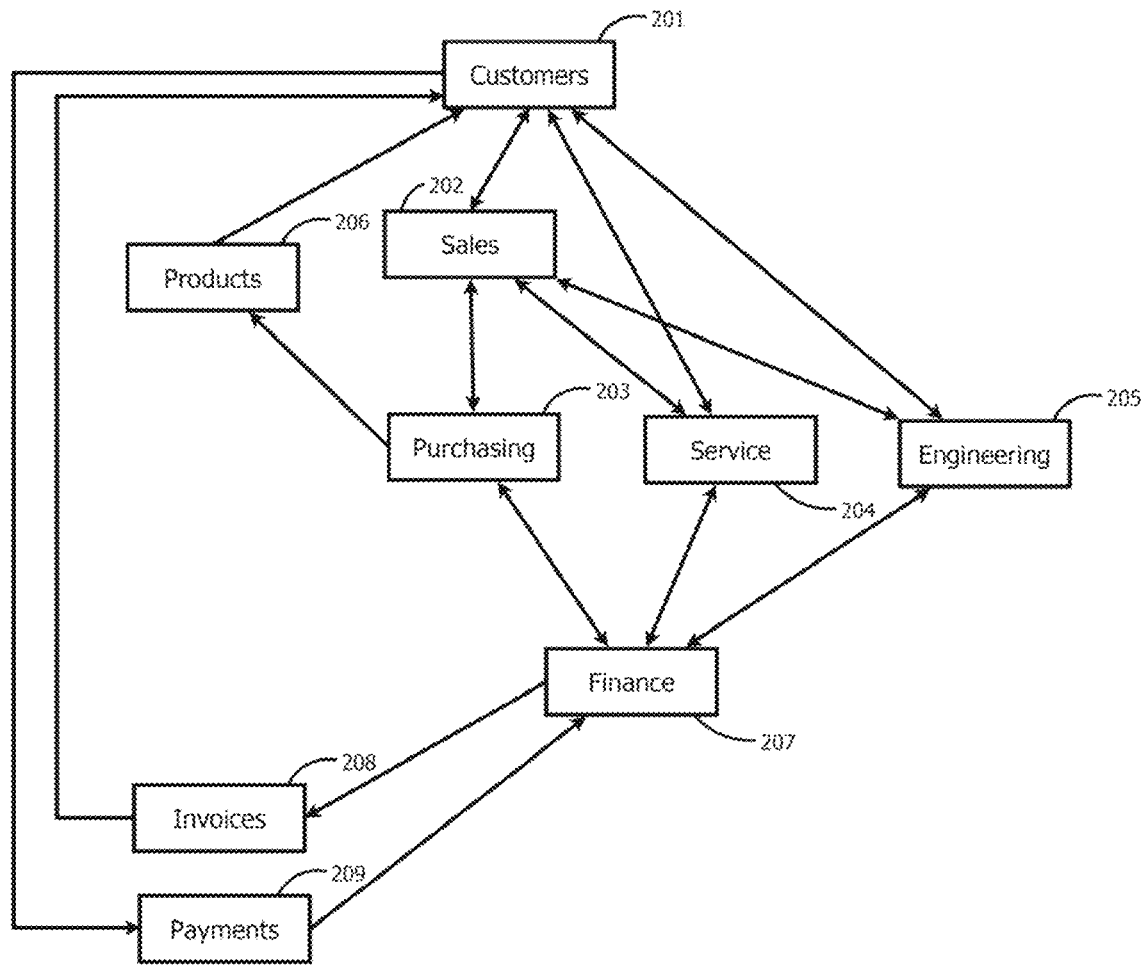
FIGS. 2A-B are illustrative block diagrams of embodiments of the interaction between customers, sales, service, purchasing, engineering, and finance.
Figure 2B:
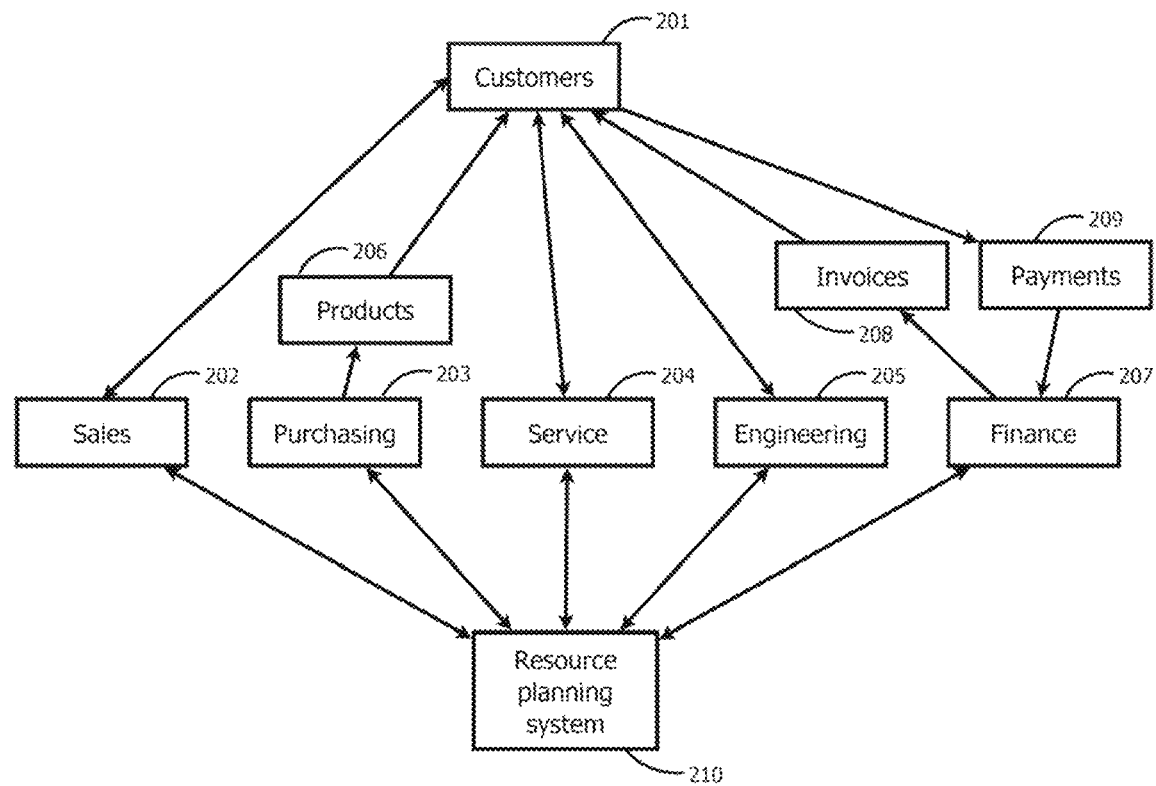

FIGS. 2A-2B are illustrative block diagrams of an embodiment of the interaction between customers, sales, service, purchasing, engineering, and finance. FIG. 2A illustrates the interaction that may happen without the use of a resource planning system. Customers 201 can interact with sales 202 to understand the product offerings and decide what is appropriate for the needs of the customers 201. Sales 202 can communicate these decisions and needs to purchasing 203, service 204, and engineering 205. Purchasing 203 can arrange for the procurement of products 206 that are delivered to the customers 201, and can also communicate the procurement to finance 207. Service 204 can work with customers 201 to provide installation, configuration, and maintenance of those products 206 at the customer site. Service 204 may need to communicate with purchasing 203 if additional products 206 are needed in order to complete the work of service 204. Service 204 can also communicate the service work to finance 207. Engineering 205 can work with customers 201 to implement custom configurations and options, and to do any kind of special work required by customers 201. Engineering 205 may need to communicate with purchasing 203 if additional products 206 are needed in order to complete the work of engineering 205. Engineering 205 can also communicate the custom work to finance 207. Finance 207 can produce invoices 208 for customers 201 indicating the reasons and amount for which the customers 201 are being billed. Finance 207 can also accept and process payments 209 from customers 201.

The communications and data storage associated with the interactions illustrated in FIG. 2A may involve many different forms and may be difficult to track. For example, sales 202 may talk with customers 201 on the telephone and make handwritten notes about the needs of customers 201. These may get transcribed into a spreadsheet that is sent to purchasing 203, and a separate email that is sent to service 204. Engineering 205 may not have convenient access to either the spreadsheet or email, which may result in some confusion and miscommunication between engineering 205 and sales 202, engineering 205 and purchasing 203, and engineering 205 and service 204. The result may be incorrect or badly timed deliveries to customers 201, which may cause dissatisfaction by customers 201 or unnecessary expenses within the organization.

FIG. 2B illustrates the same types of interactions as those illustrated by FIG. 2A, but with the use of a resource planning system 210. The use of a resource planning system 210 may make the communications and data storage in the process more uniform and easy to track. The resource planning system 210 can record the results of discussions between sales 202 and customers 201, and can also record the specific customer needs that arise. The resource planning system 210 can accept input from sales 201 and can, as a result, update the data in the resource planning system 210 as the sales process proceeds. The resource planning system 210 can also accept input from sales 202 when a sale is closed with a customer 201 and can, as a result, update the data in the resource planning system 210 to reflect the fact that the sale is closed. Once a sale is closed, the resource planning system 210 can supply information to purchasing 203 that may facilitate the procurement of products 206 associated with the sale, and also facilitate the delivery of those products 206 to the customer 201. The resource planning system 210 can accept input from purchasing 206 and can, as a result, update the data in the resource planning system 210 as the purchasing and delivery processes proceed. Similarly, once a sale is closed, and the products 206 have been delivered to the customer 201, service 204 may need to plan and deliver, to the customer 201, the installation, configuration, and maintenance required by the sale. The resource planning system 210 can accept input from service 204 and can, as a result, update the data in the resource planning system 210 as each step in the service process proceeds against the plan. Similarly, once a sale is closed, engineering 205 may need to plan and deliver, to the customer 201, the custom configuration and options required by the sale. The resource planning system 210 can accept input from engineering 205 and can, as a result, update the data in the resource planning system 210 as each step in the engineering process proceeds against the plan. During the entire process, the resource planning system 210 can supply information to finance 207 that may facilitate delivering invoices 208 to customers 201, in a timely fashion and based on products and services that the customers 201 have actually received from purchasing 203, service 204, and engineering 205. The resource planning system 210 can also accept input from finance 207 about payments 209 received from customers 201 and can, as a result, update the data in the resource planning system 210 with the status of payments 209 against invoices 208. During the entire process, the resource planning system 210 may provide better visibility of the sales process to sales 202, purchasing 203, service 204, engineering 205, and finance 207, which may result in better service to customers 201. In addition, the resource planning system 210 may provide better visibility of the processes within the organization to the management of the organization (not shown in FIG. 2A or FIG. 2B). In this way, the management may be able to identify problems, improve efficiency, lower costs, and improve customer satisfaction.

Figure 3:
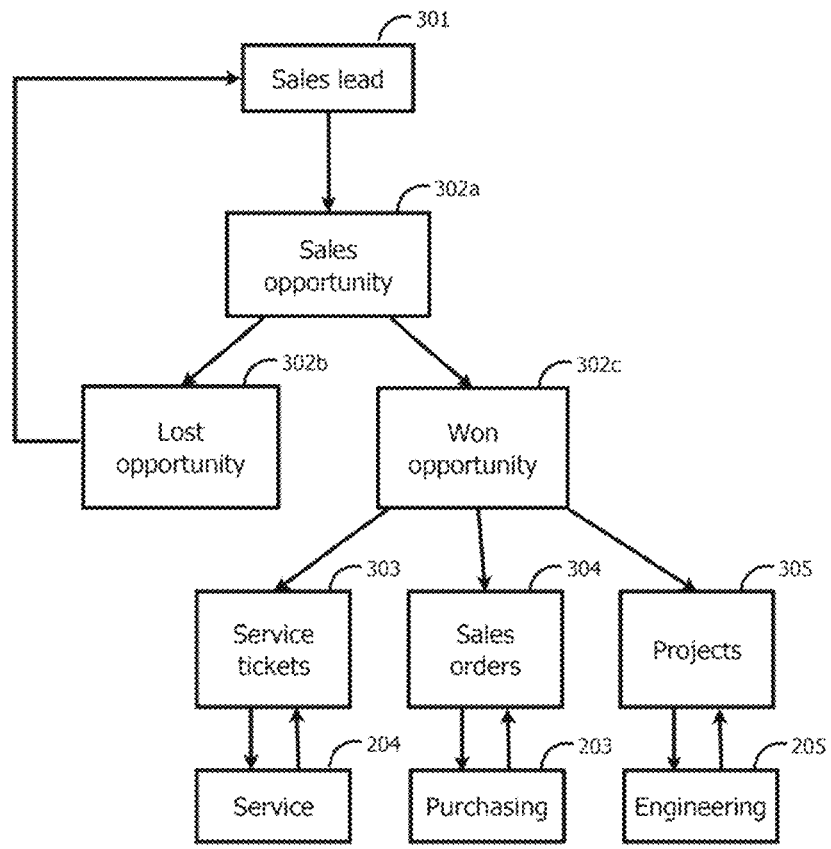
FIG. 3 is an illustrative block diagram of an embodiment of the management of sales opportunities and their handoff from sales to service, purchasing, and engineering.

FIG. 3 is an illustrative block diagram of an embodiment of the management of sales opportunities and their handoff from sales to service, purchasing, and engineering. A sales lead 301 can represent a contact that may or may not be interested in products and services. Sales leads 301 can come from multiple sources, for example, sales leads may be contacts from trade shows, contact information gathered using online search engines, or individuals who have contacted the company to ask for more information. The sales leads 301 can go through a lead qualification process that evaluates their likelihood of becoming customers. The sales leads 301 that pass certain lead qualification criteria can be treated as sales opportunities 302a. The sales staff can then pursue the sales opportunities 302a to try to close sales with the sales opportunities 302a. If the sales staff is not able to close a sale for a sales opportunity 302a, then the sales opportunity can become a lost opportunity 302b. The lost opportunity 302b may become a sales lead 301 again, if the contact involved might be interested in different products or services, or if the contact might be interested at a later time. If the sales staff can close a sale for a sales opportunity 302a, then the sales opportunity 302a can become a won opportunity 302c. After closing a sale for a sales opportunity 302, the sales staff may need to provide information about the sales opportunity 302 to service 204, purchasing 203, and engineering 205, in order to actually deliver the agreed-upon products and services described in the sales opportunity 302. The information for service 204 can be contained in service tickets 303, the information for purchasing 203 can be contained in sales orders 304, and the information for engineering 205 can be contained in projects 305. To facilitate the handoff from sales to service 204, the process of converting a won sales opportunity 302c to service tickets 303 may be partially or completely automated. Similarly, to facilitate the handoff from sales to purchasing 203, the process of converting a won sales opportunity 302c to sales orders 304 may be partially or completely automated. Similarly, to facilitate the handoff from sales to engineering 205, the process of converting a won sales opportunity 302c to projects 305 may be partially or completely automated.

Figure 4:
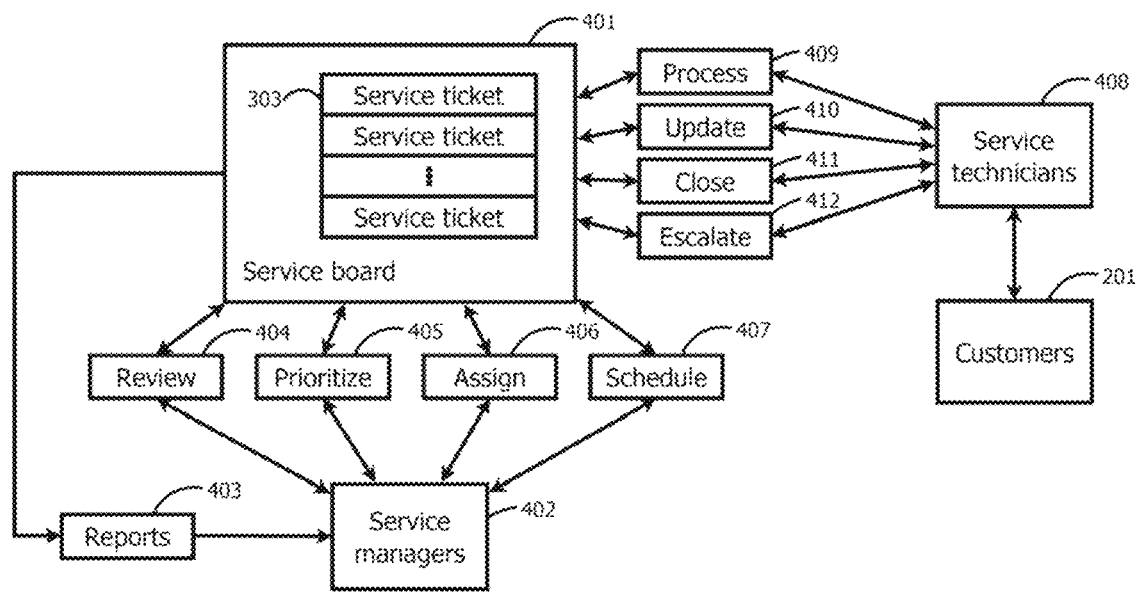
FIG. 4 is an illustrative block diagram of an embodiment of the use of service tickets.

FIG. 4 is an illustrative block diagram of an embodiment of the use of service tickets. Service tickets 303 can represent discrete work items of installation, configuration, and maintenance that need to be completed by service technicians 408 for customers 201. The service tickets 303 can be organized in a service board 401 to facilitate the creation and update of service tickets 303 by service managers 402 and service technicians 408. The service board 401 can accept input from service managers 402 or service technicians 408 and can, as a result, search, filter, organize, and display the service tickets 303. The service board 401 may be able to accept input from service managers 402 and, as a result, generate reports 403 for the service managers 402, which may improve the visibility to the service managers 402 about what is happening, and any problems that may be arising. The service board 401 can accept input from service managers 402 and can, as a result, review 404, prioritize 405, assign 406, and schedule 407 service tickets 303. Reviewing 404 a service ticket 303 can be the process of displaying all the components of the service ticket 303 to a service manager 402 and accepting input from the service manager 402 about what action (if any) should be taken relative to the service ticket 303. Prioritizing 405 a service ticket 303 can be the process of displaying the service ticket 303 to the service manager 402, relative to other service tickets 303, and accepting input from the service manager 402 about the relative importance of the service ticket 303 given the availability of resources to address the service ticket 303. Assigning 406 a service ticket 303 can be the process of accepting input from the service manager 402 about which service technician 408 should be responsible for completing the work described by the service ticket 303. Scheduling 407 a service ticket 303 can be the process of accepting input from the service manager 402 about when the assigned service technician 408 should actually do the work described by the service ticket 303.

The service board 401 can accept input from service technicians 408 and can, as a result, process 409, update 410, close 411, and escalate 412 service tickets 303. Processing 409 a service ticket 303 can be the process of displaying information about the service ticket 303 to the service technician 408, who may then use the information to guide work done at the customer 201. Updating 410 a service ticket 303 can be the process of accepting input from a service technician 408 that includes additional information about the service ticket 303, and then adding the information to the service ticket 303. For example, the additional information might be about work that was not previously known, or the additional information might be about a problem that came up during the work, or the additional information might be some information that could be helpful upon resuming work that was suspended for some reason. Closing 411 a service ticket 303 can be the process of accepting input from a service technician 408 indicating that the work on a service ticket 303 is completed, and then marking the service ticket 303 in such a way to indicate its completion. Escalating 412 a service ticket 303 can be the process of accepting input from a service technician 408 indicating that the service ticket 303 cannot be completed for some reason, marking the service ticket 303 in such a way to indicate that the service ticket 303 cannot be completed, and generating an alert for a service manager 402 about the condition.

As described with respect to FIG. 4, the service board 401 can use service tickets 303 to facilitate the management of task-oriented work for which the parameters and environment can change quickly. The service board 401 can also facilitate the management of work that is not completely defined, in that service technicians 408 may discover previously unknown constraints and conditions while working with the customer 201. The service board 401 can give the service technicians 408 a convenient way to document issues and bring the issues to the attention of a service manager 402, and continue working on other service tickets 303 in the service board 401, using the priorities 405 decided on by the service managers 402. As described above, the escalation 412 of a service ticket 303 may generate an alert for a service manager 402, which may facilitate the service managers 402 in reacting quickly and focusing on and solving high priority problems. As a result, the service board 401 can accept input from a service manager 402 to assign 406 and schedule 407 the escalated service tickets 303 as needed.

Figure 5:
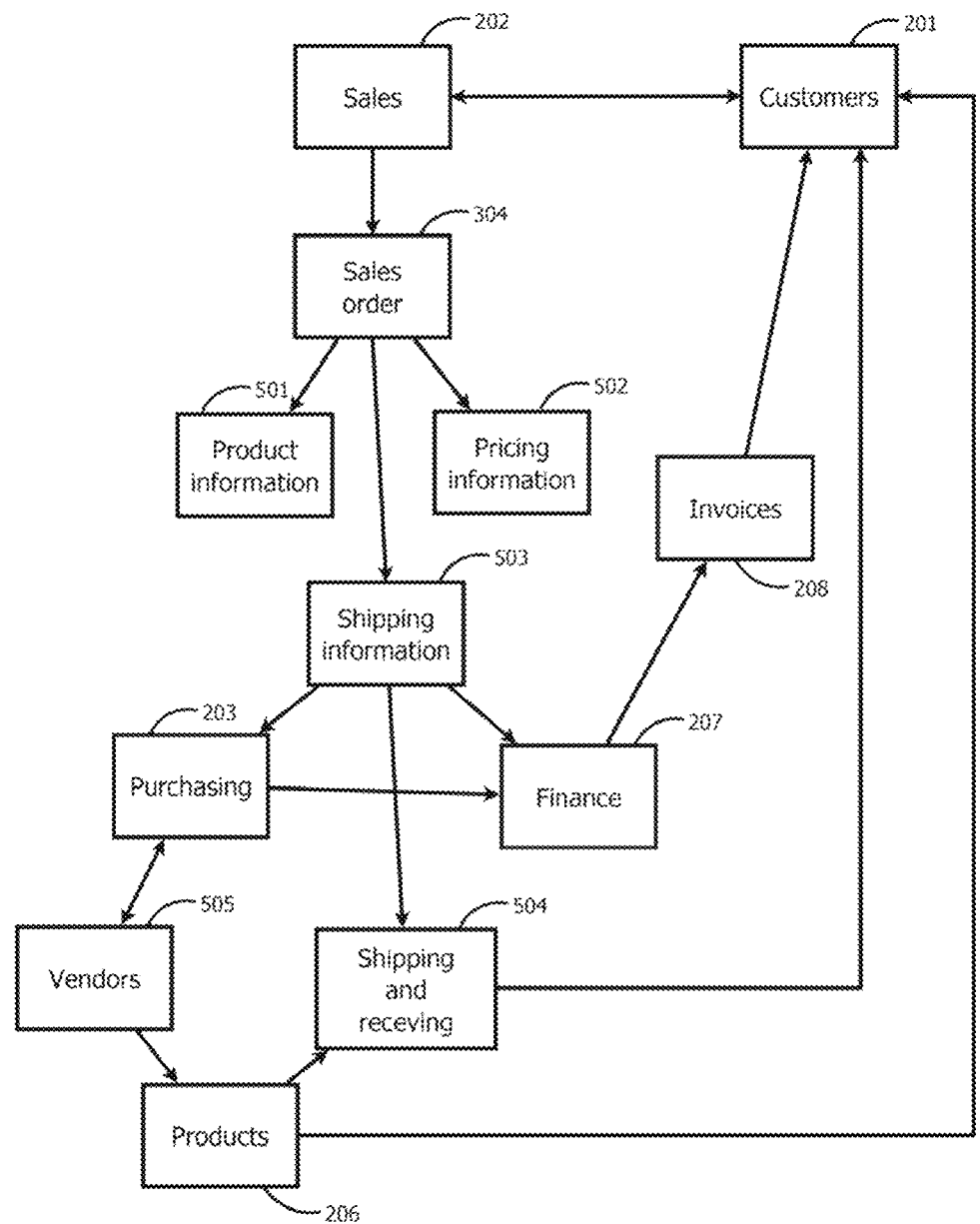
FIG. 5 is an illustrative block diagram of an embodiment of the use of sales orders.

FIG. 5 is an illustrative block diagram of an embodiment of the use of sales orders. A sales order 304 can be generated as a result of sales 202 working with customers 201 and closing a sale. The sales order 304 can provide product information 501, shipping information 503, and pricing information 502 about the sale. The product information 501 may contain information about non-service products 206 (hardware and software) in the sale that must be procured and delivered to the customer 201. The shipping information 503 may contain information about instructions and preferences that the customer 201 has regarding shipments. The pricing information 502 may contain information about the cost and sales price of non-service products 206 (hardware and software) as well as service products included in the sale, as well as pricing offers and agreements that are specific to the customer 201. The product information 501 can be provided to purchasing 203 in order to procure the products 206 from the vendors 505 that supply the products 206. The vendors 505 may deliver the products 206 directly to the customer 201 (which may be referred to as "dropshipping") using the shipping information 503. The vendors may deliver the products 206 to shipping and receiving 504, and shipping and receiving 504 may deliver the products 206 to the customer 201 using the shipping information 503. The pricing information 502 can be provided to finance 207, along with the cost information in the shipping information 503, to facilitate the process of finance 207 providing invoices 208 to the customer 201. Additionally, finance 207 may use information from purchasing 203 and shipping and receiving 504 in order to time the invoices 208 to match actual delivery of products 206 to the customer 201.

Figure 6:
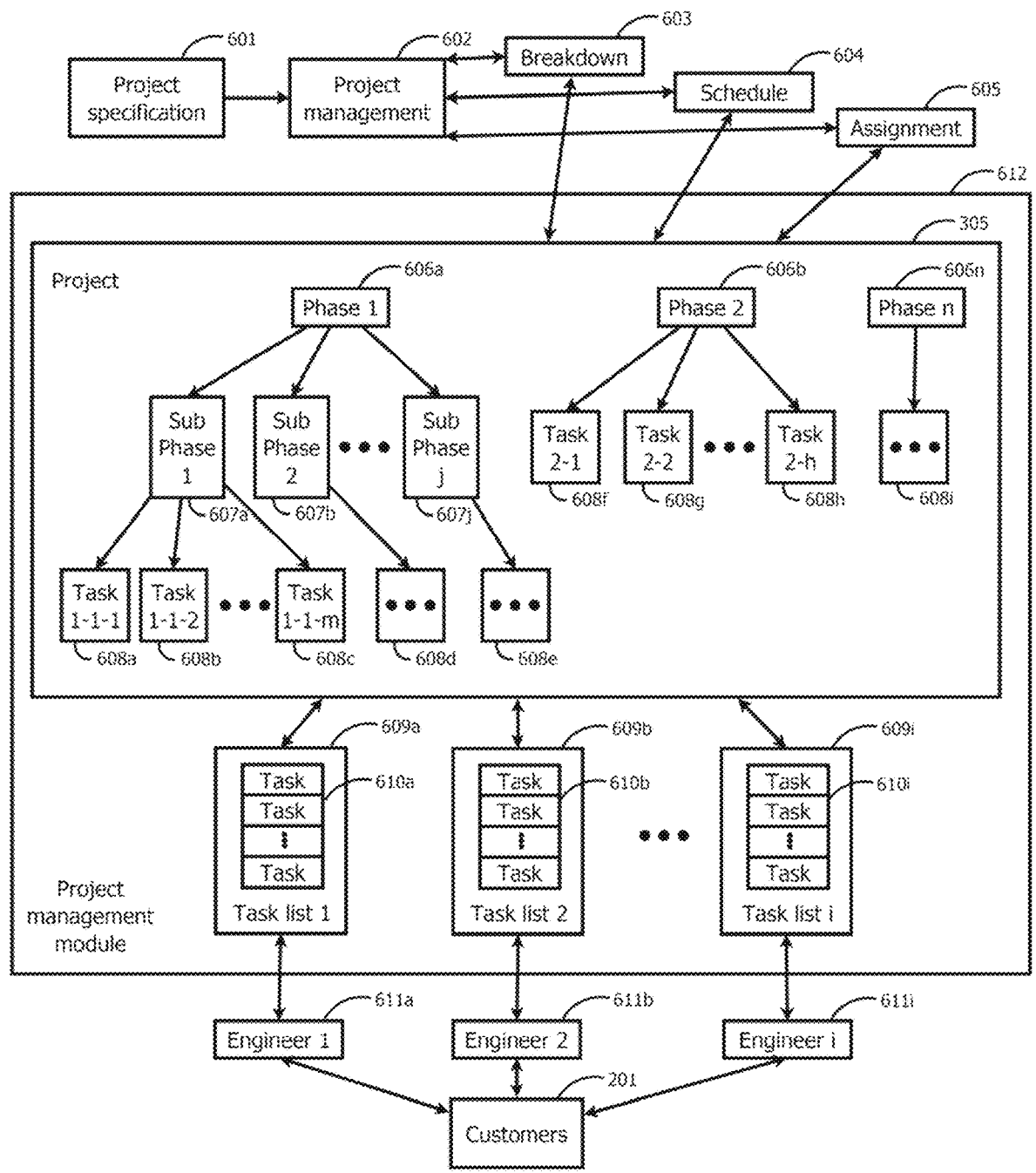
FIG. 6 is an illustrative block diagram of an embodiment of the use of projects.

FIG. 6 is an illustrative block diagram of an embodiment of the use of projects. The project management module 612 can store projects 305, as well as all the components 606-610 that make up projects 305. Note that labels 606a-606n are collectively referred to as 606, labels 607a-607j are collectively referred to as 607, labels 608a-608i are collectively referred to as 608, labels 609a-609i are collectively referred to as 609, and labels 610a-610i are collectively referred to as 610. Projects 305 can represent a plan for completing work, and can represent a breakdown 603 of the work into a series of tasks, each of which may have schedule estimates 604 for start time and end time, and an assignment 605 to be completed by a specific engineer. The project management module 612 can accept input from project management 602, who may use the overall project specification 601 for guidance, to facilitate the creation of a breakdown 603, schedule 604, and assignment 605 for the project 305. The breakdown 603 can be the organization of the project 305 into phases 606, sub-phases 607, and tasks 608. Phases 606 may be an organization of the project 305 into large sequential sections that represent conceptual stages in the project completion. For example, a software development project might have the three phases 606 of user-interface mockups, coding, and integration. Sub-phases 607 may be useful for larger projects, and can represent a further organization of a phase 606 into sequential sections that represent conceptual stages in the completion of the phase 606. Continuing the same example, the user-interface mockup phase 606 might have the three sub-phases 607 of data definition screens, data entry screens, and data browsing screens. Although FIG. 6 shows only one set of sub-phases 607a-607j making up phase 606a, it should be understood that any phase 606, and any sub-phase 607, can be broken down further into sub-phases 607; there is no limit on how far the breakdown can be taken. The project management module 612 can facilitate continuing the breakdown 603 by organizing phases 606 and sub-phases 607 into tasks 608. Tasks 608 can represent work items that can be completed sequentially in order to complete a phase 606 or a sub-phase 607. All phases 606 and sub-phases 607 may need to be broken down into tasks 608 in order to complete the breakdown 603 of a project 305 into the work that needs to be done in order to complete the project 305.

The project management module 612 can accept input from project management 602 to facilitate the creation of an assignment 605. The assignment 605 can be the selection of an engineer 611 to work on each task 608 in the project 305. Note that labels 611a-611i are collectively referred to as 611. After the assignment 605 is completed, the project management module 612 can display to each engineer 611 a task list 609 with a list 610 of tasks that the engineer 611 may be required to finish in order to complete the project 305. The project management module 612 can accept input from project management 602 to facilitate the creation of a schedule 604. The schedule 604 can be the estimation of the amount of time needed to complete each task 608, along with a start time for each task 608 such that the duration of the task 608 does not conflict with other tasks 608 assigned to the same engineer 611, and so that the duration of the task 608 fits into the work schedule of the engineer. For example, the engineer may work from 9 AM to 5 PM on weekdays, so the durations scheduled for tasks 608 must fit into those times. Once the breakdown 603, assignment 605, and scheduling 604 are completed, the project management module 612 can display to engineers 611 the work plan defined by their task lists 609, and the engineers 611 can use the work plan to work with the customer 201 to complete the project 305.

Projects 305 in the project management module 612 may have similarities with service tickets 303 on a service board 401 in that both projects and service tickets can be used for organizing and managing groups of individuals to complete work. Projects 305 may be better suited to larger amounts of work that can be structured and estimated successfully. Service tickets 303 may be better suited to work that is less structured and has fewer inter-dependencies, and also work that is more difficult to estimate because the work is affected by more unknown factors.

FIGS. 7A-7C are illustrative tables representing an embodiment of the data in a sales opportunity. Each row 701 in the table can represent information that is contained in a sales opportunity, or is referenced by a sales opportunity. For each row 701, the column 702 can represent a description of the information, the column 703 can represent whether or not the information may be converted to corresponding information in service tickets 303, the column 704 can represent whether or not the information may be converted to corresponding information in sales orders 304, and the column 705 can represent whether or not the information may be converted to corresponding information in projects 305. It should be understood that these labels apply to FIG. 7A, FIG. 7B, and FIG. 7C, and also that 701 applies to every row in the table, even though the drawing does not label every row, in the interest of clarity in the drawings. It should also be understood that the indentation of column 702 indicates a structural organization of the information, so that an indented row is contained within the previous un-indented row above the indented row. What now follows is a description of every row 701 in the table of FIG. 7A, FIG. 7B, and FIG. 7C.

The ID can be an identifier that uniquely identifies the sales opportunity, which may be used as an internal reference number. The ID may be generated automatically.

The Name can be the name of the sales opportunity, which may be selected to facilitate remembering what the sales opportunity concerns. For example, the name may be set to "Managed service and server build".

The Contact information can be information for contacting the person representing the customer in the sales opportunity. The Contact information may include name, address, phone number, email address, fax number, and so on. The Contact information may include more than one contact for a customer.

The Next step can be one of the Activities within the sales opportunity that is the next open activity that is connected with the sales opportunity.

The Close date can be an estimate of when the sales opportunity is expected to be closed, in other words, when the sales opportunity 302a is expected to change to a won opportunity 302c.

The Age can be the amount of time that has passed since the sales opportunity was first created.

The Recurring can be the total amount of recurring revenue associated with the sales opportunity. The Recurring may be computed from the total of all the agreement revenue in the sales opportunity. Any base revenue included as recurring revenue may not be added to the Recurring amount, but may instead be added to the Revenue amount described next.

The Revenue can be the total amount of revenue associated with the sales opportunity. The Won within Revenue may be the total amount of revenue for products in the sales opportunity that have been won (the sale has been closed). The Lost within Revenue may be the total amount of revenue for products in the sales opportunity that will definitely not be sold. The Open within Revenue may be the total amount of revenue for products in the sales opportunity that are not either won or lost. Revenue may be computed by adding together Won, Lost, and Open.

The Margin can be the total margin associated with the sales opportunity. The Margin may be computed by summing the Margin within Products within Forecast (described later) for all of the Products that are associated with the sales opportunity.

The Sales Stage can be a description of what stage of the sales process the sales opportunity is in. For example, the Sales Stage may be one of the values "Lead", "2. Discovery", "Qualified", "Quoted", "Committed", or "Won".

The Probability can be the estimated likelihood of closing the overall sales opportunity (converting the sales opportunity 302a to a won opportunity 302c). Probability may be expressed as a percentage likelihood.

The Rating can be an indication of the urgency of pursuing the sales opportunity. For example, the Rating may be one of the values "Hot", "Medium", or "Cold".

The Sales person can be an indication of the sales staff that is currently pursuing the sales opportunity. The Primary within Sales person may be the sales person that is working with the customer, and the Secondary within Sales person may be an inside sales person or business development person that is also working on the sales opportunity.

The PO number can be an identifier associated with the purchase order generated by the customer for the sale associated with the sales opportunity.

The Time can be the number of hours that have been entered against Activities within the sales opportunity.

The Location can be used to describe location information for the customer associated with the sales opportunity. The Location may be customizable to suit the needs of the sales organization.

The Business unit can be used to describe business unit information for the customer associated with the sales opportunity. The Business unit may be customizable to suit the needs of the sales organization.

The Group can be used to describe the group of the customer within their organization. The Group may be customizable to suit the needs of the sales organization.

The Campaign can be the marketing campaign associated with the sales opportunity. Marketing campaigns may be separate entities within the resource planning system that are used to plan, execute, and evaluate marketing activities to promote goods and services.

The Description can be a longer description of the sales opportunity with more detail than is contained in the Name. The Description may be useful to quickly inform someone who is looking at the sales opportunity for the first time.

The Type can be a way to categorize sales opportunities by the type of service or product being offered. For example, the Type may be one of the values "Managed Services", "Networking", or "Web Development".

The Status can be an indicator of the overall status of the sales opportunity. For example, the Status may be one of the values "Open", "Closed", "Won", "Lost-Competitor", "Lost-Pricing", or "Lost-Financing".

The Source can be the source of the sales opportunity, when the sales opportunity is not associated with a marketing campaign.

The Quotes can be a collection of quotes that have been prepared for the customer in order to help win and finalize the sales opportunity. It may be advantageous to treat quotes separately from Documents (described below) because the data for Quotes can be derived from the Products information (described below) in the sales opportunity.

The Notes can be a list of notes that are attached to the sales opportunity. These may be a set of unstructured, free-form notes that can be associated with the sales opportunity in order to keep track of information that is relevant to the sales opportunity during its lifetime. For example, one note may describe a particular feature of a product that is extremely important to the customer, to highlight the need for special care in providing that feature.

The Documents can be a collection of documents that are associated with the sales opportunity. For example, a document may be a scanned drawing of a wiring diagram needed for the sales opportunity. As another example, a document may be a presentation that was given to the customer in order to help win the sales opportunity.

The Name within Documents can be the title of the document.

The Filename within Documents can be the filename under which the document is stored.

The Private within Documents can indicate whether the document should be shared with customers, or whether the document should remain private within the company. For example, a document about pricing options may be kept private and not shared with customers.

The Read-only within Documents can indicate whether or not the document can be changed by someone other than the Owner of the document. For example, a document containing notes about the physical layout of the building of the customer may not be read-only, so that multiple engineers can update the document with information that the engineers find. Continuing the example, a price list may be read-only, to avoid the problems that could arise if a price were changed and then incorrectly quoted to a customer.

The Owner within Documents can indicate who originally created the document. The Owner may also be changed to indicate that the ownership of the document has been passed from the original creator to someone else.

The Updated within Documents can indicate the date and time at which the document was last updated. If the document has not been updated, the Updated may indicate the date and time at which the document was first created.

The Size within Documents can indicate the size of the document in storage (measured in bytes).

The Contacts can be a list of all contacts that are associated with the sales opportunity, including contacts that are not directly related to the customer. The Contacts may be information for contacting the person, including name, address, phone number, email address, fax number, and so on. The Contacts may include contact information for more than one person.

The Activities can be a list of the activities that are associated with the sales opportunity. Activities may be created, modified, and updated separately from sales opportunities, and may be connected to a sales opportunity.

The Status within Activities can be a description of the next step for the activity. For example, the Status may be one of the values "Open", "Do First", "1—High", "2—Medium", "3—Low", "Closed", "Closed+new followup", or "In Progress".

The Due date within Activities can be the deadline by which the activity needs to be completed.

The Contact within Activities can be information for contacting a person that is associated with the activity. The Contact may include name, address, phone number, email address, fax number, and so on. The Contact may include contact information for more than one person for the activity.

The Time within Activities can be the total time that has been entered against the activity. The Time may help to provide visibility on the amount of time spent on the activity.

The Expenses within Activities can be the total of all the expenses that have been entered against the activity. The Expenses may help to provide visibility on the amount of money spent on the activity.

The Tracks can be a list of tracks that are associated with the sales opportunity. Tracks can be used to streamline operations. Tracks can be used to create and follow repeatable processes in an organization. Tracks may be used for sales, and may also be used for any process that is repeated and completed in the same way every time. For example, tracks may be used for processes such as Client Onboarding, New Employee Onboarding, Prospect Process, Accounts Receivable/Credit Hold Process, Virtual CIO follow-up meetings/calls, or Project Quoting (hand off from Sales to Technician and back to Sales). Any process that has multiple steps and hand-offs over a period of time may be converted to a track.

The Surveys can be a list of surveys, which can be a way to gather important information about sales prospects and clients. Surveys can be used to put a process in place for gathering information. A survey can be a list of questions to be answered. The questions may be used by the salesperson as a guide to direct a conversation with a prospect or customer as part of the sales process. A different set of questions may be used by a service technician to gather information about an onsite visit as part of the service process. Surveys may help to build accountability and to document interactions with customers.

The Sales team can be a list of all internal team members assigned to the sales opportunity. The sales team may include a responsible member, a team member, or a referral source. The sales team information may include the percent for each member that is allocated for sales commissions. There may be a limit of only one responsible member.

The Forecast can represent predictions of the future financial result of the sales opportunity. The Forecast may be useful in predicting the revenue stream from sales, especially when combining the Forecast from multiple sales opportunities that are in various stages of completion.

The Products within Forecast can be a list of products that are expected to be associated with the sales opportunity. The Products may include both service and non-service (hardware and software) products.

The Product ID within Products within Forecast can be a short identifier that uniquely identifies the product. For example, the Product ID may be the Universal Product Code (UPC) of the product.

The Class within Products within Forecast can indicate the general class of the product. For example, the Class may be one of the values "Bundle", "Labor", "Inventory", "Non-inventory", or "Agreement".

The Description within Products within Forecast can be a short description of the product. For example, the Description may have a value of "HP EliteBook 8470" or "Managed Workstation".

The Quantity within Products within Forecast can be the quantity of product that is being sold to the customer.

The Unit price within Products within Forecast can be the price charged to the customer for the product. The price may be updated as part of the procurement process. The price may be updated to reflect the actual price charged to the customer once the product has been shipped.

The Extended price within Products within Forecast can be the entire price charged to the customer for the line item of the product. The Extended price may be computed as the Quantity times the Unit price. The price may be updated as part of the procurement process. The price may be updated to reflect the actual price charged to the customer once the product has been shipped.

The Unit cost within Products within Forecast can be the cost for the product charged by the vendor. The cost may be updated as part of the procurement process. The cost may be updated to reflect the actual cost charged by the vendor once the invoice from the vendor has been received.

The Margin within Products within Forecast can be the margin from selling the product. The Margin may be computed by subtracting Unit cost within Products from Unit price within Products, and then multiplying the result by Quantity within Products.

The Billable within Products within Forecast can be the billable status of the product. The Billable may indicate whether or not the product will appear on invoices sent to customers.

The Invoice number within Products within Forecast can be the identifying number of the invoice sent to the customer on which the product appears.

The Agreement within Products within Forecast can be the agreement that is associated with the product. The Agreement may be a service agreement with the customer for a recurring service product.

The Location within Products within Forecast can be the location associated with the customer that is acquiring the product.

The Group within Products within Forecast can be the business group of the customer that is acquiring the product.

The Taxable within Products within Forecast can indicate whether or not the product is taxable. For example, if the product is being sold to a customer who will re-sell the product to another entity, then the product may not be taxable.

The Drop-ship within Products within Forecast can indicate whether the product will be shipped directly from the vendor to the customer, or whether the product will first be shipped from the vendor to the company, and then shipped from the company to the customer.

The Special order within Products within Forecast can indicate whether or not the product is one that is not ordinarily handled by the vendor. The Special order may indicate that the product will require special handling or additional documentation.

The Status within Products within Forecast can indicate whether or not the product has been invoiced. For example, the Status may be one of the values "Billed" or "Unbilled".

The Unit of measure within Products within Forecast can indicate what unit is used for quoting the product. For example, the Unit of measure may be one of the values "Feet", "Hours", "Month", "Each", "Spool", or "Case".

The Cancel within Products within Forecast can indicate information about a cancellation associated with the product. The Cancelled within Cancel within Products within Forecast can indicate whether the order for the product will be cancelled. Indicating a cancellation may remove the product from any invoice but not remove the product from the sales opportunity. The Quantity within Cancel within Products within Forecast may indicate how much of the order is cancelled, for a partial cancellation. The Reason within Cancel within Products within Forecast may indicate why the order was cancelled.

The Internal notes within Products within Forecast can be a list of notes about the product that are not intended for the customer to see. For example, one of the notes might be an indication that the sales staff is willing to offer a lower price on a service agreement if the customer is willing to commit to a longer term on the agreement.

The Pick/ship within Products within Forecast can be information about the delivery process for the product. The Pick/ship may be used by shipping and receiving 504 in order to make the deliveries.

The Warehouse within Pick/ship within Products within Forecast can be the warehouse that the product will be shipped from.

The Bin within Pick/ship within Products within Forecast can be the warehouse bin that the product will be shipped from.

The Shipping method within Pick/ship within Products within Forecast can be the shipping method that will be used to deliver the product. For example, the Shipping method may have a value of "FedExTwoDay", "FedExPriority", "FedExGround", "UPSNextDay", "UPSSecondDay", "UPSGround", "CourierService", "USPSPriority", or "USPSExpress".

The Tracking number within Pick/ship within Products within Forecast can be the tracking number for the product shipment, once the shipment has been initiated.

The Picked quantity within Pick/ship within Products within Forecast can be the quantity of the product that was removed from the warehouse. The picked quantity may be the same as the quantity of the product that was ordered, or the picked quantity may be different if the lot size of the product is not a multiple of the quantity ordered.

The Shipped quantity within Pick/ship within Products within Forecast can be the quantity of the item that was shipped. The shipped quantity may be the same as the quantity of the product that was ordered, or the shipped quantity may be different for a partial shipment.

The Serial number within Pick/ship within Products within Forecast can be the serial number for the product to ship. If the product is serialized, the warehouse may be required to deliver the product associated with the specified serial number.

The Inventory availability within Products within Forecast can be information about the product if the product is one that the company keeps in inventory. The inventory availability may show what products are in stock and where the products are available.

The Location within Inventory availability within Products within Forecast can be information about the location associated with the warehouse that has inventory available for the product.

The Warehouse within Inventory availability within Products within Forecast can be information about the warehouse that has inventory available for the product.

The Bin within Inventory availability within Products within Forecast can be information about the warehouse bin that has inventory available for the product.

The On hand within Inventory availability within Products within Forecast can be the number of on hand inventory items available for the product.

The Picked within Inventory availability within Products within Forecast can be the number of inventory items already removed from the warehouse for the product.

The Available within Inventory availability within Products within Forecast can be the number of inventory items available for the product.

The Purchase order within Products within Forecast can be information about the purchase order to the vendor by the company for the product.

The PO number within Purchase order within Products within Forecast can be the identifying number of the purchase order.

The Vendor within Purchase order within Products within Forecast can be the vendor selected for the purchase order.

The PO date within Purchase order within Products within Forecast can be date that the purchase order was created.

The Status within Purchase order within Products within Forecast can be the current status of the purchase order. For example, the Status may have a value of "Open" or "Received". The Status may be set to "Open" when the purchase order is created, and may be set to "Received" when the products in the purchase order are actually received from the vendor.

The Estimates within Forecast can be a list of estimated sources of revenue associated with the sales opportunity. An estimate can represent a product, by having a Type with a value of "Product" as described below, but that is not the same as being in the list of Products within Forecast. The Estimates within Forecast can allow a sales person to quickly enter an estimate for the sales opportunity, and then later fill in the actual products using Products within Forecast.

The Type within Estimates within Forecast can indicate what sort of revenue the estimated item represents. For example, the Type may have a value of "Product", indicating that the estimated item is a non-service product, which may include hardware and software products. The Type may have a value of "Service", indicating that the estimated item is a non-recurring service product, such as the installation of a server. The Type may have a value of "Agreement", indicating that the estimated item is a recurring service product that has a service agreement with the customer, such as the maintenance on a managed server. The Type may have a value of "Recurring", indicating that the estimated item is a recurring service product that does not have a service agreement with the customer, such as anti-virus definition update that are provided by the anti-virus software vendor for a fee. The Type may have a value of "Other", indicating that the estimated item is one that does not fall into one of the other classes.

The Description within Estimates within Forecast can be a short description of the estimated item. For example, the Description may have a value of "HP EliteBook 8470" or "Managed Workstation".

The Revenue within Estimates within Forecast can be the forecasted revenue for the estimated item.

The Cost within Estimates within Forecast can be the forecasted costs associated with the estimated item.

The Margin within Estimates within Forecast can be the forecasted margin achieved for the estimated item. The Margin may be the Revenue minus the Cost within Estimates within Forecast for the estimated item.

The Probability within Estimates within Forecast can be the estimated likelihood of achieving the estimated item, expressed as a percentage. The Probability may be used to fine tune the expected revenue from the sales opportunity.

The Status within Estimates within Forecast can be the current status of the estimated item. For example, the Status may be one of the values "Open", "Closed", "Won", "Snoozed", "Lost-Competitor", "Lost-Pricing", or "Lost-Financing".

The Include within Estimates within Forecast can indicate whether or not to include the estimated item in computations of revenue estimates for the forecast. The Include may indicate whether or not the estimated item is included in the computation of Revenue within the sales opportunity.

Figure 8:
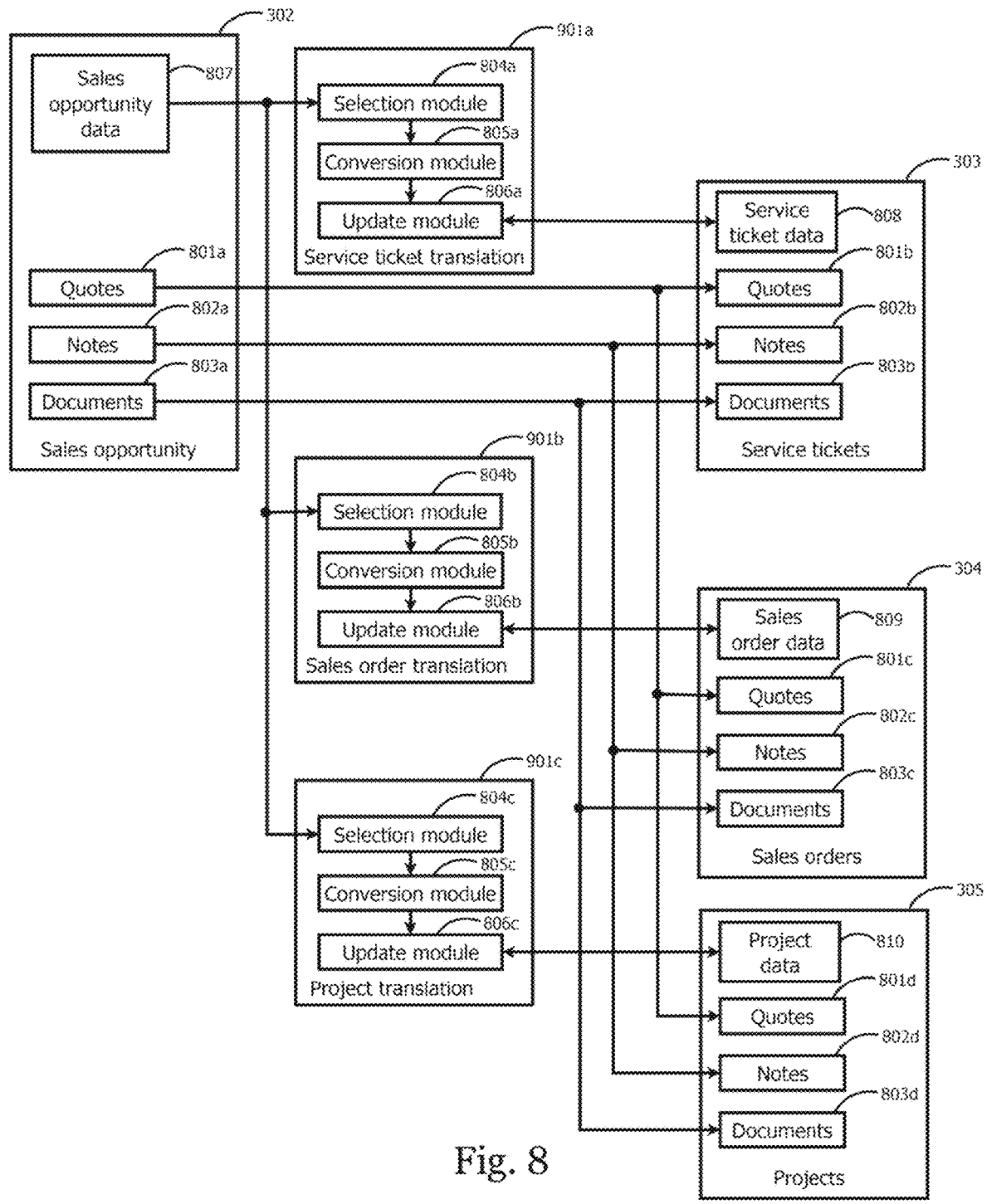
FIG. 8 is an illustrative block diagram of an embodiment of the conversion of a sales opportunity to service tickets, sales orders, and projects.

FIG. 8 is an illustrative block diagram of an embodiment of a system for converting a sales opportunity to service tickets, sales orders, and projects. The system can contain a sales opportunity 302, a service ticket translation module 901a, a sales order translation module 901b, a project translation module 901c, service tickets 303, sales orders 304, and projects 305. The sales opportunity 302 can contain sales opportunity data 807, which can be a collection of the information represented by 701 in FIGS. 7A-7C. A service ticket translation module 901a can use a selection module 804a to select some or all of the sales opportunity data 807 for conversion to service tickets 303. Note that labels 804a-804c are collectively referred to as 804. The service ticket translation module 901a can then use a conversion module 805a to convert the selected data to the proper form for service tickets 303, and can then use an update module 806a to update the service ticket data 808 within the service tickets 303 with information from the sales opportunity data 807. Note that labels 805a-805c are collectively referred to as 805, and labels 806a-806c are collectively referred to as 806.

Similarly, a sales order translation module 901b can use a selection module 804b to select some or all of the sales opportunity data 807 for conversion to sales orders 304. The sales order translation module 901b can then use a conversion module 805b to convert the selected data to the proper form for sales orders 304, and can then use an update module 806b to update the sales order data 809 within the sales orders 304 with information from the sales opportunity data 807.

Similarly, a project translation module 901c can use a selection module 804c to select some or all of the sales opportunity data 807 for conversion to projects 305. The project translation module 901c can then use a conversion module 805c to convert the selected data to the proper form for projects 305, and can then use an update module 806c to update the project data 810 within the projects 305 with information from the sales opportunity data 807.

As described with respect to FIGS. 7A-7C, a sales opportunity 302 can have quotes 801a, notes 802a, and documents 803a associated with the sales opportunity 302. Note that labels 801a-801d are collectively referred to as 801, labels 802a-802d are collectively referred to as 802, and labels 803a-803d are collectively referred to as 803. When a sales opportunity 302 is converted to service tickets 303, all of the information associated with the sales opportunity may also need to be available from the service tickets 303, so that the service managers 402 and service technicians 408 can have as much information as possible to decide on the best way to manage and process the service tickets 303. To facilitate the availability of the information, the conversion of a sales opportunity 302 to service tickets 303 can include copying the quotes 801a associated with the sales opportunity 302 into quotes 801b associated with the service tickets 303, copying the notes 802a associated with the sales opportunity 302 into notes 802b associated with the service tickets 303, and copying the documents 803a associated with the sales opportunity 302 into documents 803b associated with the service tickets 303. Similarly, when a sales opportunity 302 is converted to sales orders 304, all of the information associated with the sales opportunity may also need to be available from the sales orders 304, so that purchasing 203, shipping and receiving 504, and finance 207 can have as much information as possible to decide on the best way to manage and process the sales orders 304. To facilitate the availability of the information, the conversion of a sales opportunity 302 to sales orders 304 can include copying the quotes 801a associated with the sales opportunity 302 into quotes 801c associated with the sales orders 304, copying the notes 802a associated with the sales opportunity 302 into notes 802c associated with the sales orders 304, and copying the documents 803a associated with the sales opportunity 302 into documents 803c associated with the sales orders 304. Similarly, when a sales opportunity 302 is converted to projects 305, all of the information associated with the sales opportunity may also need to be available from the projects 305, so that project management 602 and engineers 611 can have as much information as possible to decide on the best way to manage and implement the projects 305. To facilitate the availability of the information, the conversion of a sales opportunity 302 to projects 305 can include copying the quotes 801a associated with the sales opportunity 302 into quotes 801d associated with the projects 305, copying the notes 802a associated with the sales opportunity 302 into notes 802d associated with the projects 305, and copying the documents 803a associated with the sales opportunity 302 into documents 803d associated with the projects 305.

Figure 9:
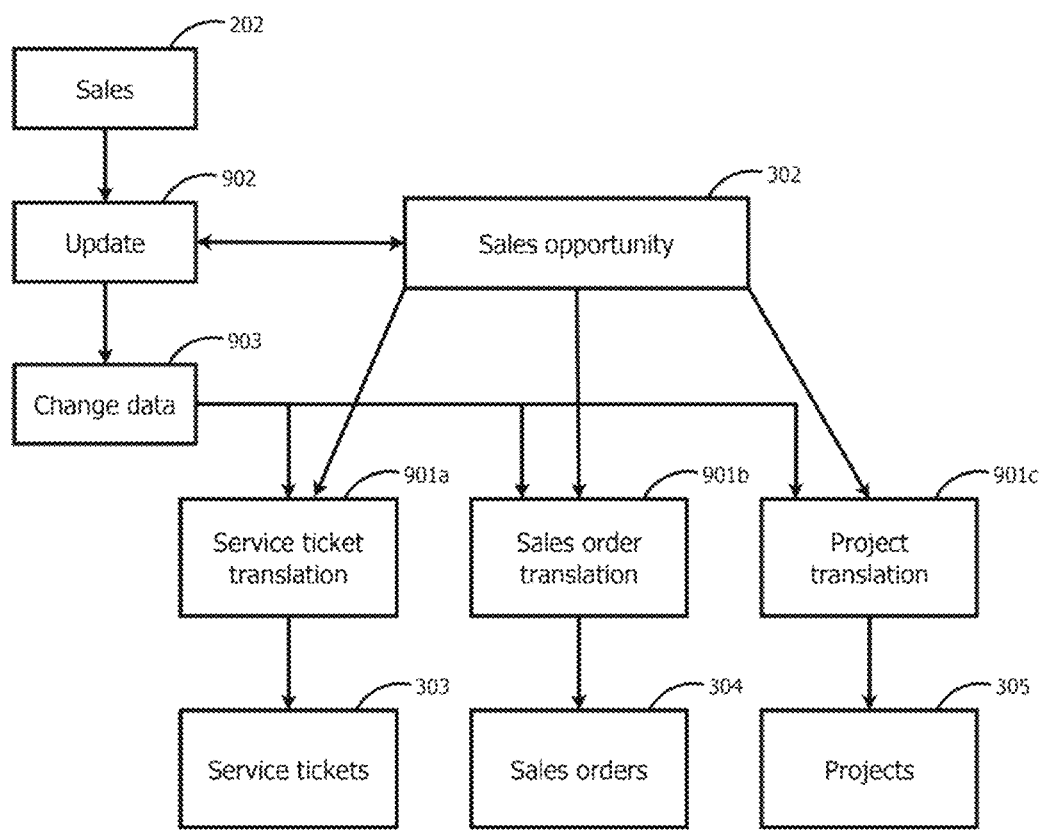
FIG. 9 is an illustrative block diagram of an embodiment of updating a sales opportunity.

FIG. 9 is an illustrative block diagram of an embodiment of updating a sales opportunity. An update module 902 may accept input from sales 202 and, as a result, change a sales opportunity 302 that has already been converted by the service ticket translation 901a into service tickets 303. The service tickets 303 may need to be changed to reflect the changes in the sales opportunity 302, so that the service managers 402 and service technicians 408 can be aware of the changes that have been made in the sales opportunity 302. To facilitate the change, the update module 902 can generate change data 903 that represents the changes made to the sales opportunity 302, and the service ticket translation module 901a can process the change data 903 to make the same changes to the service tickets 303. Similarly, the sales orders 304 may need to be changed to reflect the changes in the sales opportunity 302, so that purchasing 203, shipping and receiving 504, and finance 207 can be aware of the changes that have been made in the sales opportunity 302. To facilitate the change, the update module 902 can generate change data 903 that represents the changes made to the sales opportunity 302, and the sales order translation module 901b can process the change data 903 to make the same changes to the sales orders 304. Similarly, the projects 305 may need to be changed to reflect the changes in the sales opportunity 302, so that project management 602 and engineers 611 can be aware of the changes that have been made in the sales opportunity 302. To facilitate the change, the update module 902 can generate change data 903 that represents the changes made to the sales opportunity 302, and the project translation module 901c can process the change data 903 to make the same changes to the projects 305.

Figure 10:
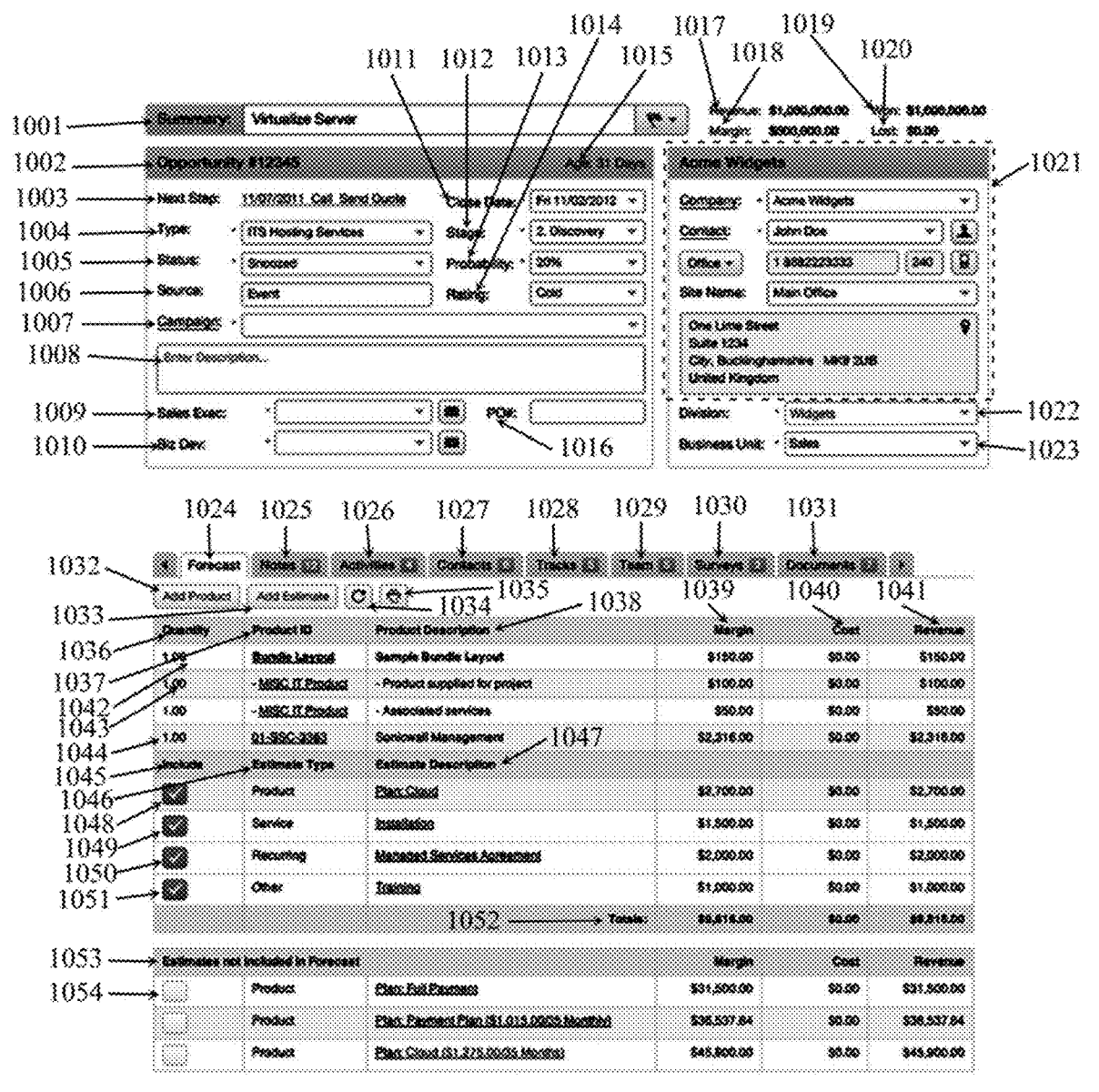

FIG. 10 is an illustrative example of an embodiment of a user interface for creating and updating a sales opportunity. The interface can identify 1002 the sales opportunity and include its reference identifier, corresponding to ID for the sales opportunity as described with respect to FIGS. 7A-7C. The interface can present a number of fields, tabs, columns, rows, and controls 1001-1054 that can be viewed and modified to manage the creation and update of the sales opportunity.

The Summary field 1001 can correspond to Name for the sales opportunity as described with respect to FIGS. 7A-7C.

The Next Step field 1003 can correspond to Next step for the sales opportunity as described with respect to FIGS. 7A-7C.

The Type field 1004 can correspond to Type for the sales opportunity as described with respect to FIGS. 7A-7C.

The Status field 1005 can correspond to Status for the sales opportunity as described with respect to FIGS. 7A-7C.

The Source field 1006 can correspond to Source for the sales opportunity as described with respect to FIGS. 7A-7C.

The Campaign field 1007 can correspond to Campaign for the sales opportunity as described with respect to FIGS. 7A-7C.

The Enter Description field 1008 can correspond to Description for the sales opportunity as described with respect to FIGS. 7A-7C.

The Sales Exec field 1009 can correspond to Primary within Sales person for the sales opportunity as described with respect to FIGS. 7A-7C.

The Biz Dev field 1010 can correspond to Secondary within Sales person for the sales opportunity as described with respect to FIGS. 7A-7C.

The Close Date field 1011 can correspond to Close date for the sales opportunity as described with respect to FIGS. 7A-7C.

The Stage field 1012 can correspond to Sales Stage for the sales opportunity as described with respect to FIGS. 7A-7C.

The Probability field 1013 can correspond to Probability for the sales opportunity as described with respect to FIGS. 7A-7C.

The Rating field 1014 can correspond to Rating for the sales opportunity as described with respect to FIGS. 7A-7C.

The Age field 1015 can correspond to Age for the sales opportunity as described with respect to FIGS. 7A-7C.

The PO #field 1016 can correspond to PO number for the sales opportunity as described with respect to FIGS. 7A-7C.

The Revenue field 1017 can correspond to Revenue for the sales opportunity as described with respect to FIGS. 7A-7C.

The Margin field 1018 can correspond to Margin for the sales opportunity as described with respect to FIGS. 7A-7C.

The Won field 1019 can correspond to Won within Revenue for the sales opportunity as described with respect to FIGS. 7A-7C.

The Lost field 1020 can correspond to Lost within Revenue for the sales opportunity as described with respect to FIGS. 7A-7C.

The Company, Contact, Phone pulldown (shown as "Office"), Site Name, and Address fields indicated by 1021 can correspond to Contact information for the sales opportunity as described with respect to FIGS. 7A-7C.

The Division field 1022 can correspond to Location for the sales opportunity as described with respect to FIGS. 7A-7C.

The Business Unit field 1023 can correspond to Business unit for the sales opportunity as described with respect to FIGS. 7A-7C.

The lower section of the interface in FIG. 10 is a tabbed interface in which the end user can select a tab 1024-1031 to display and modify information in the sales opportunity.

The Forecast tab 1024 can display, edit, and print the revenue forecasted for the sales opportunity. The forecast may be updated using a quoting tool.

The Notes tab 1025 can display, edit, and create notes that are associated with the sales opportunity. Notes were previously described with respect to FIGS. 7A-7C.

The Activities tab 1026 can display, edit, and create activities that are associated with the sales opportunity. Activities were previously described with respect to FIGS. 7A-7C.

The Contacts tab 1027 can display, edit, and create contacts that are associated with the sales opportunity. Contacts were previously described with respect to FIGS. 7A-7C.

The Tracks tab 1028 can display, edit, and create tracks that are associated with the sales opportunity. Tracks may automatically be added to a sales opportunity based on the marketing campaign selected for the sales opportunity. Tracks were previously described with respect to FIGS. 7A-7C.

The Team tab 1029 can display internal team members assigned to the sales opportunity. Each team member may be identified as being a responsible member or a referral source. Each team member may also be allocated a percentage for sales commissions. There may be a restriction that only one team member can be marked as the responsible member for the sales opportunity.

The Surveys tab 1030 can display, edit, and create surveys that are associated with the sales opportunity. Surveys were previously described with respect to FIGS. 7A-7C.

The Documents tab 1031 can display, delete, upload, create a link for, and download documents that are associated with the sales opportunity. Documents can be quickly uploaded by dragging and dropping a document on the local device into the white space of the Documents tab 1031. Documents were previously described with respect to FIGS. 7A-7C.

The lower section of the interface in FIG. 10 shows the Forecast tab 1024 selected. The display has three sections: a set of controls 1032-1035 for managing the forecast, display elements 1036-1052 associated with products and estimates in the forecast, and display elements 1053-1054 associated with estimates not included in the forecast.

The forecast can include both products 1036-1044 and estimates 1045-1051. The products 1036-1044 may be specific products that are known to be likely to be required for the sales opportunity. The detail listing of these products may make revenue estimates for the sales opportunity more accurate, and may allow generating detailed quotes for the customer. The estimates 1045-1051 may allow earlier and somewhat less accurate revenue estimates for the sales opportunity before the actual products are detailed.

Control 1032 can allow adding a new product to the forecast. Control 1033 can allow adding a new estimate to the forecast. Control 1034 can update the display to incorporate any changes that have been made since the last display operation. Control 1035 can print the display in a printer-friendly format.

The products in the forecast for the sales opportunity can be listed one per line 1042-1044. A line 1044 can contain a single product, or a line 1042 can contain a bundle, which can contain products within the bundle that are shown on a line 1043. It should be understood that bundles can also contain other bundles, even though this is not illustrated in FIG. 10.

For each product line 1042-1044, columns 1036-1041 can show information about the product. The information that appears in the Quantity column 1036 can correspond to Quantity within Products within Forecast for the product in the sales opportunity as described with respect to FIGS. 7A-7C. The information that appears in the Product ID column 1037 can correspond to Product ID within Products within Forecast for the product in the sales opportunity as described with respect to FIGS. 7A-7C. The information that appears in the Product Description column 1038 can correspond to Description within Products within Forecast for the product in the sales opportunity as described with respect to FIGS. 7A-7C. The information that appears in the Margin column 1039 can correspond to Margin within Products within Forecast for the product in the sales opportunity as described with respect to FIGS. 7A-7C. The information that appears in the Cost column 1040 can correspond to Quantity times Unit cost within Products within Forecast for the product in the sales opportunity as described with respect to FIGS. 7A-7C. The information that appears in the Revenue column 1041 can correspond to Extended price within Products within Forecast for the product in the sales opportunity as described with respect to FIGS. 7A-7C.

For each estimate line 1049-1052, columns 1045-1047 and 1039-1041 can show information about the estimate.

The information that appears in the Include column 1045 can correspond to Include within Estimates within Forecast for the estimate in the sales opportunity as described with respect to FIGS. 7A-7C. The information that appears in the Estimate Type column 1046 can correspond to Type within Estimates within Forecast for the estimate in the sales opportunity as described with respect to FIGS. 7A-7C. The information that appears in the Estimate Description column 1047 can correspond to Description within Estimates within Forecast for the estimate in the sales opportunity as described with respect to FIGS. 7A-7C. The information that appears in the Margin column 1039 can correspond to Margin within Estimates within Forecast for the estimate in the sales opportunity as described with respect to FIGS. 7A-7C. The information that appears in the Cost column 1040 can correspond to Cost within Estimates within Forecast for the estimate in the sales opportunity as described with respect to FIGS. 7A-7C. The information that appears in the Revenue column 1041 can correspond to Revenue within Estimates within Forecast for the estimate in the sales opportunity as described with respect to FIGS. 7A-7C.

The Totals line 1052 can be a sum of the values for all products and estimates in columns 1039-1041.

The Estimates not Included in Forecast section 1053 can be composed the same way as the estimates section, with lines 1054 in the Estimates not Included in Forecast section corresponding to lines 1048-1051 for the estimates, with the exception that Include is not set for these estimates. The Estimates not Included in Forecast section may provide a way for the sales staff to make a record of estimated items for which a decision is being postponed.

Figure 11:
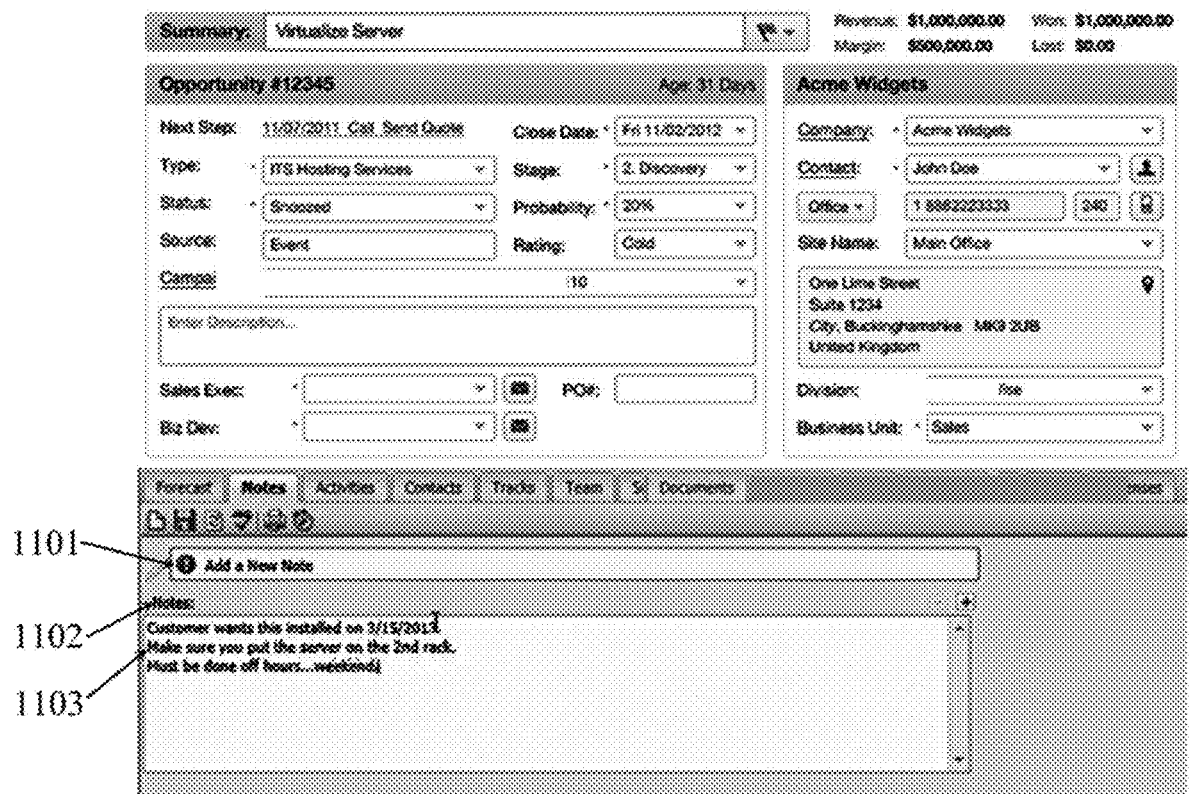
FIG. 11 is an illustrative example of an embodiment of a user interface for managing the notes associated with a sales opportunity.

FIG. 11 is an illustrative example of an embodiment of a user interface for managing the notes associated with a sales opportunity. The upper section of the interface in FIG. 11 is similar to the upper section of the interface in FIG. 10, and therefore a detailed description is not repeated here. The lower section of the interface in FIG. 11 shows the Notes tab 1025 selected. The control 1101 can be selected to add a new note to the sales opportunity. The header 1102 indicates that the notes associated with the sales opportunity are being displayed. The notes are displayed in the text control 1103, where the notes can also be edited to add, update, or delete notes.

Figure 12:
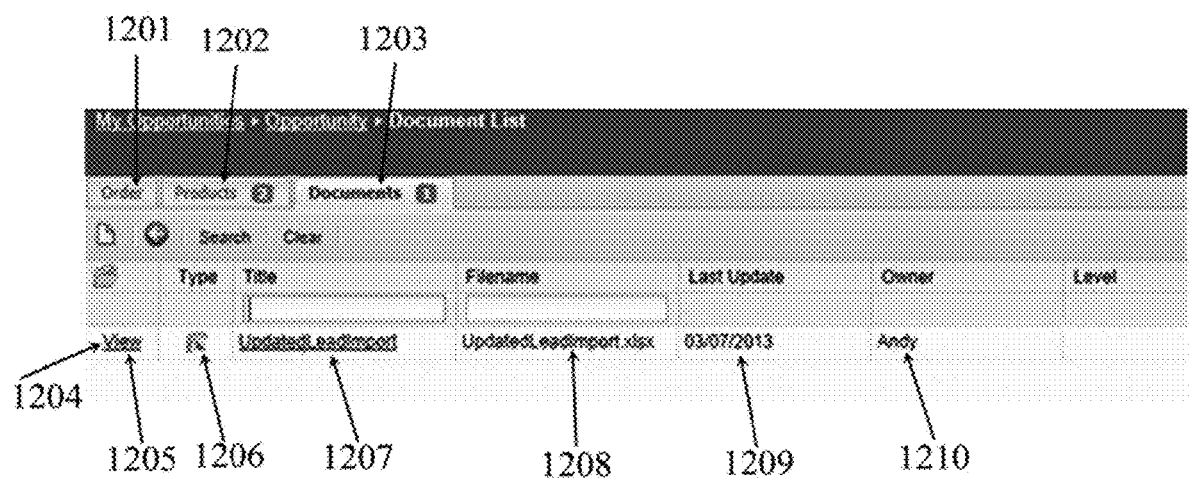
FIG. 12 is an illustrative example of an embodiment of a user interface for managing the documents associated with a sales opportunity.

FIG. 12 is an illustrative example of an embodiment of a user interface for managing the documents associated with a sales opportunity. The interface is a tabbed display with tabs 1201-1203 that can control what information is displayed.

The Order tab 1201 can display the sales order generated from the sales opportunity.

The Products tab 1202 can display a list of products associated with the sales opportunity.

The Documents tab 1203, which is shown selected in FIG. 12, can display a list of documents associated with the sales opportunity. A line 1204 can represent a single document associated with the sales opportunity. Within the line 1204, the columns 1205-1210 can represent information about the product.

The Link column 1205 can present a link to view the document online in the browser.

The Type column 1206 can display an icon that represents the type of the document, such as a text file, Microsoft Word document, Adobe PDF document, and so on. The type of the document may be determined using part of Filename within Documents for the sales opportunity as described with respect to FIGS. 7A-7C.

The Title column 1207 can correspond to Name within Documents for the sales opportunity as described with respect to FIGS. 7A-7C.

The Filename column 1208 can correspond to Filename within Documents for the sales opportunity as described with respect to FIGS. 7A-7C.

The Last Update column 1209 can correspond to Updated within Documents for the sales opportunity as described with respect to FIGS. 7A-7C.

The Owner column 1210 can correspond to Owner within Documents for the sales opportunity as described with respect to FIGS. 7A-7C.

FIGS. 13A-13E are illustrative examples of an embodiment of a user interface for converting a sales opportunity to one or more service tickets, converting a sales opportunity to one or more sales orders, and converting a sales opportunity to one or more projects. The user interface is shown as a "wizard" with five steps illustrated in FIG. 13A, FIG. 13B, FIG. 13C, FIG. 13D, and FIG. 13E.

Figure 13A:
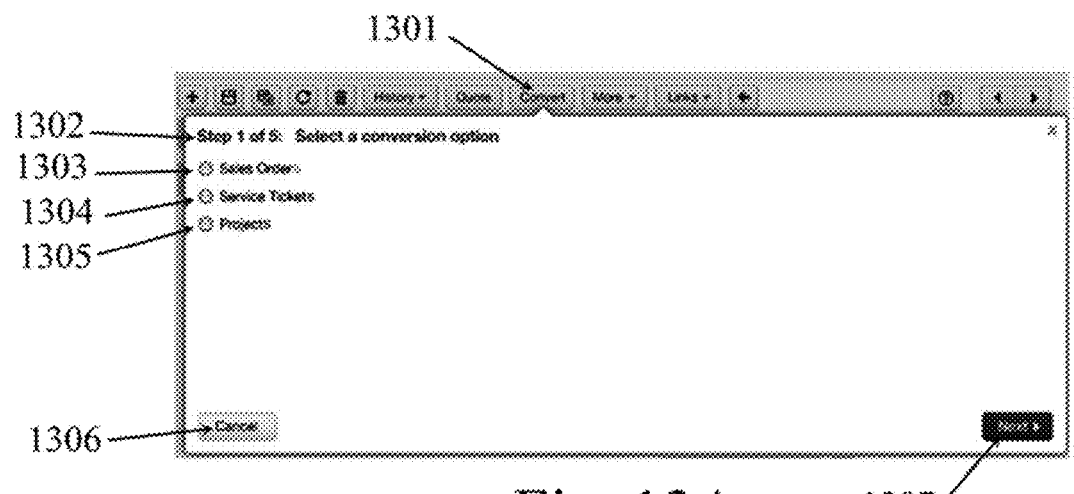
FIGS. 13A-E are illustrative examples of embodiments of user interfaces for converting a sales opportunity to one or more service tickets, converting a sales opportunity to one or more sales orders, and converting a sales opportunity to one or more projects.

FIG. 13A is an illustrative example of an embodiment of the first step of a wizard for converting a sales opportunity to one or more service tickets, converting a sales opportunity to one or more sales orders, and converting a sales opportunity to one or more projects. The Convert control 1301 can invoke the wizard and start the process. The header 1302 can indicate that the first step of the wizard is to select the type of conversion. Option 1303 can allow the selection of converting the sales opportunity to one or more sales orders. Option 1304 can allow the selection of converting the sales opportunity to one or more service tickets. Option 1305 can allow the selection of converting the sales opportunity to one or more projects. The Cancel control 1306 can allow cancelling the process without taking any action. The Next control 1307 can proceed to the next step of the wizard as illustrated by FIG. 13B.

Figure 13B:
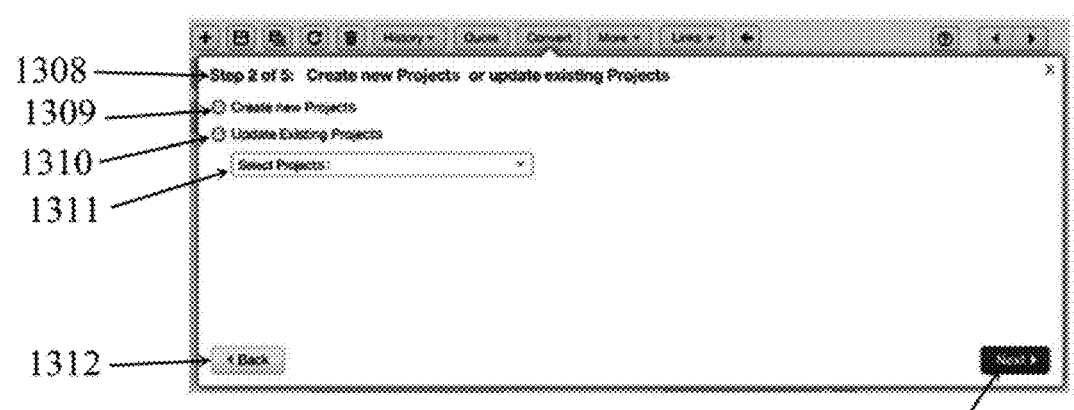

FIG. 13B is an illustrative example of an embodiment of the second step of a wizard for converting a sales opportunity to one or more service tickets, converting a sales opportunity to one or more sales orders, and converting a sales opportunity to one or more projects. The header 1308 can indicate that the second step of the wizard is to select whether the conversion will create a new set of outputs or update an existing set. By way of example, FIG. 13B shows the header for a conversion to one or more projects which may have been selected using option 1305 in FIG. 13A. It should be understood that a similar display can be shown for conversion to one or more sales orders, or conversion to one or more service tickets. Option 1309 can allow the selection of creating new projects from the sales opportunity. Option 1310 can allow the selection of updating existing projects from the sales opportunity. Selection control 1311 can allow the selection of the existing projects if option 1310 is selected. The Back control 1312 can allow returning to the previous step of the wizard as illustrated in FIG. 13A. The Next control 1313 can proceed to the next step of the wizard as illustrated by FIG. 13C.

Figure 13C:
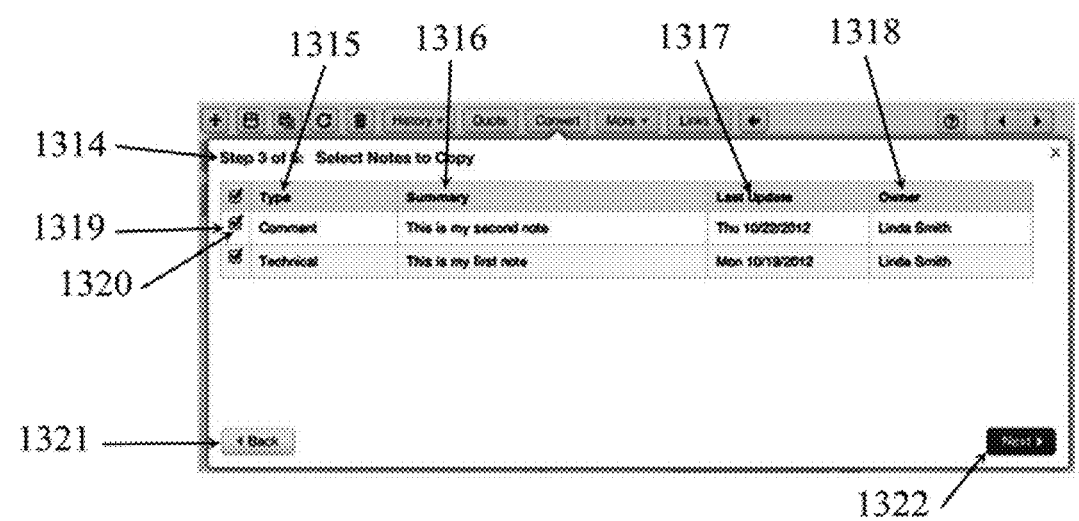

FIG. 13C is an illustrative example of an embodiment of the third step of a wizard for converting a sales opportunity to one or more service tickets, converting a sales opportunity to one or more sales orders, and converting a sales opportunity to one or more projects. The header 1314 can indicate that the third step of the wizard is to select which notes in the sales opportunity will be included in the conversion. Notes were previously described in more detail with respect to FIGS. 7A-7C. The notes in the sales opportunity can be listed one per line 1319. Each line can have columns 1315-1318 that may help identify the notes. The information in the Type column 1315 can represent what type of information the note represents. For example, the Type column 1315 can have a value of "Comment" or "Technical". The information in the Summary column 1316 can represent the text of the note or an abbreviated version of that text. The information in the Last Update column 1317 can represent the most recent date and time when the note was updated. The information in the Owner column 1318 can represent the person who created the note. Each note can have a selection control 1320 that indicates whether or not the note will be included in the conversion. The selection controls 1320 may all be initially selected by default, indicating that all notes will be included in the conversion by default. The Back control 1321 can allow returning to the previous step of the wizard as illustrated in FIG. 13B. The Next control 1322 can proceed to the next step of the wizard as illustrated by FIG. 13D.

Figure 13D:
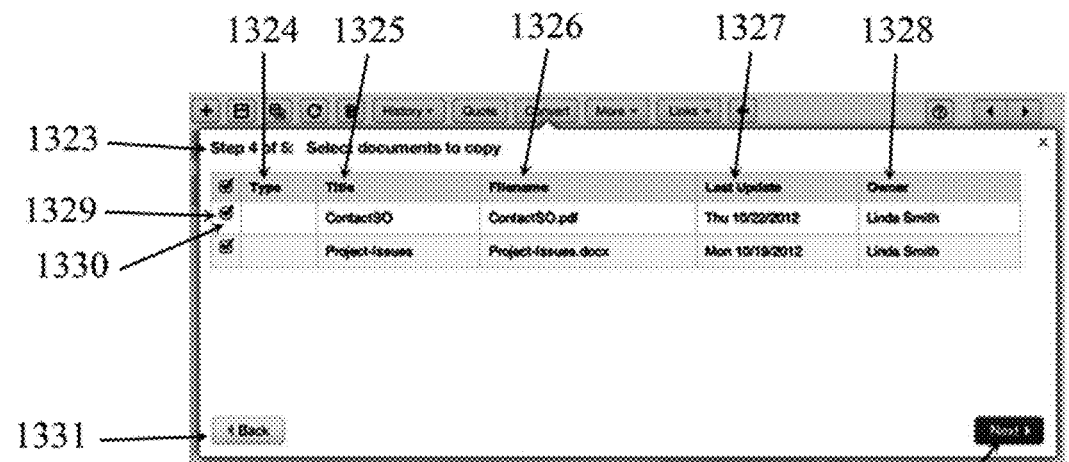

FIG. 13D is an illustrative example of an embodiment of the fourth step of a wizard for converting a sales opportunity to one or more service tickets, converting a sales opportunity to one or more sales orders, and converting a sales opportunity to one or more projects. The header 1323 can indicate that the fourth step of the wizard is to select which documents in the sales opportunity will be included in the conversion. Documents were previously described in more detail with respect to FIGS. 7A-7C. The documents in the sales opportunity can be listed one per line 1329. Each line can have columns 1324-1328 that may help identify the documents. The information in the Type column 1324 can represent what type of information the document represents. The information in the Title column 1325 can represent the title of the document and may correspond to Name within Documents with respect to FIGS. 7A-7C for the sales opportunity. The information in the Filename column 1326 can represent the filename of the document and may correspond to Filename within Documents with respect to FIGS. 7A-7C for the sales opportunity. The information in the Last Update column 1327 can represent the most recent date and time when the document was updated and may correspond to Updated within Documents with respect to FIGS. 7A-7C for the sales opportunity. The information in the Owner column 1328 can represent the person who created the document and may correspond to Owner within Documents with respect to FIGS. 7A-7C for the sales opportunity. Each document can have a selection control 1330 that indicates whether or not the document will be included in the conversion. The selection controls 1330 may all be initially selected by default, indicating that all documents will be included in the conversion by default. The Back control 1331 can allow returning to the previous step of the wizard as illustrated in FIG. 13C. The Next control 1332 can proceed to the next step of the wizard as illustrated by FIG. 13E.

Figure 13E:
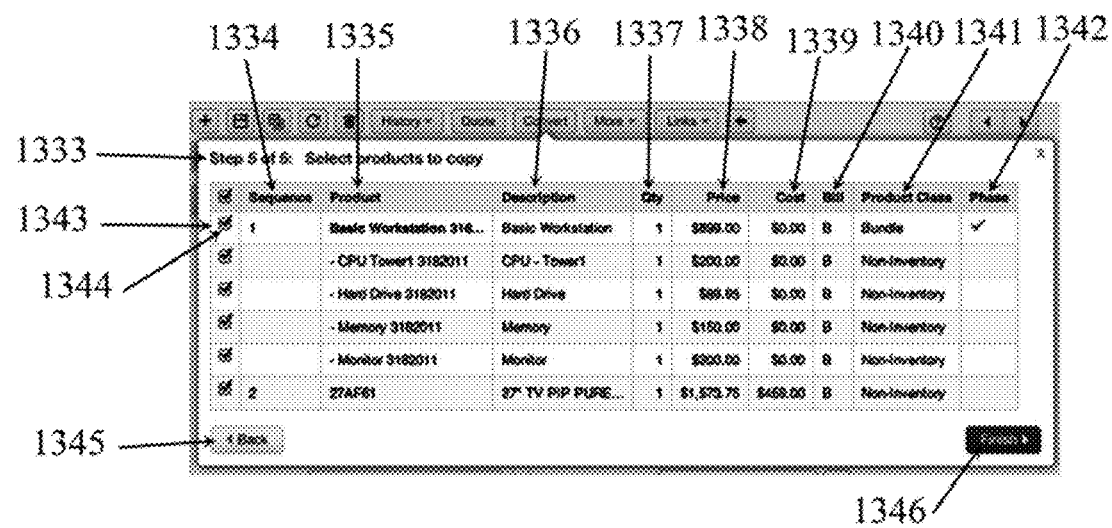

FIG. 13E is an illustrative example of an embodiment of the fifth step of a wizard for converting a sales opportunity to one or more service tickets, converting a sales opportunity to one or more sales orders, and converting a sales opportunity to one or more projects. The header 1333 can indicate that the fifth step of the wizard is to select which products in the sales opportunity will be included in the conversion. Products were previously described in more detail with respect to FIGS. 7A-7C. The products in the sales opportunity can be listed one per line 1342, 1343, and 1344. A product bundle may be listed on a line 1342, and the products within the bundle may be listed on lines 1343 under the bundle. Similarly, a product may be listed by itself on a line 1344. Each line can have columns 1334-1341 that may help identify the products. The information in the Sequence column 1334 can represent the order in which the products are listed in quotes and invoices that are sent to customers. The information in the Product column 1335 can represent the identification of the product and may correspond to Product ID within Products within Forecast with respect to FIGS. 7A-7C for the sales opportunity. The information in the Description column 1336 can represent a descriptive name for the product and may correspond to Description within Products within Forecast with respect to FIGS. 7A-7C for the sales opportunity. The information in the Qty column 1337 can represent the quantity of the product and may correspond to Quantity within Products within Forecast with respect to FIGS. 7A-7C for the sales opportunity. The information in the Price column 1338 can represent the price of the product for the customer and may correspond to Unit price within Products within Forecast with respect to FIGS. 7A-7C for the sales opportunity. The information in the Cost column 1339 can represent the cost of the product from the vendor and may correspond to Unit cost within Products within Forecast with respect to FIGS. 7A-7C for the sales opportunity. The information in the Bill column 1340 can represent whether or not the product is billed to the customer and may correspond to Billable within Products within Forecast with respect to FIGS. 7A-7C for the sales opportunity. The information in the Product class column 1341 can represent the general class of the product and may correspond to Class within Products within Forecast with respect to FIGS. 7A-7C for the sales opportunity. Each product can have a selection control 1345 that indicates whether or not the product will be included in the conversion. The selection controls 1345 may all be initially selected by default, indicating that all products will be included in the conversion by default. The Back control 1346 can allow returning to the previous step of the wizard as illustrated in FIG. 13D. The Finish control 1347 can complete the wizard and proceed with the conversion process.

Figure 14:
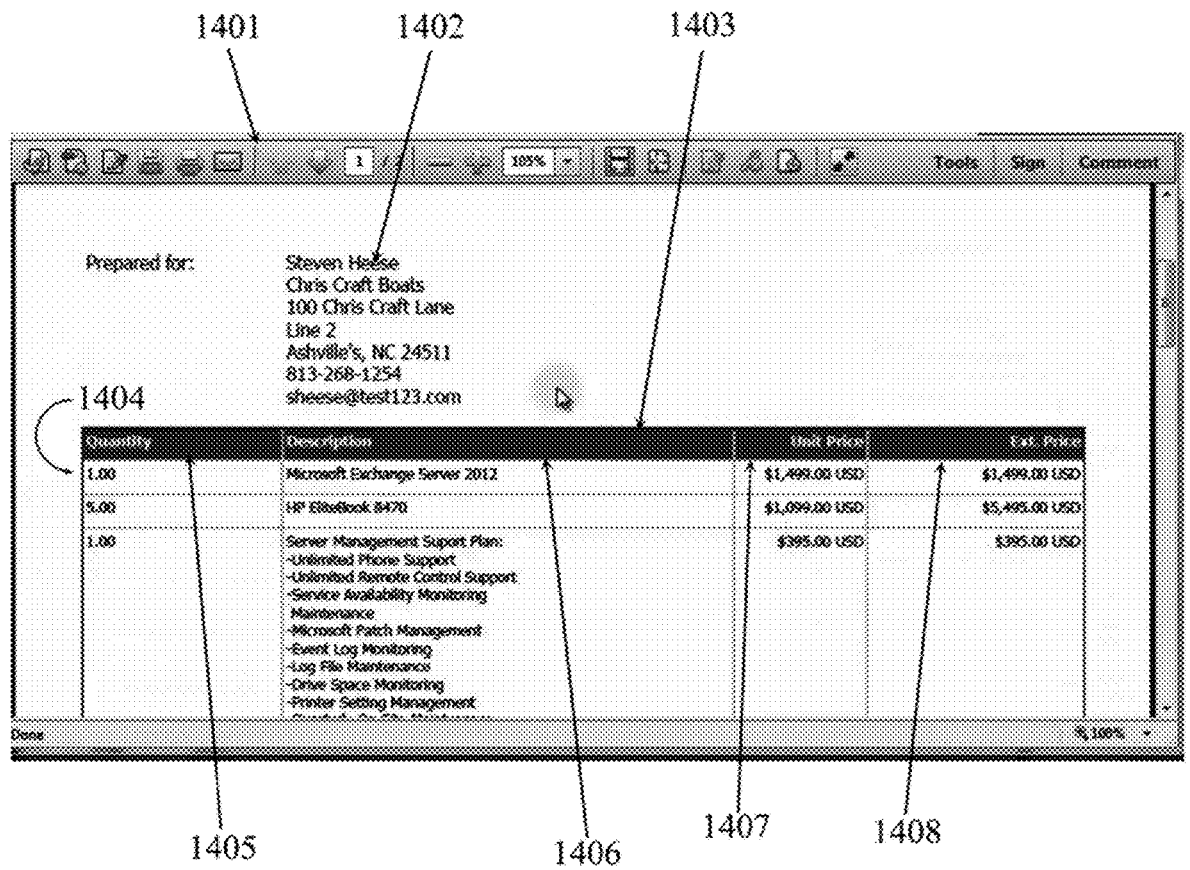
FIG. 14 is an illustrative example of an embodiment of a user interface for managing a quote created from a sales opportunity.

FIG. 14 is an illustrative example of an embodiment of a user interface for managing a quote created from a sales opportunity. The quote can be created in the main interface 1401 where the quote can be saved, printed, emailed, faxed, and so on. The quote may contain customer contact information 1402 and a list 1403 of products in the sales opportunity. The list 1403 can contain a line 1404 for each product in the sales opportunity. The line 1404 can contain columns 1405-1408 with information about the product.

The Quantity column 1405 can correspond to Quantity within Products within Forecast for the sales opportunity as described with respect to FIGS. 7A-7C.

The Description column 1406 can correspond to Description within Products within Forecast for the sales opportunity as described with respect to FIGS. 7A-7C.

The Unit Price column 1407 can correspond to Unit price within Products within Forecast for the sales opportunity as described with respect to FIGS. 7A-7C.

The Ext Price Column 1408 can correspond to Extended price within Products within Forecast for the sales opportunity as described with respect to FIGS. 7A-7C.

Figure 15:
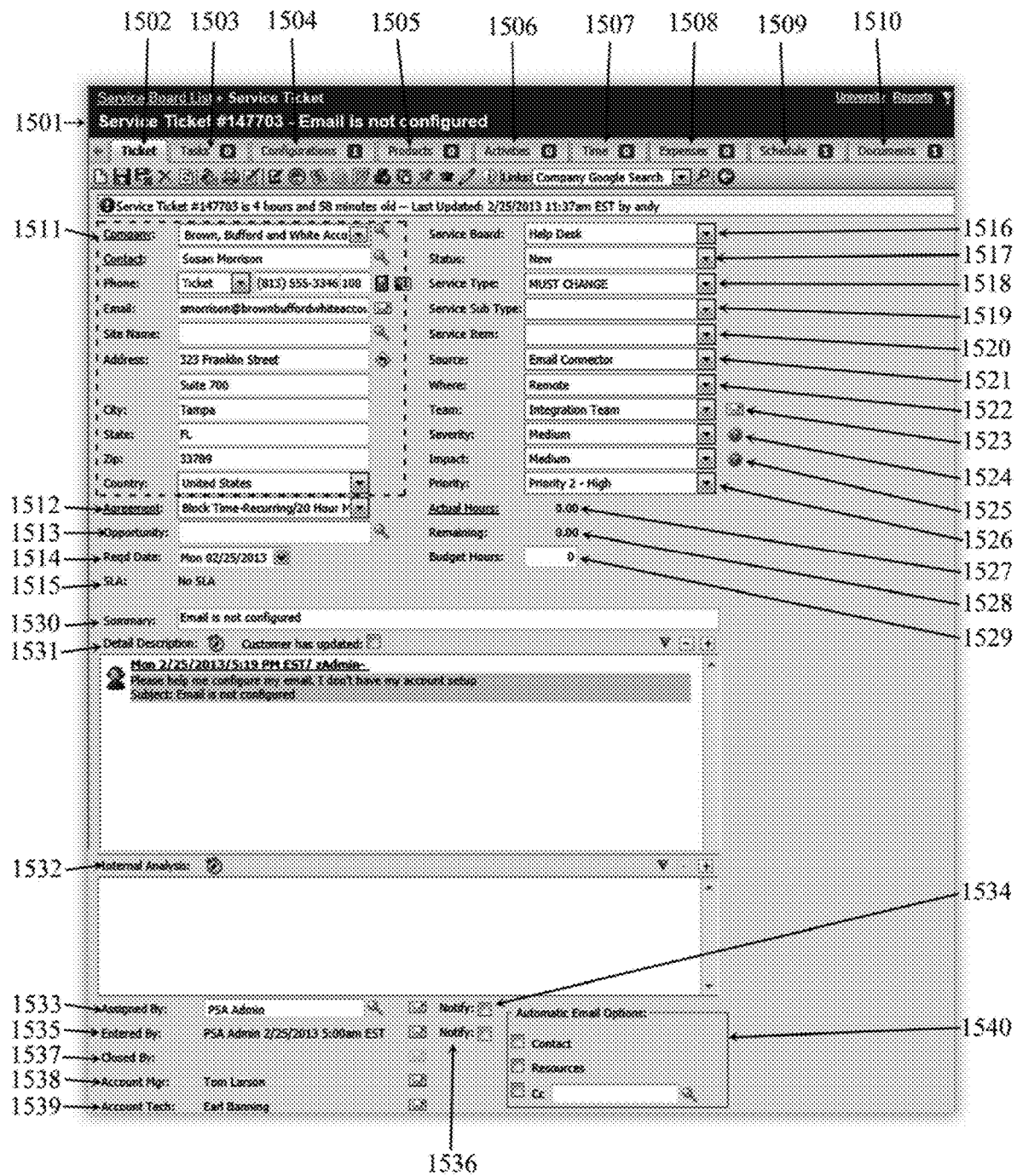
FIG. 15 is an illustrative example of an embodiment of a user interface for creating and updating a service ticket.

FIG. 15 is an illustrative example of an embodiment of a user interface for creating and updating a service ticket. The interface can show the service ticket number and name of the service ticket 1501. The interface is a tabbed display with tabs 1502-1510 that can select which information is displayed by the interface.

The Ticket tab 1502 can select a display of basic information about the service ticket.

The Tasks tab 1503 can select a display of all the tasks that are associated with the service ticket.

The Configurations tab 1504 can select a display of all the configurations that are associated with the service ticket.

The Products tab 1505 can select a display of all the products that are associated with the service ticket.

The Activities tab 1506 can select a display of all the activities that are associated with the service ticket.

The Time tab 1507 can select a display of all the times that have been entered against activities that are associated with the service ticket.

The Expenses tab 1508 can select a display of all the expenses that have been entered against activities that are associated with the service ticket.

The Schedule tab 1509 can select a display of the tasks associated with the service ticket and when the tasks are expected to be completed.

The Documents tab 1510 can select a display of all the documents that are associated with the service ticket.

The interface in FIG. 15 shows the Ticket tab 1502 selected, with the result that fields 1511-1540 can be available for displaying and editing information associated with the service ticket.

The Company, Contact, Phone, Email, Site Name, Address, City, State, Zip, and Country fields indicated by 1511 can represent the contact information associated with the service ticket. The Company, Contact, Phone, Email, Site Name, Address, City, State, Zip, and Country fields may be converted from Contact information, as described with respect to FIGS. 7A-7C, within the sales opportunity that was converted into the service ticket.

The Agreement field 1512 can represent the agreement that covers the service ticket. The Agreement field may be converted from Agreement within Products within Forecast, as described with respect to FIGS. 7A-7C, within the sales opportunity that was converted into the service ticket.

The Opportunity field 1513 can represent the sales opportunity associated with the service ticket. The Opportunity field may be the sales opportunity that was converted into the service ticket.

The Required Date field 1514 can represent the date by which the service ticket must be completed. The Required Date field may be converted from Due date within Activities, as described with respect to FIGS. 7A-7C, within the sales opportunity that was converted into the service ticket.

The SLA field 1515 can represent the service level agreement (SLA) that is applied to the service ticket. The SLA field may be converted from Agreement within Products within Forecast, as described with respect to FIGS. 7A-7C, within the sales opportunity that was converted into the service ticket.

The Service Board field 1516 can represent the service board on which the service ticket is displayed.

The Status field 1517 can represent the status of the service ticket. For example, the Status field may be one of the values "New", "Scheduled", "Closed", or "Completed".

The Service Type field 1518 can represent the type of service being performed for the service ticket. The Service Type field may be converted from Type, as described with respect to FIGS. 7A-7C, within the sales opportunity that was converted into the service ticket.

The Service Sub Type field 1519 can represent a further categorization of the type of service being performed for the service ticket. The Service Sub Type field may be converted from Type, as described with respect to FIGS. 7A-7C, within the sales opportunity that was converted into the service ticket.

The Service Item field 1520 can represent a still further categorization of the type of service being performed for the service ticket. The Service Item field categorization may be used to create task lists for common services and associate the task lists with service tickets, which may allow the creation of a standard template to associate with service tickets. The information in the Service Item field 1520 may be converted from Type, as described with respect to FIGS. 7A-7C, within the sales opportunity that was converted into the service ticket.

The Source field 1521 can represent the original source of the service ticket. The Source field may be converted from Source, as described with respect to FIGS. 7A-7C, within the sales opportunity that was converted into the service ticket.

The Where field 1522 can represent the location where the service is performed for the service ticket. The Where field may be converted from Location, as described with respect to FIGS. 7A-7C, within the sales opportunity that was converted into the service ticket.

The Team field 1523 can represent the group of people that will work on the service ticket.

The Severity field 1524 can represent the severity level of (how many people are affected by) the service ticket. The Severity field may be converted from Rating, as described with respect to FIGS. 7A-7C, within the sales opportunity that was converted into the service ticket.

The Impact field 1525 can represent the impact of (how much business processes are affected by) the service ticket. The Impact field may be converted from Rating, as described with respect to FIGS. 7A-7C, within the sales opportunity that was converted into the service ticket.

The Priority field 1526 can represent the priority of the service ticket. The Priority field may be converted from Rating, as described with respect to FIGS. 7A-7C, within the sales opportunity that was converted into the service ticket.

The Actual Hours field 1527 can represent the amount of time that has currently been entered against the service ticket.

The Budget Hours field 1529 can represent the amount of time budgeted for the service ticket.

The Remaining field 1528 can represent the Budget Hours 1529 minus the Actual Hours 1527.

The Summary field 1530 can represent a short summary of the service ticket. The Summary field may be converted from Name, as described with respect to FIGS. 7A-7C, within the sales opportunity that was converted into the service ticket.

The Detail Description field 1531 can represent additional information about the service ticket. The Detail Description field may be converted from Description, as described with respect to FIGS. 7A-7C, within the sales opportunity that was converted into the service ticket.

The Internal Analysis field 1532 can represent notes that are not intended to be shared with the customer for the service ticket.

The Assigned By field 1533 can represent the individual that decided who will work on the service ticket.

The Notify field 1534 can represent whether or not to notify the individual in the Assigned By field 1533 when changes are made to the service ticket.

The Entered By field 1535 can represent the individual that created the service ticket. The Entered By field may be converted from Primary within Sales Person, as described with respect to FIGS. 7A-7C, within the sales opportunity that was converted into the service ticket.

The Notify field 1536 can represent whether or not to notify the individual in the Entered By field 1534 when changes are made to the service ticket.

The Closed By field 1537 can represent the individual that closed the service ticket. The Closed By field may be the individual who solved the problem.

The Account Manager field 1538 can represent the individual that is responsible for communicating with the customer about the service ticket.

The Account Technician field 1539 can represent the individual that is responsible for doing the work for the service ticket.

The Automatic Email Options 1540 can determine who receives email when changes are made to the service ticket.

Figure 16:
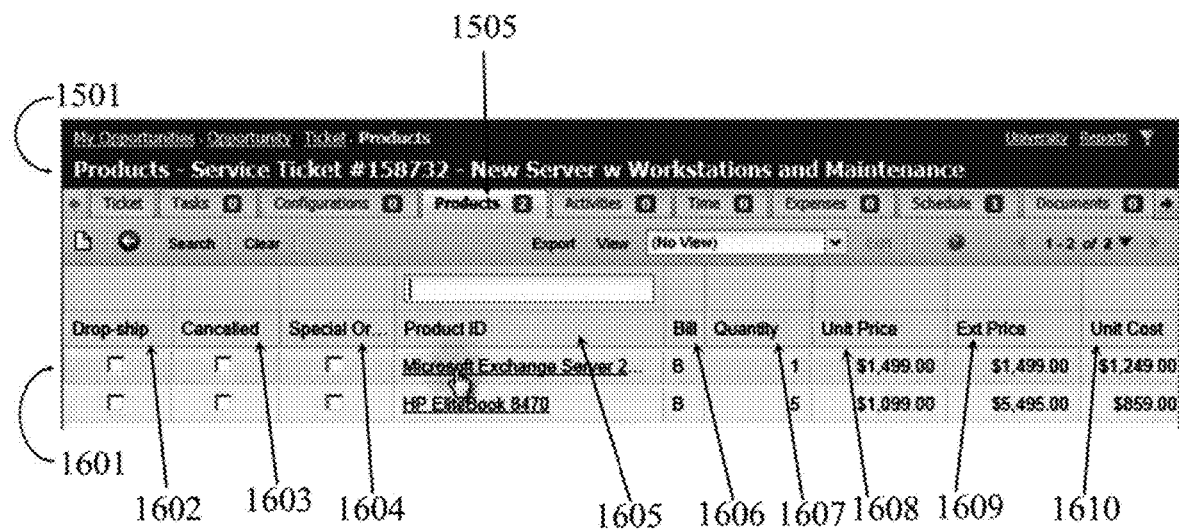
FIG. 16 is an illustrative example of an embodiment of a user interface for managing the products associated with a service ticket.

FIG. 16 is an illustrative example of an embodiment of a user interface for managing the products associated with a service ticket. The interface can show the service ticket number and name of the service ticket 1501. The interface in FIG. 16 shows the Products tab 1505 selected. The interface can contain a line 1601 for each product in the sales opportunity. The line 1601 can contain columns 1602-1610 with information about the product.

The Drop-ship column 1602 can indicate whether the product will be shipped directly from the vendor to the customer, or whether the product will first be shipped from the vendor to the company, and then shipped from the company to the customer. The Drop-ship column may be converted from Drop-ship within Products within Forecast, as described with respect to FIGS. 7A-7C, for the product on the line 1601 within the sales opportunity that was converted into the service ticket.

The Cancelled column 1603 can indicate whether the order for the product will be cancelled. Indicating a cancellation may remove the product from any invoice but not remove the product from the service ticket. The Cancelled column may be converted from Cancelled within Cancel within Products within Forecast, as described with respect to FIGS. 7A-7C, for the product on the line 1601 within the sales opportunity that was converted into the service ticket.

The Special order column 1604 can indicate whether or not the product is one that is not ordinarily handled by the vendor. The Special order column may indicate that the product will require special handling or additional documentation. This may be converted from Special order within Products within Forecast, as described with respect to FIGS. 7A-7C, for the product on the line 1601 within the sales opportunity that was converted into the service ticket.

The Product ID column 1605 can be an identifier that uniquely identifies the product. For example, the Product ID column may be the Universal Product Code (UPC) of the product. The Product ID column may be converted from Product ID within Products within Forecast, as described with respect to FIGS. 7A-7C, for the product on the line 1601 within the sales opportunity that was converted into the service ticket.

The Bill column 1606 can be the billable status of the product. The Bill column may indicate whether or not the product will appear on invoices sent to customers. The letter "B" in the Bill column may indicate that the product is billable, i.e. the product will appear on invoices sent to customers. The Bill column may be converted from Billable within Products within Forecast, as described with respect to FIGS. 7A-7C, for the product on the line 1601 within the sales opportunity that was converted into the service ticket.

The Quantity column 1607 can be the quantity of product that is being sold to the customer. The Quantity column may be converted from Quantity within Products within Forecast, as described with respect to FIGS. 7A-7C, for the product on the line 1601 within the sales opportunity that was converted into the service ticket.

The Unit price column 1608 can be the price charged to the customer for the product. The price may be updated as part of the procurement process. The price may be updated to reflect the actual price charged to the customer once the product has been shipped. The Unit price column may be converted from Unit price within Products within Forecast, as described with respect to FIGS. 7A-7C, for the product on the line 1601 within the sales opportunity that was converted into the service ticket.

The Extended price column 1609 can be the entire price charged to the customer for the line item of the product. The Extended price column may be computed as the Quantity times the Unit price. The price may be updated as part of the procurement process. The price may be updated to reflect the actual price charged to the customer once the product has been shipped. The Extended price column may be converted from Extended price within Products within Forecast, as described with respect to FIGS. 7A-7C, for the product on the line 1601 within the sales opportunity that was converted into the service ticket.

The Unit cost column 1610 can be the cost for the product charged by the vendor. The cost may be updated as part of the procurement process. The cost may be updated to reflect the actual cost charged by the vendor once the invoice from the vendor has been received. The Unit cost column may be converted from Unit cost within Products within Forecast, as described with respect to FIGS. 7A-7C, for the product on the line 1601 within the sales opportunity that was converted into the service ticket.

Figure 17:
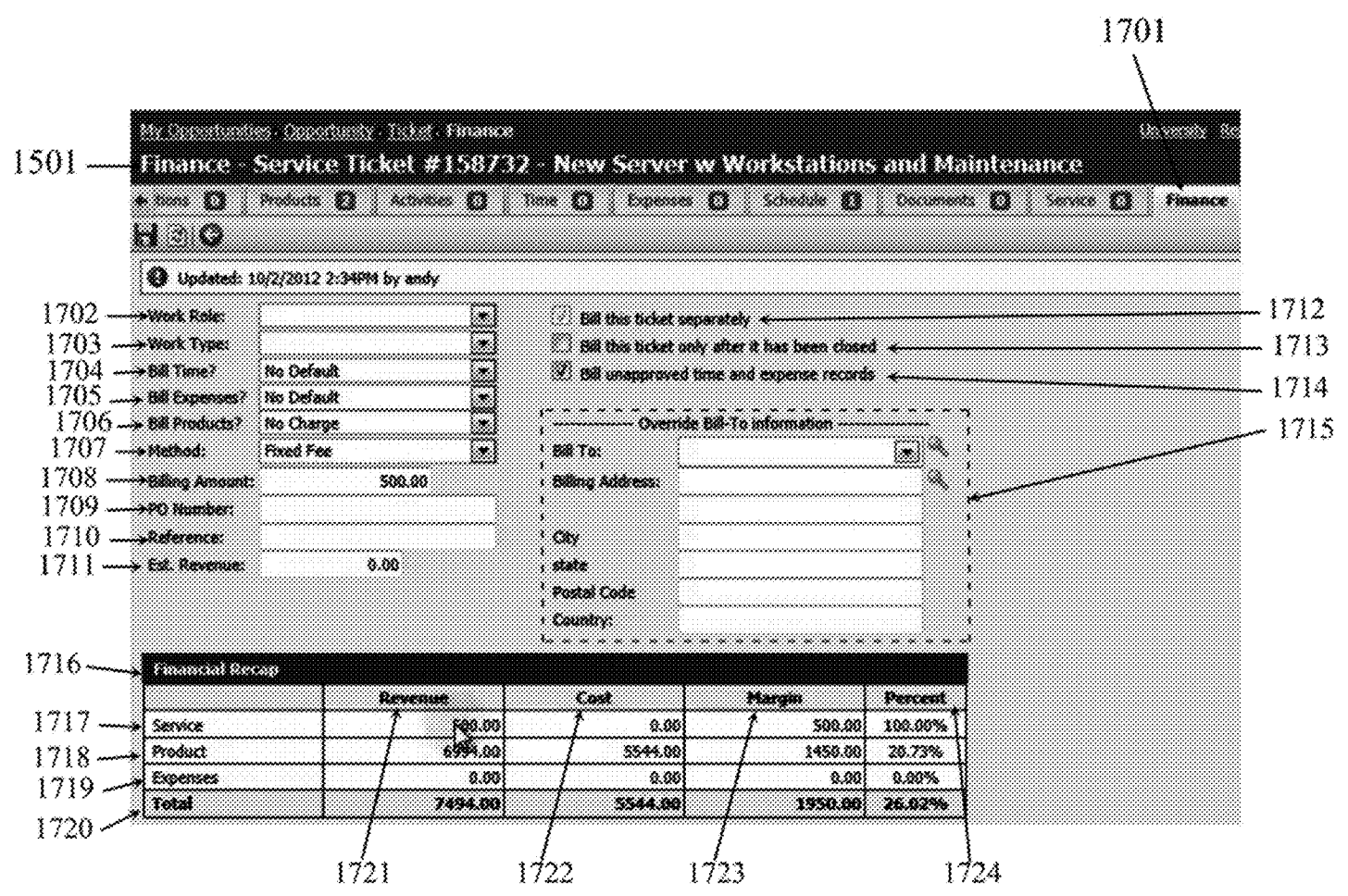

FIG. 17 is an illustrative example of an embodiment of a user interface for managing the financial aspects of a service ticket. The interface can show the service ticket number and name of the service ticket 1501. The interface in FIG. 17 shows the Finance tab 1701 selected, with the result that fields 1702-1715 can be available for displaying and editing finance information associated with the service ticket. Additionally, the Financial Recap section 1716 can provide a summary of financial information.

The Work Role field 1702 can be used to set the billing rates charged for completing the work on the service ticket, based on the level of the individual that will need to work on the service ticket. For example, the Work Role field may be one of the values "Project Manager", "Engineer", "Consultant", "Admin", or "Sales".

The Work Type field 1703 can be used to modify the billing rates charged for completing the work on the service ticket, based on special circumstances about the work being done. For example, the Work Type field may be one of the values "Normal", "Overtime", "On call", "Emergency", or "Discounted".

The Bill Time field 1704 can indicate how time spent on completing the service ticket should be billed to the customer. For example, the Bill Time field may be one of the values "Billable" (time accrued is billable to the customer), "Do Not Bill" (time accrued is not billable to the customer, and does not appear on an invoice), or "No Charge" (time accrued is not billable to the customer, but appears on the invoice as a zero charge).

The Bill Expenses field 1705 can indicate how expenses charged against the completion of the service ticket should be billed to the customer. For example, the Bill Expenses field may be one of the values "Billable" (expenses are billable to the customer), "Do Not Bill" (expenses are not billable to the customer, and do not appear on an invoice), or "No Charge" (expenses are not billable to the customer, but appear on the invoice as a zero charge).

The Bill Products field 1706 can indicate how products used during the completion of the service ticket should be billed to the customer. For example, the Bill Products field may be one of the values "Billable" (products are billable to the customer), "Do Not Bill" (products are not billable to the customer, and do not appear on an invoice), or "No Charge" (products are not billable to the customer, but appear on the invoice as a zero charge). The Bill Products field may be converted from Billable within Products within Forecast, as described with respect to FIGS. 7A-7C, within the sales opportunity that was converted into the service ticket.

The Method field 1707 can be used to set the way in which the service ticket is billed to the customer. For example, the Method field may be one of the values "Actual Rate", "Fixed Fee", "Not to Exceed", or "Override Rate". If the Method field 1707 is set to "Override Rate", then the Billing Amount field 1708 may be used to set an hourly rate for the service ticket.

The PO Number field 1709 can be used to identify a purchase order for the billing of the service ticket. The PO Number field may be converted from PO number, as described with respect to FIGS. 7A-7C, within the sales opportunity that was converted into the service ticket.

The Reference field 1710 can be used to indicate additional arbitrary information for the service ticket that may print on the invoice if the service ticket is billed separately.

The Estimated Revenue field 1711 can represent a forecast of the amount of revenue expected to come from the work on the service ticket. The Estimated Revenue field may be converted from Revenue within Estimates within Forecast, as described with respect to FIGS. 7A-7C, within the sales opportunity that was converted into the service ticket.

The Bill this ticket separately field 1712 can indicate whether or not to bill the service ticket separately from other service tickets for the customer.

The Bill this ticket only after it has been closed field 1713 can indicate whether or not to bill the service ticket only after the Status 1517 of the service ticket, as described with respect to FIG. 15, has been set to "Closed".

The Bill unapproved time and expense records field 1714 can indicate whether or not to bill the service ticket even if the time accrued on the service ticket and the expenses charged against the service ticket have not gone through an approval process.

The Bill To, Billing Address, City, State, Postal Code, and Country fields referenced by 1715 can change the bill-to information for the service ticket. The Bill To, Billing Address, City, State, Postal Code, and Country fields may only be enabled if the Bill this ticket separately field 1712 is set. The fields referenced by 1715 can be used to set up information for a different customer to which the service ticket is billed.

The Financial Recap section 1716 can provide an overview of the time, product, and expense entries associated with the service ticket. Since these figures represent actual billing numbers rather than forecasts, these figures may not be derived from any data from the sales opportunity that was converted into the service ticket. The Service line 1717 can provide an overview of the time entries. The Product line 1718 can provide an overview of the product entries. The Expenses line 1719 can provide an overview of the expense entries. Within each line 1717-1719, the Revenue column 1721 can represent the revenue so far associated with the service ticket for the entries represented by that line. Within each line 1717-1719, the Cost column 1722 can represent the costs incurred by the company to generate the revenue in column 1721. Within each line 1717-1719, the Margin column 1723 may be computed as the Revenue column 1721 minus the Cost column 1722. Within each line 1717-1719, the Percent column 1724 may be computed as the Margin column 1723 divided by the Revenue column 1721, expressed as a percentage. The Total line 1720 can provide an overview of the total financial picture, and may be computed as the combination of lines 1717-1719, with the Revenue, Cost, and Margin columns 1721-1723 computed as the sum of the corresponding columns in lines 1717-1719, and the Percent column computed as the Margin column 1723 divided by the Revenue column 1721, expressed as a percentage.

Figure 18:
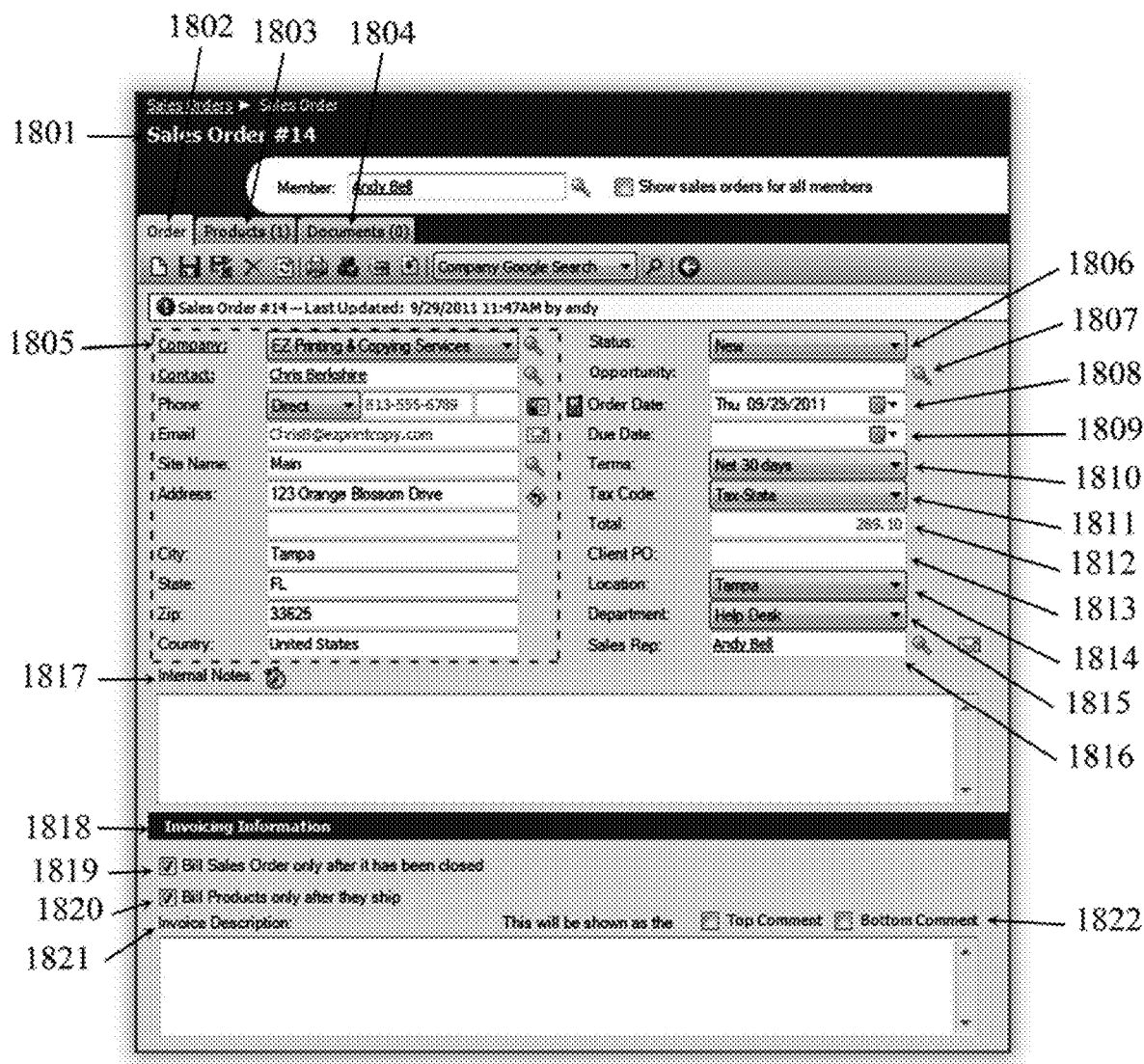
FIG. 18 is an illustrative example of an embodiment of a user interface for creating and updating a sales order.

FIG. 18 is an illustrative example of an embodiment of a user interface for creating and updating a sales order. The interface can show the sales order number 1801. The interface is a tabbed display with tabs 1802-1804 that can select which information is displayed by the interface.

The Order tab 1802 can select a display of basic information about the sales order.

The Products tab 1803 can select a display of products associated with the sales order.

The Documents tab 1804 can select a display of documents associated with the sales order.

The interface in FIG. 18 shows the Order tab 1802 selected, with the result that fields 1805-1817 can be available for displaying and editing information associated with the sales order. The Invoicing Information section 1818 may also be available for displaying and editing information that can affect how the sales order is billed to the customer.

The Company, Contact, Phone, Email, Site Name, Address, City, State, Zip, and Country fields indicated by 1805 can represent the contact information associated with the sales order. The Company, Contact, Phone, Email, Site Name, Address, City, State, Zip, and Country fields may be converted from Contact information, as described with respect to FIGS. 7A-C, within the sales opportunity that was converted into the sales order.

The Status field 1806 can represent the status of the sales order. For example, The Status field may be one of the values "New", "Active", "Closed", or "Inactive".

The Opportunity field 1807 can represent the sales opportunity associated with the sales order. The Opportunity field may be the sales opportunity that was converted into the sales order.

The Order Date field 1808 can represent the date when the sales order was initially created. The Order Date field may be set to the date that the sales opportunity was converted into the sales order.

The Due Date field 1809 can represent the date by which the sales order must be completed. The Due Date field may be converted from Due date within Activities, as described with respect to FIGS. 7A-7C, within the sales opportunity that was converted into the sales order.

The Terms field 1810 can represent the payment terms for the sales order, based on the customer. For example, the Terms field may be one of the values "Prepaid", "COD", "Net 30 days", or "Net 90 days".

The Tax Code field 1811 can represent the tax rate that is charged to the customer for the sales order. For example, the Tax Code field may be one of the values "Nontaxable", "ServiceTax", "ProductTax", or "AgreementTax".

The Total field 1812 can represent the total revenue for all the products associated with the sales order. The Total field may be converted from the total of Extended Price within Products within Forecast, as described with respect to FIGS. 7A-7C, within the sales opportunity that was converted into the sales order.

The Client PO field 1813 can be used to identify a purchase order for the billing of the sales order. The Client PO field may be converted from PO number, as described with respect to FIGS. 7A-7C, within the sales opportunity that was converted into the sales order.

The Location field 1814 can represent the location where the service is performed for the sales order. The Location field may be converted from Location, as described with respect to FIGS. 7A-7C, within the sales opportunity that was converted into the sales order.

The Department field 1815 can represent the business unit information for the customer associated with the sales order. The Department field may be converted from Business unit, as described with respect to FIGS. 7A-7C, within the sales opportunity that was converted into the sales order.

The Sales Rep field 1816 can represent the individual who is the sales representative in contact with the customer concerning the sales order. The Sales Rep field may be converted from Primary within Sales Person, as described with respect to FIGS. 7A-7C, within the sales opportunity that was converted into the sales order.

The Internal Notes field 1817 can represent a list of notes about the sales order that are not intended for the customer to see. For example, one of the notes might be an indication that the sales staff is willing to offer a lower price on a service agreement if the customer is willing to commit to a longer term on the agreement. The Internal Notes field may be converted from Notes, as described with respect to FIGS. 7A-7C, within the sales opportunity that was converted into the sales order.

The Invoicing Information section 1818 may also be available for displaying and editing information that can affect how the sales order is billed to the customer. The Bill Sales Order only after it is closed field 1819 may indicate that the sales order will not be billed to the customer until the Status within the sales order is set to "Closed". The Bill Products only after they ship field 1820 may indicate that all of the products associated with the sales order must be shipped before any invoice with the products is created for the customer. The Invoice Description field 1821 may allow the insertion of a description to display on the customer invoice, and the This will be shown as field 1822 may allow the selection of whether the description in the Invoice Description field 1821 appears on the top of the invoice, the bottom of the invoice, both, or neither.

Figure 19:
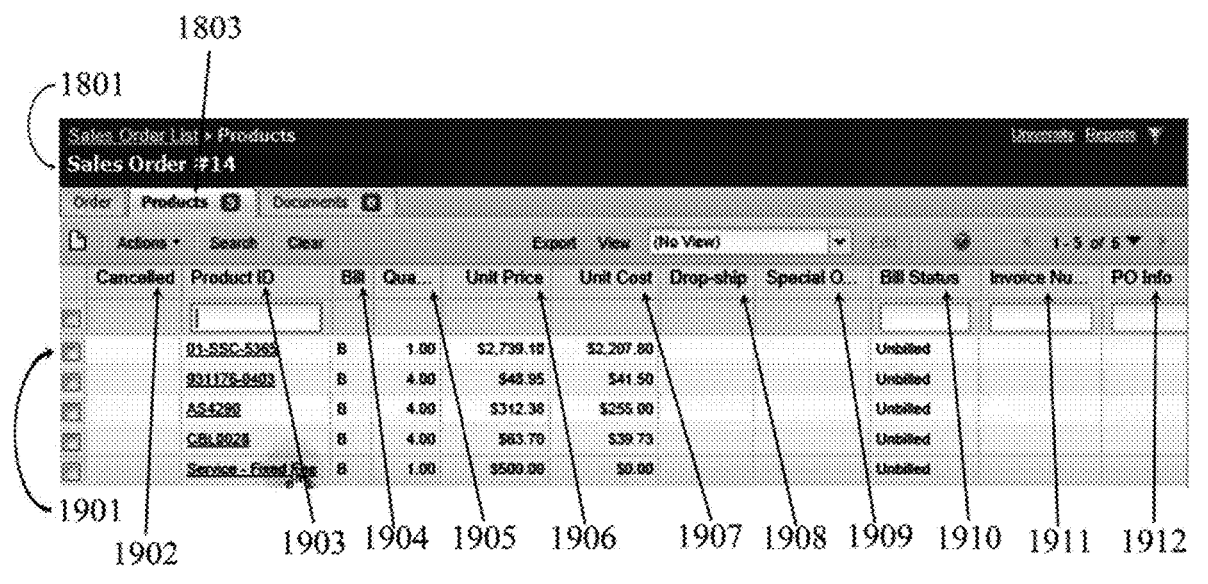

FIG. 19 is an illustrative example of an embodiment of a user interface for managing the products associated with a sales order. The interface can show the sales order number 1801. The interface in FIG. 19 shows the Products tab 1803 selected, with the result that products associated with the sales order can be available for displaying and editing. Each product can appear in a line 1901 and each line 1901 can have columns 1902-1912 with information about the product.

The Cancelled column 1902 can indicate whether the order for the product will be cancelled. Indicating a cancellation may remove the product from any invoice but not remove the product from the sales order. The Cancelled column may be converted from Cancelled within Cancel within Products within Forecast, as described with respect to FIGS. 7A-7C, for the product on the line 1901 within the sales opportunity that was converted into the sales order.

The Product ID column 1903 can be an identifier that uniquely identifies the product. For example, the Product ID column may be the Universal Product Code (UPC) of the product. The Product ID column may be converted from Product ID within Products within Forecast, as described with respect to FIGS. 7A-7C, for the product on the line 1901 within the sales opportunity that was converted into the sales order.

The Bill column 1904 can be the billable status of the product. The Bill column may indicate whether or not the product will appear on invoices sent to customers. The letter "B" in the Bill column may indicate that the product is billable, i.e. the product will appear on invoices sent to customers. The Bill column may be converted from Billable within Products within Forecast, as described with respect to FIGS. 7A-7C, for the product on the line 1901 within the sales opportunity that was converted into the sales order.

The Quantity column 1905 can be the quantity of product that is being sold to the customer. The Quantity column may be converted from Quantity within Products within Forecast, as described with respect to FIGS. 7A-7C, for the product on the line 1901 within the sales opportunity that was converted into the sales order.

The Unit price column 1906 can be the price charged to the customer for the product. The price may be updated as part of the procurement process. The price may be updated to reflect the actual price charged to the customer once the product has been shipped. The Unit price column may be converted from Unit price within Products within Forecast, as described with respect to FIGS. 7A-7C, for the product on the line 1901 within the sales opportunity that was converted into the sales order.

The Unit cost column 1907 can be the cost for the product charged by the vendor. The cost may be updated as part of the procurement process. The cost may be updated to reflect the actual cost charged by the vendor once the invoice from the vendor has been received. The Unit cost column may be converted from Unit cost within Products within Forecast, as described with respect to FIGS. 7A-7C, for the product on the line 1901 within the sales opportunity that was converted into the sales order.

The Drop-ship column 1908 can indicate whether the product will be shipped directly from the vendor to the customer, or whether the product will first be shipped from the vendor to the company, and then shipped from the company to the customer. The Drop-ship column may be converted from Drop-ship within Products within Forecast, as described with respect to FIGS. 7A-7C, for the product on the line 1901 within the sales opportunity that was converted into the sales order.

The Special order column 1909 can indicate whether or not the product is one that is not ordinarily handled by the vendor. The Special order column may indicate that the product will require special handling or additional documentation. The Special order column may be converted from Special order within Products within Forecast, as described with respect to FIGS. 7A-7C, for the product on the line 1901 within the sales opportunity that was converted into the sales order.

The Bill Status column 1910 can indicate whether or not the product has been invoiced. For example, the Bill Status column may be one of the values "Billed" or "Unbilled". The Bill Status column may be converted from Status within Products within Forecast, as described with respect to FIGS. 7A-7C, for the product on the line 1901 within the sales opportunity that was converted into the sales order.

The Invoice Number column 1911 can be the identifying number of the invoice sent to the customer on which the product appears. The Invoice Number column may be converted from Invoice number within Products within Forecast, as described with respect to FIGS. 7A-7C, for the product on the line 1901 within the sales opportunity that was converted into the sales order.

The PO Info field 1912 can be used to identify a purchase order for the billing of the sales order. The PO Info field may be converted from PO number within Purchase order within Products within Forecast, as described with respect to FIGS. 7A-7C, within the sales opportunity that was converted into the sales order.

Figure 20:
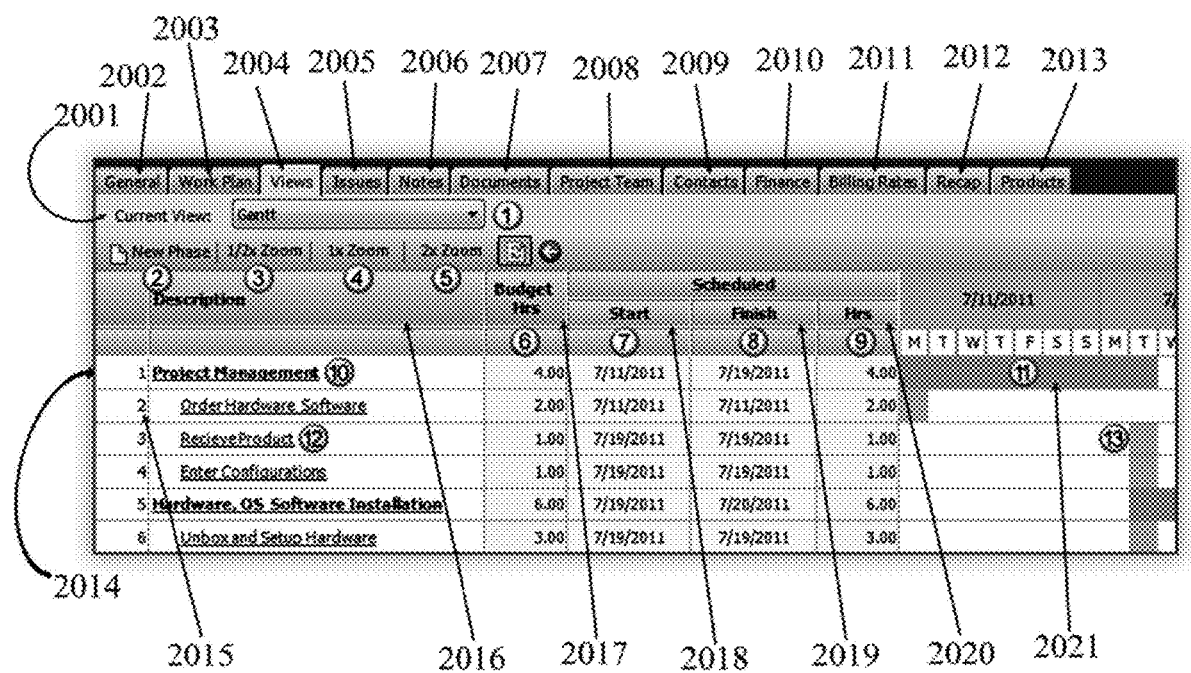
FIG. 20 is an illustrative example of an embodiment of a user interface for viewing a project as a Gantt chart.

FIG. 20 is an illustrative example of an embodiment of a user interface for viewing a project as a Gantt chart. The interface can provide for a selection of the method used to view the project 2001. The interface is a tabbed display with tabs 2002-2013 that can select which information is displayed by the interface.

The General tab 2002 can display the basic information for the project. When creating a new project, the General tab 2002 can also configure the basic billing settings.

The Work Plan tab 2003 can show the organization of the project into phases, sub-phases, and tasks. The Work Plan tab may be the tab that is used to build the project work plan.

The Views tab 2004 can display the structure of the project in several different forms. The Views tab may be able to display the project as a Gantt chart, as a project summary, and as a project budget by variance.

The Issues tab 2005 can facilitate the creation and maintenance of issue service tickets for the project, which are service tickets that are created to address problems and issues that arise during the implementation of the project.

The Notes tab 2006 can facilitate the creation and update of notes for the project. Notes were previously described with respect to FIGS. 7A-7C.

The Documents tab 2007 can facilitate the creation and update of documents for the project. Documents were previously described with respect to FIGS. 7A-7C.

The Project Team tab 2008 can display and manage the team members for the project.

The Contacts tab 2009 can display and manage the relevant contacts associated with the project.

The Finance tab 2010 can display and manage the billing settings for the project.

The Billing Rates tab 2011 can facilitate the creation, display, and editing of billing rates based on the work roles of team members for the project.

The Recap tab 2012 can display a summary of the billed invoices, unbilled time, and project expenses for the project.

The Products tab 2013 can display all of the products that are associated with the project.

The interface in FIG. 20 shows the Views tab 2004 selected and the Current View field 2001 set to "Gantt", with the result that the interface can display a Gantt chart showing the project breakdown. Project phases and sub-phases can be shown in bold text such as 2014, and project tasks can be shown in normal text such as 2015. The indentation of the lines can indicate the organization of the project. For example, line 2015 is indented under line 2014, indicating that task 2015 is part of phase 2014. Columns 2016-2021 can display information about the phases, sub-phases, and tasks contained within the project.

The Description column 2016 can be the name of a phase, sub-phase, or task. The Description column may be converted from Activities, as described with respect to FIGS. 7A-7C, for the activity within the sales opportunity that was converted into the project.

The Budget Hours column 2017 can be the expected amount of time to complete a phase, sub-phase, or task. For a phase or sub-phase 2014, the Budget Hours column may be computed as the sum of the numbers for all the tasks contained in the phase or sub-phase. For a task 2015, the Budget Hours column may be converted from Time within Activities, as described with respect to FIGS. 7A-7C, for the activity within the sales opportunity that was converted into the project.

The Scheduled Start column 2018, Scheduled Finish column 2019, and Scheduled Hours column 2020 can indicate the scheduled time for the phase, sub-phase, or task. The Scheduled Hours column 2020 should match the Budget Hours column 2017 after a sales opportunity is converted to a project, and may be converted from Time within Activities, as described with respect to FIGS. 7A-7C, for the activity within the sales opportunity that was converted into the project. The Scheduled Finish column 2019 should be the Scheduled Start column 2018 plus the Scheduled Hours column, taking into account the work schedule, i.e. only scheduling time during work hours. The Scheduled Start column 2018 can be generated using a project leveling algorithm based on all of the activities and resources for the project. The information that drives the project leveling algorithm may be converted from Due Date within Activities and Time within Activities, as described with respect to FIGS. 7A-7C, for the activity within the sales opportunity that was converted into the project.

Column 2021 can be the graphical representation of the Scheduled Start column 2018 and Scheduled Finish column 2019, as a Gantt chart, in a way that is easy to see and understand. The Gantt chart may facilitate the understanding of how the project is scheduled.

The description of FIG. 20 has been done with the understanding that the conversion of a sales opportunity to a project used Activities within the sales opportunity, as described with respect to FIGS. 7A-7C, to generate the project task data during the conversion. In another embodiment, the conversion can use Products within Forecast within the sales opportunity, where the Class within Products within Forecast indicates that the product is a service product, as described with respect to FIGS. 7A-7C, to generate the project task data during the conversion. In still another embodiment, the conversion can use Estimates within Forecast within the sales opportunity, where the Type within Estimates within Forecast indicates that the estimate is for a service activity, as described with respect to FIGS. 7A-7C, to generate the product task data during the conversion. In still another embodiment, the conversion can use a combination of some or all of these sources of data to generate the project task data during the conversion.

Figure 21:
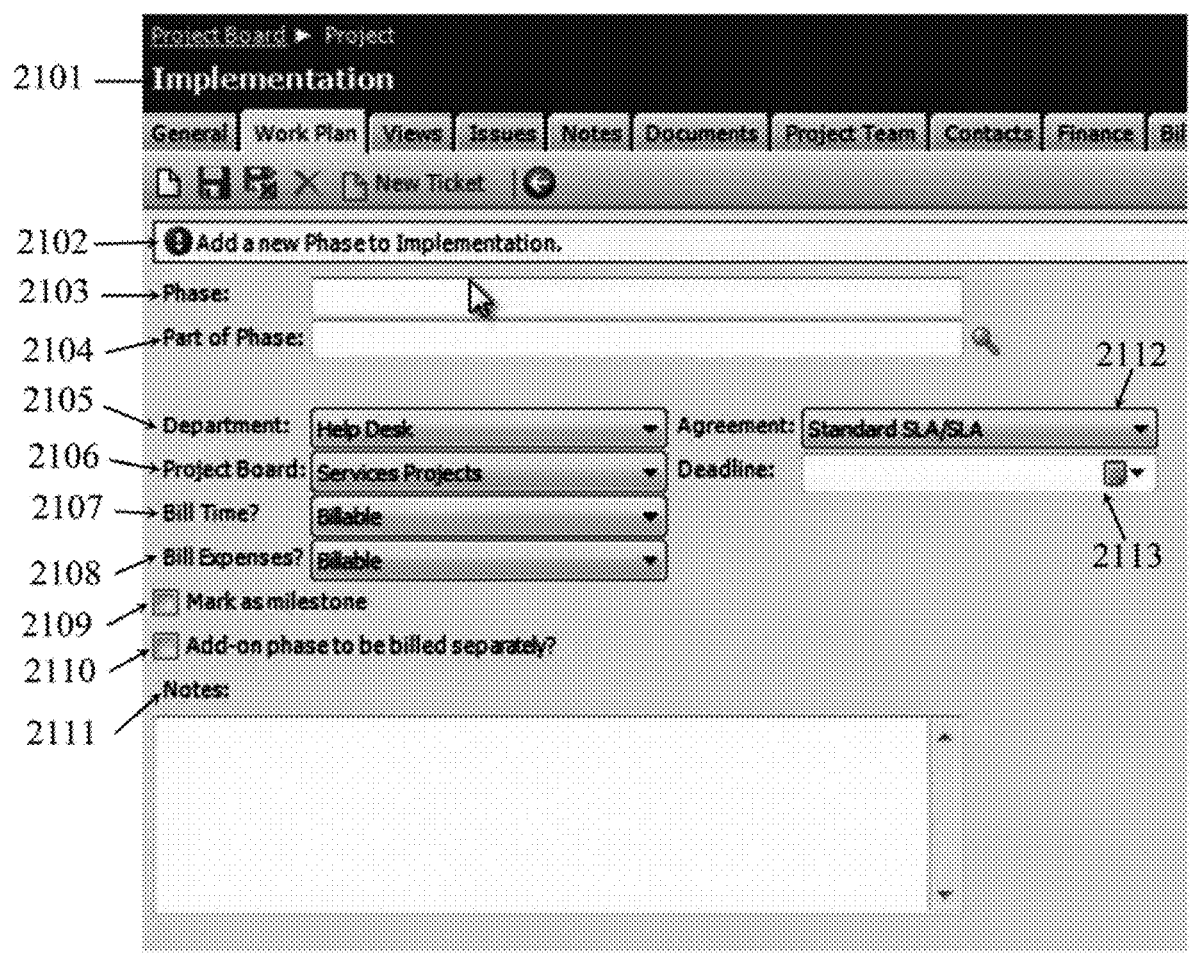
FIG. 21 is an illustrative example of an embodiment of a user interface for creating and updating a phase of a project.

FIG. 21 is an illustrative example of an embodiment of a user interface for creating and updating a phase or sub-phase of a project. The interface can show the name of the project 2101, and descriptive text 2102 indicating that the interface is for adding a phase to the project. The fields 2103-2113 can be completed with the information for creating or updating the phase. The Phase field 2103 can be the name of the phase. The Part of Phase field 2104 can indicate which phase, if any, contains the sub-phase. The Department field 2105 can be the business unit within the company that is responsible for completing the phase. The Project Board field 2106 can indicate which project board will display the phase. The Bill Time field 2107 can indicate how time spent on completing the service ticket should be billed to the customer. For example, the Bill Time field may be one of the values "Billable" (time accrued is billable to the customer), "Do Not Bill" (time accrued is not billable to the customer, and does not appear on an invoice), or "No Charge" (time accrued is not billable to the customer, but appears on the invoice as a zero charge). The Bill Expenses field 2108 can indicate how expenses charged against the completion of the service ticket should be billed to the customer. For example, the Bill Expenses field may be one of the values "Billable" (expenses are billable to the customer), "Do Not Bill" (expenses are not billable to the customer, and do not appear on an invoice), or "No Charge" (expenses are not billable to the customer, but appear on the invoice as a zero charge). The Mark as Milestone field 2109 can indicate whether or not the phase will be displayed as a milestone in the Project Summary display. The Add-on phase to be billed separately field 2110 can indicated whether or not the phase is being billed separately from the rest of the project. An add-on phase may be added after the project is already in progress, based on additional work and constraints that are discovered after the work has already started. The Notes field 2111 can contain additional notes about the phase. The Agreement field 2112 can indicate the agreement with the customer that governs the billing of the phase of the project. The Deadline field 2113 can be a date by which the phase must be completed.

Figure 22:
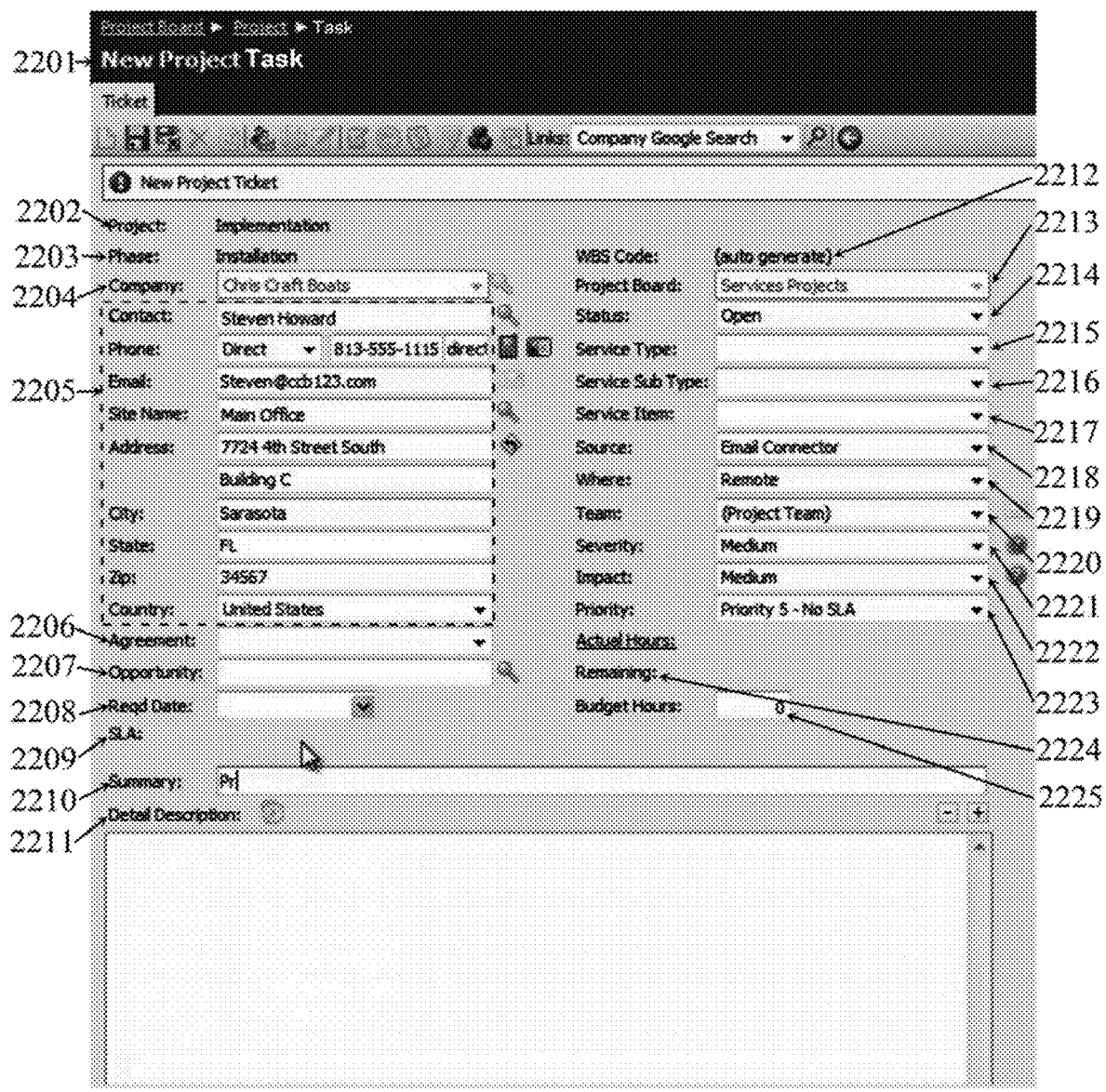
FIG. 22 is an illustrative example of an embodiment of a user interface for creating and updating a task of a project.

FIG. 22 is an illustrative example of an embodiment of a user interface for creating and updating a task of a project. The interface can indicate that a new task is being created 2201, or an existing task is being updated. The fields 2202-2225 can be completed with the information for creating or updating the task. The Project field 2202 can be the name of the project containing the project task. The Phase field 2203 can be the name of the phase or sub-phase containing the project task. The Company field 2204 can be the company name for the customer for which the project task is being completed. The Contact, Phone, Email, Site Name, Address, City, State, Zip, and Country fields 2205 can be the contact information for the customer for which the project task is being completed. The Agreement field 2206 can indicate the agreement with the customer that governs the billing of the project task. The Opportunity field 2207 can be the sales opportunity that was converted into the project that contains the project task. The Required Date field 2208 can be a date by which the project task must be completed. The SLA field 2209 may be unused for a project task. The Summary field 2210 can be a short summary describing the project task. The Detail Description field 2211 can be a longer, more detailed description of the project task. The WBS Code field 2212 can be generated based on the position of the project task within the project plan, and may be labeled a.b.c.d.e.f. . . . with as many entries as there are levels in the project. The Project Board field 2213 can indicate which project board will display the project task. The Status field 2214 can be the status that will be displayed on the project board for the project task. The Service Type field 2215 can represent the type of service being performed for the project task. The Service Sub Type field 2216 can represent a further categorization of the type of service being performed for the project task. The Service Item field 2217 can represent a still further categorization of the type of service being performed for the project task. The categorization represented by the Service Item field may be used to create task lists for common services and associate the task lists with project tasks, which may allow the creation of a standard template to associate with project tasks. The Source field 2218 can represent the original source of the project task. The Where field 2219 can represent the location where the service is performed for the project task. The Team field 2220 can represent the group of people that work on the project task. The Severity field 2221 can represent the severity level of (how many people are affected by) the project task. The Impact field 2222 can represent the impact of (how much business processes are affected by) the project task. The Priority field 2223 can represent the priority of the project task. The Remaining field 2224 can represent the budgeted time for the project task minus the actual time that has been spent so far on the project task. The Budget Hours field 2225 can represent the amount of time budgeted for the project task.

Figure 23:
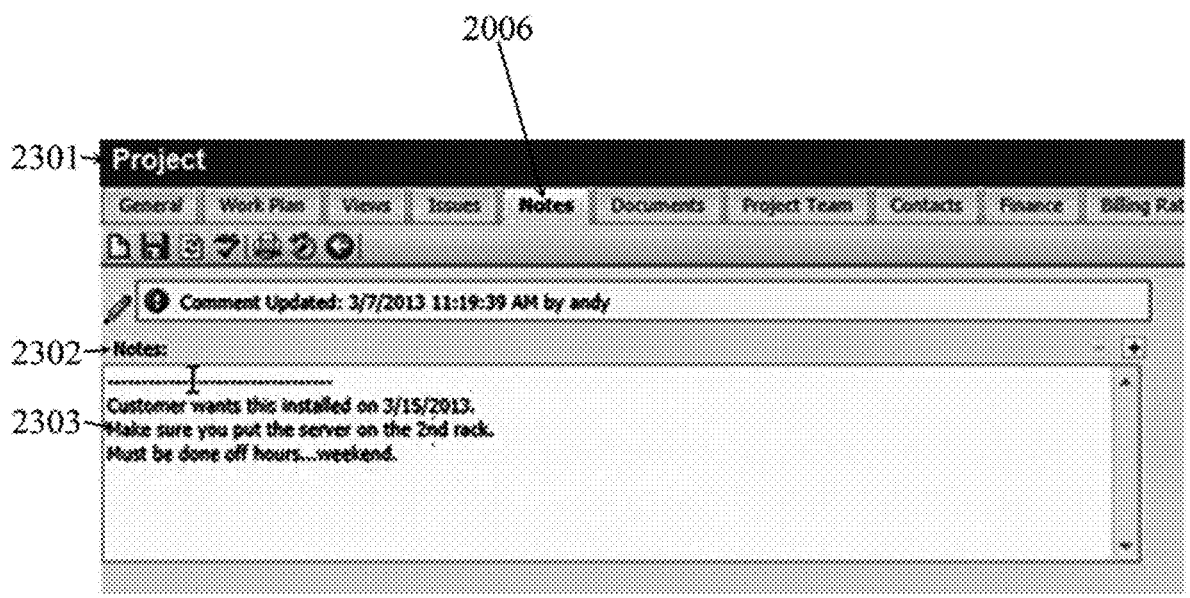
FIG. 23 is an illustrative example of an embodiment of a user interface for creating and updating the notes associated with a project.

FIG. 23 is an illustrative example of an embodiment of a user interface for creating and updating the notes associated with a project. The interface can describe the project 2301. In FIG. 23, the Notes tab 2006 is selected, which may then provide an interface for creating, displaying, and updating notes that are associated with the project. The notes are indicated by a header 2302, and the notes themselves 2303 can be added, updated, and deleted in the interface control.

Figure 24:
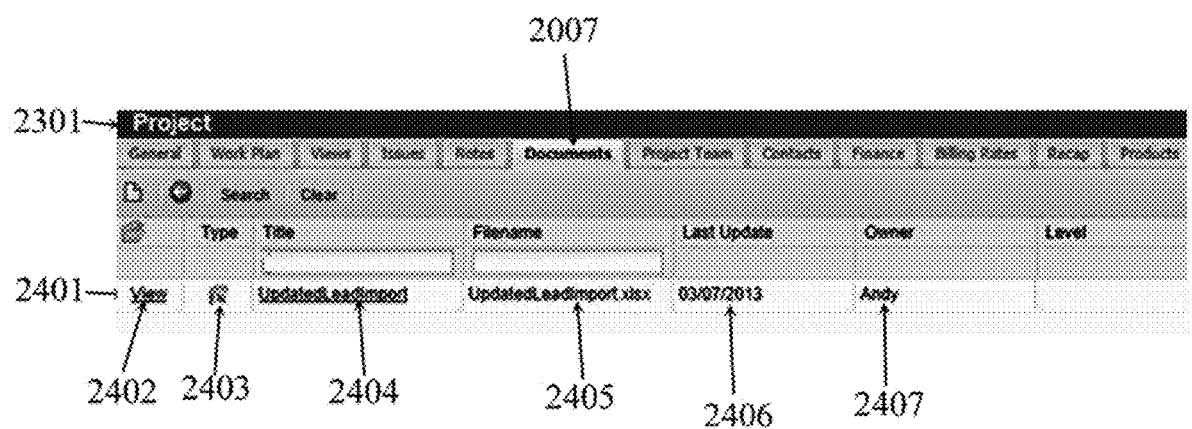
FIG. 24 is an illustrative example of an embodiment of a user interface for creating and updating the documents associated with a project.

FIG. 24 is an illustrative example of an embodiment of a user interface for creating and updating the documents associated with a project. The interface can describe the project 2301. In FIG. 24, the Documents tab 2007 is selected, which may then provide an interface for creating, displaying, and updating documents that are associated with the project. The documents associated with the project are indicated in a list, where each line of the list 2401 represents one document. The columns 2402-2407 can indicate more information about each item in the list 2401. The View column 2402 can provide a link for accessing the document. The Type column 2403 can display an icon that represents the type of the document, such as a text file, Microsoft Word document, Adobe PDF document, and so on. The type of the document may be determined using part of the filename of the document. The Title column 2404 can be the title of the document. The Filename column 2405 can be the filename of the document. The Last Update column 2406 can indicate the last time that the document was modified, or if the document has never been modified, the time at which the document was first created. The Owner column 2407 can indicate the identity of the person who initially created the document.

Figure 25:
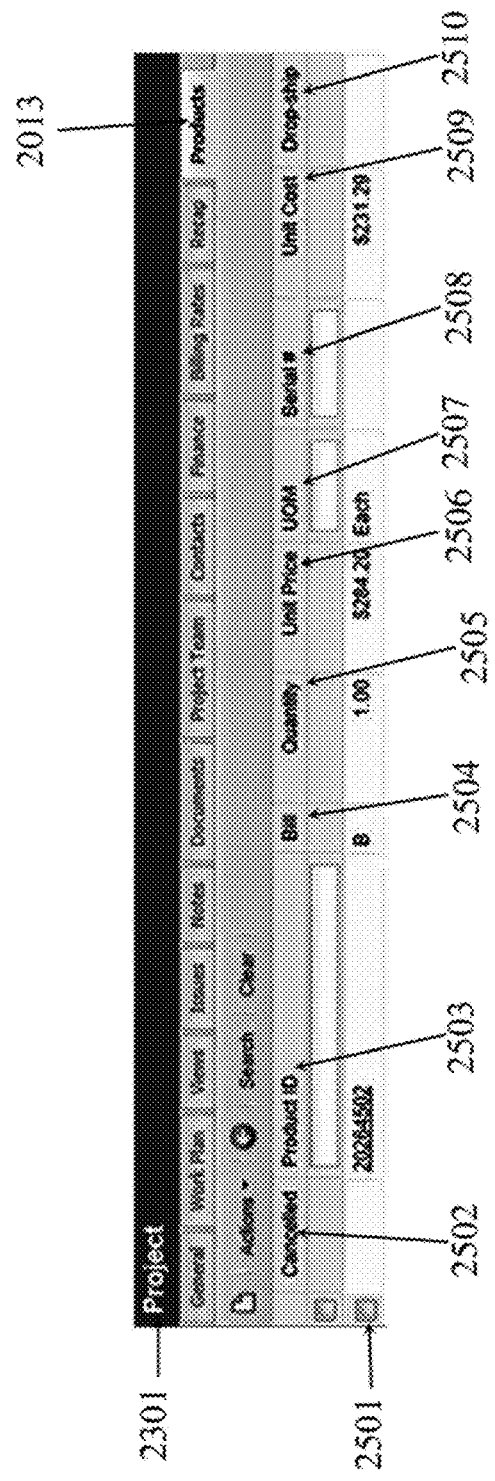
FIG. 25 is an illustrative example of an embodiment of a user interface for creating and updating the products associated with a project.

FIG. 25 is an illustrative example of an embodiment of a user interface for creating and updating the products associated with a project. The interface can describe the project 2301. In FIG. 25, the Products tab 2013 is selected, which may then provide an interface for creating, displaying, and updating products that are associated with the project. The products associated with the project are indicated in a list, where each line of the list 2501 represents one product. The columns 2502-2510 can indicate more information about each item in the list 2501. The Cancelled column 2502 can indicate whether the order for the product will be cancelled. Indicating a cancellation may remove the product from any invoice but not remove the product from the project. The Product ID column 2503 can be an identifier that uniquely identifies the product. For example, the Product ID column may be the Universal Product Code (UPC) of the product. The Bill column 2504 can be the billable status of the product. The Bill column may indicate whether or not the product will appear on invoices sent to customers. The letter "B" in the Bill column may indicate that the product is billable, i.e. the product will appear on invoices sent to customers. The Quantity column 2505 can be the quantity of product that is being sold to the customer. The Unit Price column 2506 can be the price charged to the customer for the product. The price may be updated as part of the procurement process. The price may be updated to reflect the actual price charged to the customer once the product has been shipped. The UOM column 2507 can indicate what unit is used for quoting the product. For example, the UOM column may be one of the values "Feet", "Hours", "Month", "Each", "Spool", or "Case". The Serial number column 2508 can be the serial number for the product to ship. If the product is serialized, the warehouse may be required to deliver the product associated with the specified serial number. The Unit cost column 2509 can be the cost for the product charged by the vendor. The cost may be updated as part of the procurement process. The cost may be updated to reflect the actual cost charged by the vendor once the invoice from the vendor has been received. The Drop-ship column 2510 can indicate whether the product will be shipped directly from the vendor to the customer, or whether the product will first be shipped from the vendor to the company, and then shipped from the company to the customer.

Figure 26:
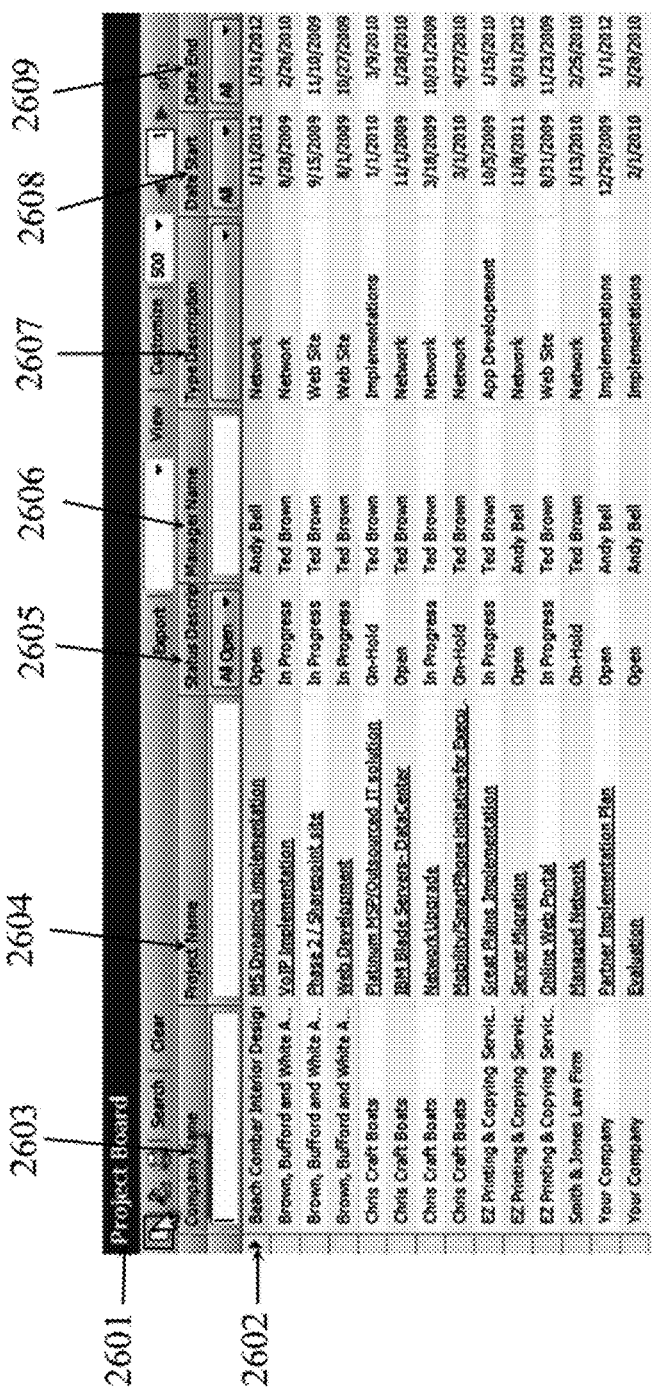
FIG. 26 is an illustrative example of an embodiment of a user interface for managing a project board.

FIG. 26 is an illustrative example of an embodiment of a user interface for managing a project board. The interface can describe the name of the project board 2601. Each line 2602 in the project board can represent a single project. The columns 2603-2609 can provide information about each line 2602 in the project board. The Company Name column 2603 can be the name of the company for which the project work is being completed. The Project Name column 2604 can be the name the project. The Status Description column 2605 can be the current status of the project. The Manager Name column 2606 can be the name of the project manager that is responsible for the project. The Type Description column 2607 can be the type of the project, such as "Design" or "Installation". The Date Start column 2608 can be the date on which the entire project begins. The Date End column 2609 can be the predicted completion data of the project.

Figure 27:
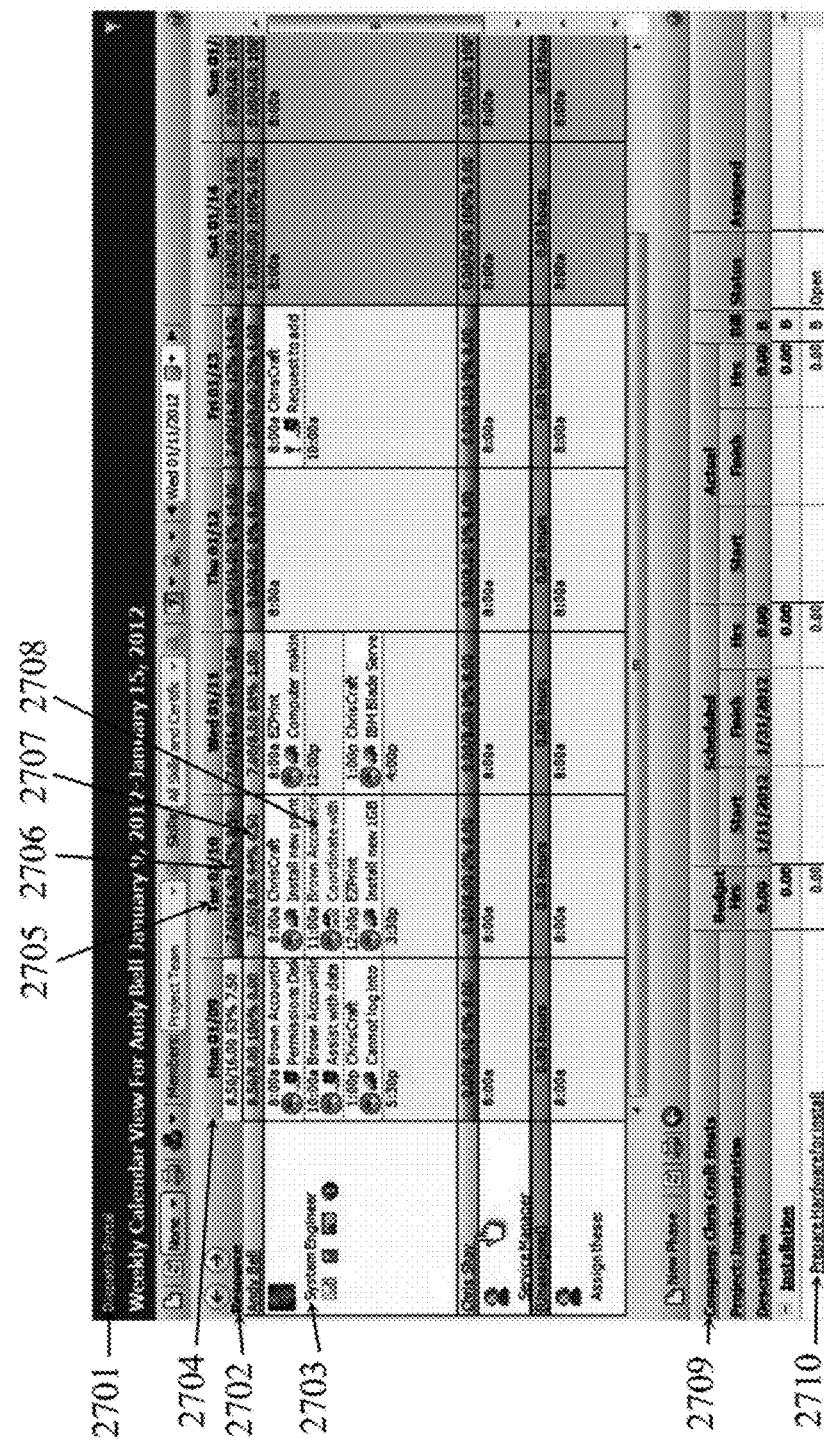
FIG. 27 is an illustrative example of an embodiment of a user interface for managing the scheduling of a project.

FIG. 27 is an illustrative example of an embodiment of a user interface for managing the scheduling of a project. The interface can be labeled 2701. Each row in the interface can be a resource 2702 available to the project, and can have some additional descriptive information 2703. Each column 2704 in the interface can be a time period for scheduling; for example, in FIG. 27 the time period for each column 2704 is one day. Each column entry can label the time period 2705, indicate the overall utilization 2706 for all resources during that time period, indicate the utilization 2707 for the one resource associated with that line, and show the details of the scheduling of individual tasks 2708. The Gantt chart representation of the project schedule can be shown at the bottom of the screen 2709. The process of scheduling manually may then be done by dragging and dropping a task 2710 from the project schedule 2709 to a resource area 2708. If there is a conflict with a task already assigned for that resource, the interface may allow moving the task to another time or resource.

Figure 28:
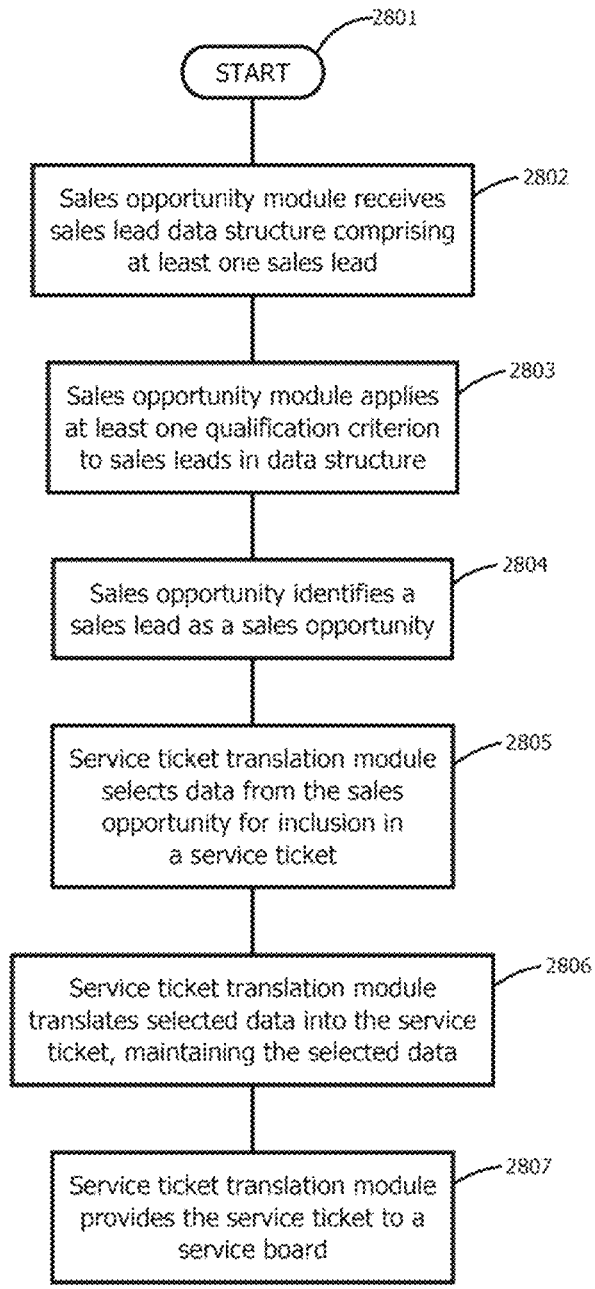
FIG. 28 is an illustrative flowchart depicting one embodiment of a method of converting a sales opportunity to a service ticket.

FIG. 28 is an illustrative flowchart depicting one embodiment of a method of converting a sales opportunity to a service ticket. The method 2801 can include a sales opportunity module receiving a sales lead data structure comprising at least one sales lead (2802). The method 2801 can include the sales opportunity module applying at least one qualification criterion to the sales leads in the data structure (2803). The method 2801 can include the sales opportunity identifying a sales lead as a sales opportunity (2804). The method 2801 can include a service ticket translation module selecting data from the sales opportunity and including it in a service ticket (2805). The method 2801 can include the service ticket translation module translating the selected data into the service ticket while maintaining the selected data (2806). The method 2801 can include the service ticket translation module providing the service ticket to a service board (2807).

Figure 29:
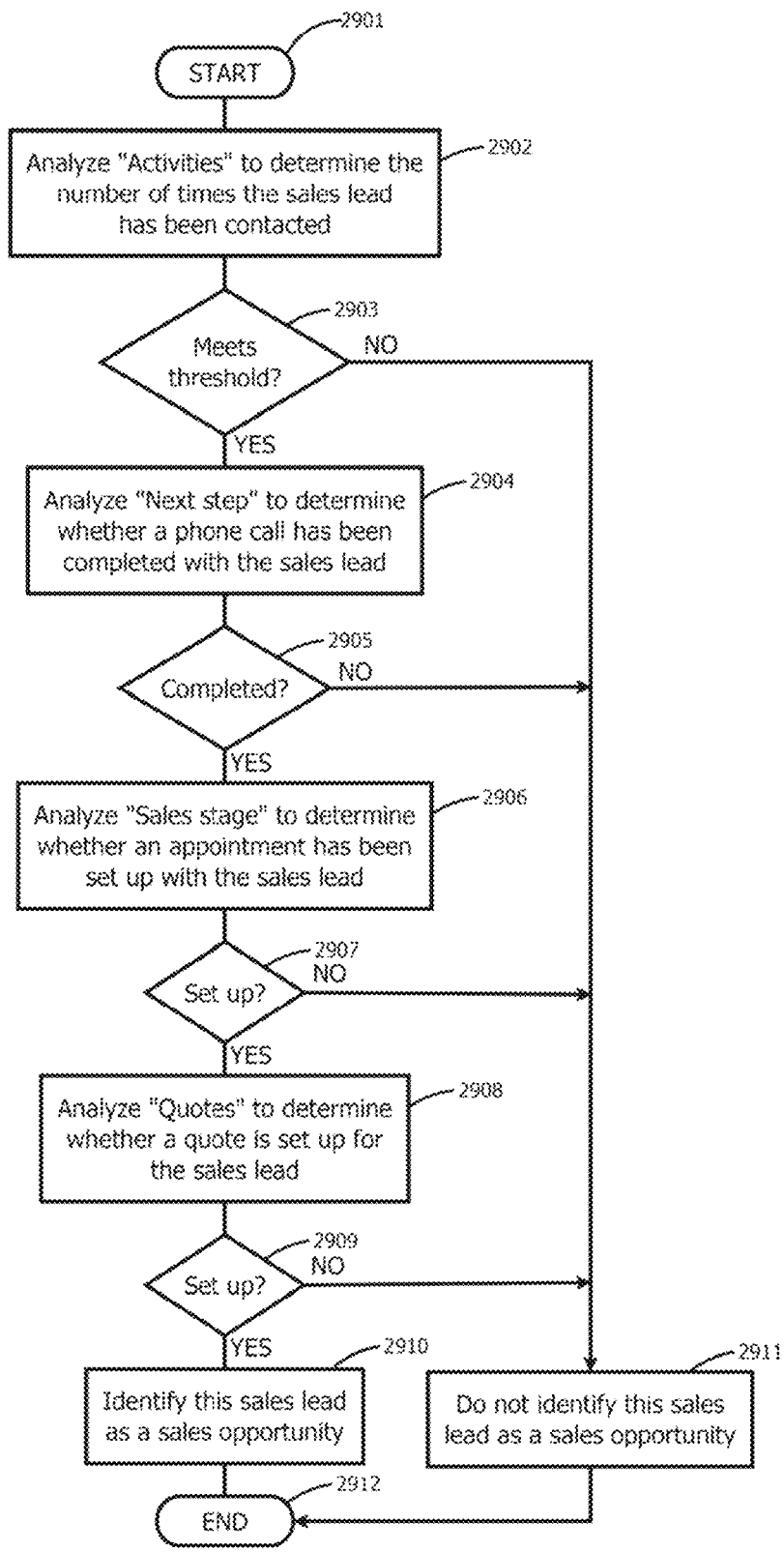
FIG. 29 is an illustrative flowchart depicting one embodiment of a method of identifying a sales lead as a sales opportunity.

FIG. 29 is an illustrative flowchart depicting one embodiment of a method of identifying a sales lead as a sales opportunity, based on at least one qualification criterion. The method 2901 can include analyzing Activities to determine the number of times the sales lead has been contacted (2902). The method 2901 can include checking to see whether the number of times the sales lead has been contacted meets a threshold (2903). In one embodiment, the method 2901 can include analyzing Next step to determine whether a phone call has been completed with the sales lead (2904). The method 2901 can include checking to see whether a phone call has been completed with the sales lead (2905). In one embodiment, the method 2901 can include analyzing Sales stage to determine whether an appointment has been set up with the sales lead (2906). The method 2901 can include checking to see whether an appointment has been set up with the sales lead (2907). In one embodiment, the method 2901 can include analyzing Quotes to determine whether a quote is set up for the sales lead (2908). The method 2901 can include checking to see whether a quote is set up for the sales lead (2909). In one embodiment, the method 2901 can include identifying the sales lead as a sales opportunity (2910). In one embodiment, the method 2901 can include not identifying the sales lead as a sales opportunity (2911). The method can include joining a plurality of control flows (2912).

Figure 30:
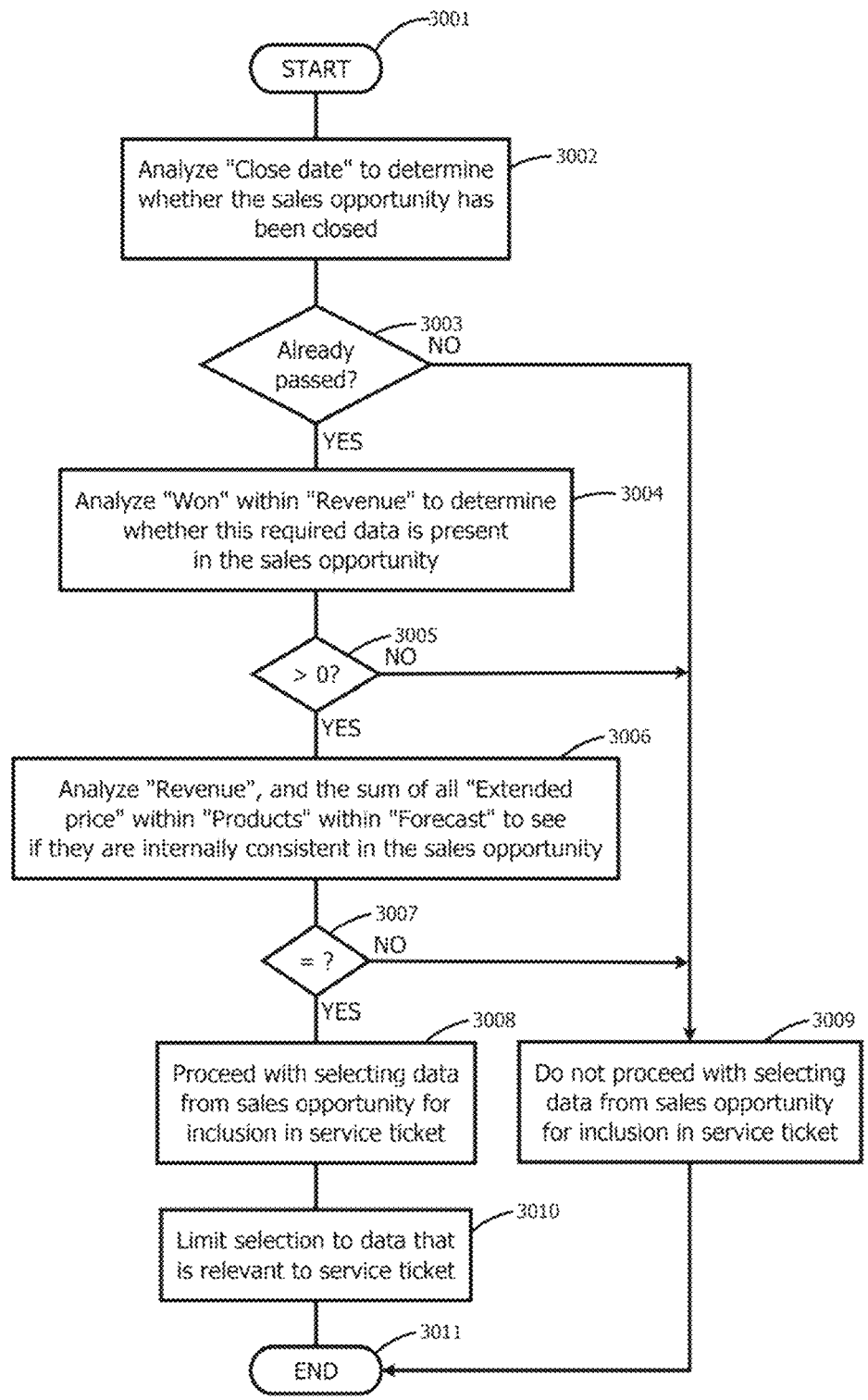
FIG. 30 is an illustrative flowchart depicting one embodiment of a method of selecting data of a sales opportunity by a service ticket translation module.

FIG. 30 is an illustrative flowchart depicting one embodiment of a method of selecting data of a sales opportunity by a service ticket translation module for inclusion in a service ticket. The method 3001 can include analyzing Close date to determine whether the sales opportunity has been closed (3002). The method 3001 can include checking to see whether the Close date has already passed (3003). In one embodiment, the method 3001 can include analyzing Won within Revenue to determine whether this required data is present in the sales opportunity (3004). The method 3001 can include checking to see whether Won within Revenue is greater than zero (3005). In one embodiment, the method 3001 can include analyzing Revenue, and the sum of all of the Expected price values within Products within Forecast to see if they are internally consistent in the sales opportunity (3006). The method 3001 can include checking to see whether the Revenue matches the sum of all Expected price values (3007). In one embodiment, the method 3001 can include proceeding with selecting data from the sales opportunity for inclusion in a service ticket (3008). In one embodiment, the method 3001 can include not proceeding with selecting data from the sales opportunity for inclusion in a service ticket (3009). The method can include limiting the selection of data to that which is relevant to a service ticket (3010). The method can include joining a plurality of control flows (3011).

Figure 31:
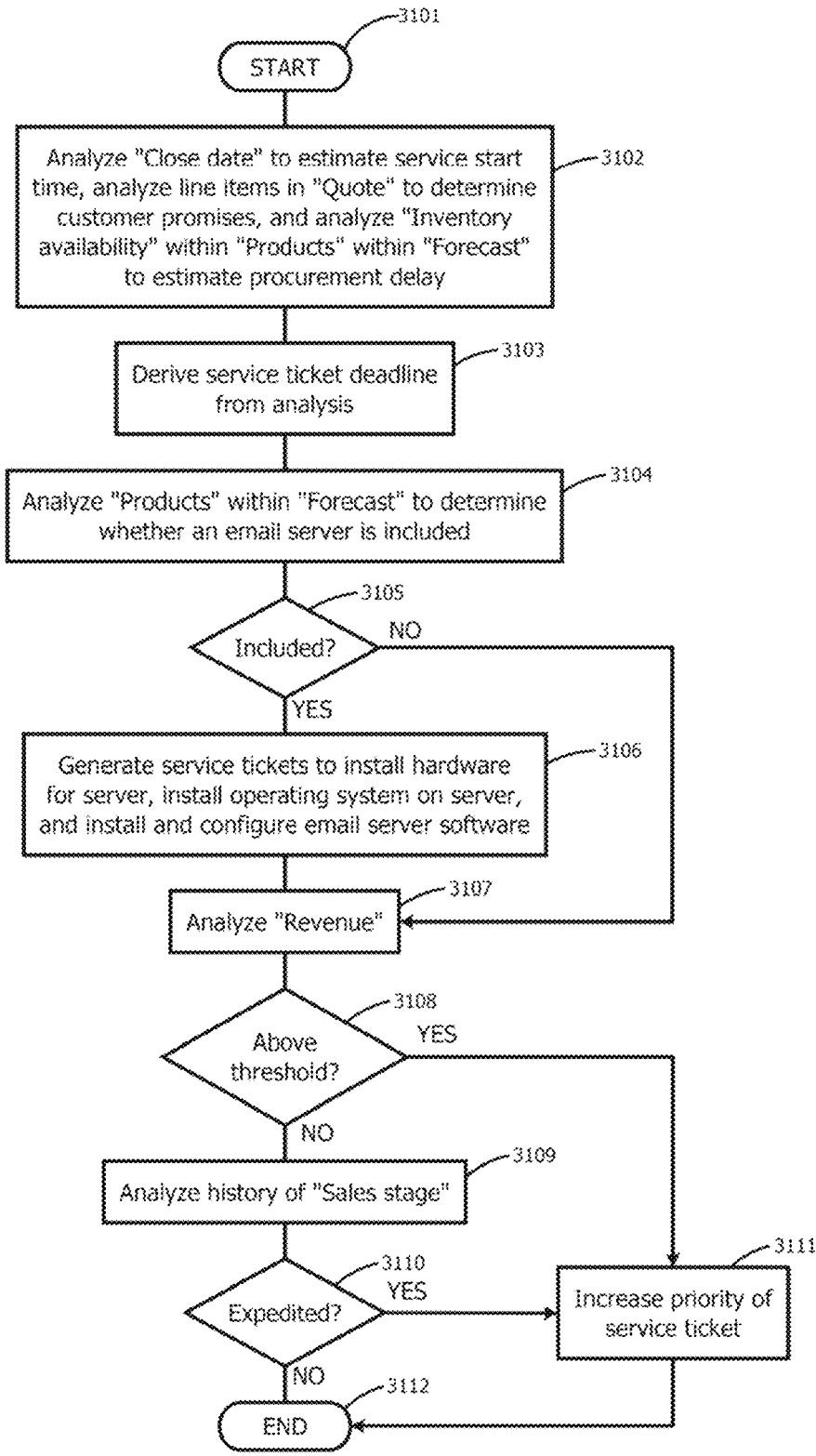
FIG. 31 is an illustrative flowchart depicting one embodiment of a method of translating selected data of a sales opportunity into a service ticket.

FIG. 31 is an illustrative flowchart depicting one embodiment of a method of translating selected data of a sales opportunity into a service ticket by a service ticket translation module. The method 3101 can include analyzing Close date to estimate the service start time, analyzing line items in Quote to determine promises to customers, and analyzing Inventory availability within Products within Forecast to estimate procurement delay (3102). The method 3101 can include deriving the service ticket deadline from the analysis (3103). The method 3101 can include analyzing Products within Forecast to determine whether an email server is included (3104). The method 3101 can include checking to see whether an email server is included (3105). In one embodiment, the method 3101 can include generating service tickets to install the hardware for the server, install the operating system on the server, and install and configure the email server software (3106). The method 3101 can include analyzing Revenue (3107). The method 3101 can include checking to see whether the Revenue is above a threshold (3108). In one embodiment, the method 3101 can include analyzing the history of Sales stage (3109). The method 3101 can include checking to see whether the history of Sales stage indicates that the customer has expedited the sale (3110). In one embodiment, the method 3101 can include increasing the priority of the service ticket (3111). The method can include joining a plurality of control flows (3112).

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of interfacing between a plurality of different components via a network to reduce communication errors between a plurality of computing devices, comprising:

executing, by one or more processors of a first computing device of the plurality of computing devices, a main component comprising a plurality of policies for: (i) receiving, from a server via the network, a single data structure stored in a centralized data repository comprising an electronic identifier; (ii) categorizing the single data structure as a first type, a second type, and a third type based on application of a threshold determined by the plurality of policies of the main component to historical data associated with the electronic identifier, the historical data comprising communication data, analysis data, and transaction data; (iii) classifying the single data structure of the first type, the second type, and the third type respectively into a first element, a second element, and a third element, the first element configured for routing to a first component to generate a ticket based on a first policy, the second element configured for routing to a second component to generate an order based on a second policy, and the third element configured for routing to a third component to generate a project based on a third policy; and (iv) routing each of the first element, the second element, and the third element to one of the first component, the second component and the third component;

executing, by the one or more processors of the first computing device, a first translation component for: (i) determining, using a verification process on the single data structure based on the historical data associated with the ticket, a first subset of data to include for conversion, the verification process comprising a comparison with a reference value using at least one of a date or a price information of the historical data associated with the ticket; (ii) selecting, from the determined first subset of data, responsive to the single data structure categorized as the first type and classified as the first element, the single data structure for inclusion in the ticket, the single data structure indicating a close date, a line item, and an inventory availability; (iii) converting, using the first policy, the selected single data structure of the first subset of data into the ticket with a first format used by the first component for managing and implementing department workload; (iv) updating the first element responsive to receiving feedback from the first component; and (v) translating, by maintaining the selected single data structure, the selected single data structure to generate the ticket with a deadline using the selected single data structure indicating the close date, the line item, and the inventory availability;

executing, by the one or more processors of the first computing device, a second translation component that reduces data processing by filtering out unqualified data, the second translation component for: (i) determining, using a qualification criterion on the single data structure based on the historical data associated with the order, a second subset of data different from the first subset of data to include for conversion, the qualification criterion comprising at least one of a minimum number of telecommunications or a digital calendar entry; (ii) selecting, from the determined second subset of data, responsive to the single data structure categorized as the second type and classified as the second element, the single data structure for inclusion in the order, the single data structure indicating a revenue, information about the electronic identifier, and a product option; (iii) converting, using the second policy, the selected single data structure of the second subset of data into the order with a second format used by the second component for managing and implementing department resources; (iv) updating the second element responsive to receiving feedback from the second component; and (v) translating, by maintaining the selected single data structure, the selected single data structure to generate the order with a deadline using the selected single data structure indicating a revenue, a lead information, and the product option;

executing, by the one or more processors of the first computing device, a third translation component for: (i) determining, using a second verification process on the single data structure based on the historical data associated with the project, a third subset of data different the first subset of data and the second subset of data to include for conversion, the second verification process comprising a comparison with a second reference value using at least one of the date or the price information of the historical data associated with the project; (ii) selecting, from the determined third subset of data, responsive to the single data structure categorized as the third type and classified as the third element, the single data structure for inclusion in the project, the single data structure indicating a quote, a product forecast, and a resource availability; (iii) converting, using the third policy, the selected single data structure of the third subset of data into the project with a third format used by the third component for managing and implementing department schedule; (iv) updating the third element responsive to receiving feedback from the third component; and (v) translating, by maintaining the selected single data structure, the selected single data structure to generate the project with a deadline using the selected single data structure indicating the quote, the product forecast, and the resource availability;

configuring the first translation component, the second translation component and the third translation component to reduce communication errors from handoff from the main component executed by the first computing device to the first component, the second component, and the third component executed by a second computing device of the plurality of computing devices by: (i) routing, responsive to the single data structure converted into the first format and translated into the ticket, the single data structure to the first component executed by the second computing device that is separate from the first computing device to manage the ticket by causing the first component to allocate the ticket to a technician device of the first component based on a priority of the ticket; (ii) routing, responsive to the single data structure converted into the second format and translated into the order, the single data structure to the second component executed by the second computing device to manage the order by causing the second component to prioritize and assign the order to a system of the second component; and (iii) routing, responsive to the single data structure converted into the third format and translated into the project, the single data structure to the third component executed by the second computing device to manage the project by causing the third component to prioritize and assign the project to an engineer of the third component and generate an alert responsive to the prioritization and assignment of the project that addresses a highest priority hardware or software-related problem associated with the ticket; and executing, by the second computing device, the first component, the second component, and the third component for: (i) providing the ticket, the order, and the project received from the first translation component, the second translation component, and the third translation component, respectively, for update by one or more remote devices; (ii) receiving, from the one or more remote devices, an update to the ticket, the order, and the project; and (iii) processing the update using the first component, the second component, and the third component to generate an updated ticket, an updated order, or an updated project for storage in the single data structure stored in the centralized data repository.

2. The method of claim 1, comprising:
comparing a number of times the lead associated to the electronic identifier has been contacted with the threshold;
determining a phone call has been completed with the lead; and
determining an appointment is set up with the lead or the quote is set up for the lead.

3. The method of claim 1, wherein selecting the single data structure comprises:
identifying the single data structure is closed.

4. The method of claim 1, wherein selecting the single data structure comprises:
identifying the single data structure that includes a required data value.

5. The method of claim 1, wherein selecting the single data structure comprises:
performing a consistency test on the single data structure to identify consistent data.

6. The method of claim 1, wherein selecting the single data structure comprises:
identifying the single data structure based on the ticket.

7. The method of claim 1, wherein translating comprises:
generating, based on a plurality of items of the single data structure, at least one item of the single data structure of the ticket, the order, and the project.

8. The method of claim 1, wherein translating comprises:
obtaining historical values of the historical data.

9. The method of claim 1, further comprising:
storing, by the second component, a plurality of quotes associated with the single data structure;
storing, by the second component, a plurality of documents associated with the single data structure;
storing, by the second component, a plurality of notes associated with the single data structure;
translating, by the second translation component, the plurality of quotes associated with the single data structure into a plurality of quotes associated with the order;
translating, by the second translation component, the plurality of documents associated with the single data structure into a plurality of documents associated with the order; and
translating, by the second translation component, the plurality of notes associated with the single data structure into a plurality of notes associated with the order.

10. The method of claim 1, further comprising:
creating a second single data structure, based on one or more changes to the single data structure; and
translating, by the second translation module, the second single data structure into one or more changes to the order corresponding to the one or more changes to the single data structure.

11. The method of claim 1, further comprising:
storing, by the main component, a plurality of quotes associated with the single data structure;
storing, by the main component, a plurality of documents associated with the single data structure;
storing, by the main component, a plurality of notes associated with the single data structure;
translating, by the first translation module, the plurality of quotes associated with the single data structure into a plurality of quotes associated with the ticket;
translating, by the first translation module, the plurality of documents associated with the single data structure into a plurality of documents associated with the ticket; and
translating, by the first translation module, the plurality of notes associated with the single data structure into a plurality of notes associated with the ticket.

12. The method of claim 1, further comprising:
creating a second single data structure, based on one or more changes to the single data structure; and
translating, by the first translation component, the second single data structure into one or more changes to the ticket corresponding to the one or more changes to single data structure.

13. A system that interfaces between a plurality of different components via a network to reduce communication errors between a plurality of computing devices, comprising:
a first computing device of the plurality of computing devices, the first computing device including one or more processors and memory;
a second computing device of the plurality of computing devices, the second computing device including one or more processors and memory;
a main component comprising a plurality of policies executed by the one or more processors of the first computing device to: (i) receive, from a server via the network, a single data structure stored in a centralized data repository comprising an electronic identifier; (ii) categorize the single data structure as a first type, a second type, and a third type based on application of a threshold determined by the plurality of policies of the main component to historical data associated with the electronic identifier, the historical data comprising communication data, analysis data, and transaction data; (iii) classify the single data structure of the first type, the second type, and the third type respectively into a first element, a second element, and a third element, the first element configured for routing to a first component to generate a ticket based on a first policy, the second element configured for routing to a second component to generate an order based on a second policy, and the third element configured for routing to a third component to generate a project based on a third policy; and (iv) route each of the first element, the second element, and the third element to one of the first component, the second component and the third component;
a first translation component executed by the one or more processors of the first computing device to: (i) determine, using a verification process on the single data structure based on the historical data associated with the ticket, a first subset of data to include for conversion, the verification process comprising a comparison with a reference value using at least one of a date or a price information of the historical data associated with the ticket; (ii) select, from the determined first subset of data, responsive to the single data structure categorized as the first type and classified as the first element, the single data structure for inclusion in the ticket, the single data structure indicating a close date, a line item, and an inventory availability; (iii) convert, using the first policy, the selected single data structure of the first subset of data into the ticket with a first format used by the first component for managing and implementing department workload; (iv) update the first element responsive to receiving feedback from the first component; and (v) translate, by maintaining the selected single data structure, the selected single data structure to generate the ticket with a deadline using the selected single data structure indicating the close date, the line item, and the inventory availability;

a second translation component executed by the one or more processors of the first computing device that reduces data processing by filtering out unqualified data, the second translation component to: (i) determine, using a qualification criterion on the single data structure based on the historical data associated with the order, a second subset of data different from the first subset of data to include for conversion, the qualification criterion comprising at least one of a minimum number of telecommunications or a digital calendar entry; (ii) select, from the determined second subset of data, responsive to the single data structure categorized as the second type and classified as the second element, the single data structure for inclusion in the order, the single data structure indicating a revenue, information about the electronic identifier, and a product option; (iii) convert, using the second policy, the selected single data structure of the second subset of data into the order with a second format used by the second component for managing and implementing department resources; (iv) update the second element responsive to receiving feedback from the second component; and (v) translate, by maintaining the selected single data structure, the selected single data structure to generate the order with a deadline using the selected single data structure indicating a revenue, a lead information, and the product option;

a third translation component executed by the one or more processors of the first computing device to: (i) determine, using a second verification process on the single data structure based on the historical data associated with the project, a third subset of data different the first subset of data and the second subset of data to include for conversion, the second verification process comprising a comparison with a second reference value using at least one of the date or the price information of the historical data associated with the project; (ii) select, from the determined third subset of data, responsive to the single data structure categorized as the third type and classified as the third element, the single data structure for inclusion in the project, the single data structure indicating a quote, a product forecast, and a resource availability; (iii) convert, using the third policy, the selected single data structure of the third subset of data into the project with a third format used by the third component for managing and implementing department schedule; (iv) update the third element responsive to receiving feedback from the third component; and (v) translate, by maintaining the selected single data structure, the selected single data structure to generate the project with a deadline using the selected single data structure indicating the quote, the product forecast, and the resource availability;

the first translation component, the second translation component and the third translation component configured to reduce communication errors from handoff from the main component executed by the first computing device to the first component, the second component, and the third component executed by the second computing device by instructing the first computing device to: (i) route, responsive to the single data structure converted into the first format and translated into the ticket, the single data structure to the first component executed by the second computing device separate from the first computing device to manage the ticket by causing the first component to allocate the ticket to a technician device of the first component based on a priority of the ticket; (ii) route, responsive to the single data structure converted into the second format and translated into the order, the single data structure to the second component executed by the second computing device to manage the order by causing the second component to prioritize and assign the order to a system of the second component; and (iii) route, responsive to the single data structure converted into the third format and translated into the project, the single data structure to the third component executed by the second computing device to manage the project by causing the third component to prioritize and assign the project to an engineer of the third component and generate an alert responsive to the prioritization and the assignment of the project that addresses a highest priority hardware or software-related problem associated with the ticket; and the first component, the second component, and the third component executed by the second computing device to: (i) provide the ticket, the order, and the project received from the first translation component, the second translation component, and the third translation component, respectively, for update by one or more remote devices; (ii) receive, from the one or more remote devices, an update to the ticket, the order, and the project; and (iii) process the update using the first component, the second component, and the third component to generate an updated ticket, an updated order, or an updated project for storage in the single data structure stored in the centralized data repository.

14. The system of claim 13, wherein the main component is configured to:

compare a number of times the a lead associated to the electronic identifier has been contacted with the threshold;

determine a phone call has been completed with the lead; and determine an appointment is set up with the lead or the quote is set up for the lead.

15. The system of claim 13, wherein the main component is configured to:

identify a circumstance of the single data structure is closed.

16. The system of claim 13, wherein the main component is configured to:

identify the single data structure that includes a required data value.

17. The system of claim 13, wherein the first translation component, the second translation component, and the third translation component is configured to:

perform a consistency test on the single data structure to identify consistent data.

18. The system of claim 13, wherein the first translation component, the second translation component, and the third translation component is configured to:

identify the single data structure based on the ticket, the order, and the project.

19. The system of claim 18, wherein the first translation component, the second translation component, and the third translation component is configured to:

generate, based on a plurality of items of the single data structure, at least one item of the single data structure of the ticket, the order, and the project.

20. The system of claim 13, wherein the first translation component, the second translation component, and the third translation component is configured to:
obtain historical values of the historical data.

21. The system of claim 13, wherein:
the second component is further configured to:
store a plurality of quotes associated with the single data structure;
store a plurality of documents associated with the single data structure; and
store a plurality of notes associated with the single data structure; and
the second translation component is further configured to:
translate the plurality of quotes associated with the single data structure into a plurality of quotes associated with the order;
translate the plurality of documents associated with the single data structure into a plurality of documents associated with the order; and
translate the plurality of notes associated with the single data structure into a plurality of notes associated with the order.

22. The system of claim 13, further comprising:
an update component configured to create a second single data structure based on one or more changes to the single data structure; and
wherein the second translation module further configured to translate the second single data structure into one or more changes to the order corresponding to the one or more changes to the single data structure.

23. The system of claim 13, wherein:
the main component is further configured to:
store a plurality of quotes associated with the single data structure;
store a plurality of documents associated with the single data structure; and
store a plurality of notes associated with the single data structure; and
the first translation component is further configured to:
translate the plurality of quotes associated with the single data structure into a plurality of quotes associated with the ticket;
translate the plurality of documents associated with the single data structure into a plurality of documents associated with the ticket; and
translate the plurality of notes associated with the single data structure into a plurality of notes associated with the ticket.

24. The system of claim 13, further comprising:
an update component configured to create a second single data structure based on one or more changes to the single data structure; and
wherein the first translation component further configured to translate the second single data structure into one or more changes to the ticket corresponding to the one or more changes to the single data structure.

* * * * *